United States Patent
Abiko

(10) Patent No.: US 9,607,204 B2
(45) Date of Patent: Mar. 28, 2017

(54) BIOMETRIC INFORMATION PROCESSING APPARATUS, METHOD, AND RECORDING MEDIUM

(75) Inventor: Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/560,168

(22) Filed: Jul. 27, 2012

(65) Prior Publication Data

US 2013/0004031 A1    Jan. 3, 2013

(51) Int. Cl.
G06K 9/00     (2006.01)
G06K 9/03     (2006.01)

(52) U.S. Cl.
CPC ..... G06K 9/00067 (2013.01); G06K 9/00026 (2013.01); G06K 9/036 (2013.01)

(58) Field of Classification Search
None
See application file for complete search history.

(56) References Cited

U.S. PATENT DOCUMENTS

| | | | |
|---|---|---|---|
| 6,289,114 B1 | 9/2001 | Mainguet | |
| 6,317,508 B1 | 11/2001 | Kramer et al. | |
| 7,020,591 B1 * | 3/2006 | Wei et al. | 703/2 |
| 7,565,548 B2 * | 7/2009 | Fiske et al. | 713/186 |
| 2001/0026636 A1 | 10/2001 | Mainguet | |
| 2001/0043728 A1 | 11/2001 | Kramer et al. | |
| 2002/0164056 A1 * | 11/2002 | Funada | G06K 9/00067 382/124 |
| 2002/0181749 A1 * | 12/2002 | Matsumoto et al. | 382/125 |
| 2003/0076986 A1 * | 4/2003 | Yoon et al. | 382/125 |
| 2003/0123715 A1 * | 7/2003 | Uchida | 382/124 |
| 2003/0161510 A1 | 8/2003 | Fujii | |
| 2005/0100200 A1 * | 5/2005 | Abiko et al. | 382/124 |
| 2005/0105782 A1 | 5/2005 | Abiko | |

(Continued)

FOREIGN PATENT DOCUMENTS

| | | |
|---|---|---|
| JP | 10-91769 | 4/1998 |
| JP | 11-253428 | 9/1999 |

(Continued)

OTHER PUBLICATIONS

International Search Report of PCT/JP2010/051166 mailed Mar. 2, 2010.

(Continued)

*Primary Examiner* — Manav Seth
*Assistant Examiner* — David Perlman
(74) *Attorney, Agent, or Firm* — Staas & Halsey LLP

(57) ABSTRACT

A biometric information processing apparatus, a method for processing biometric information, and a biometric information processing program are provided for analyzing biometric information that is obtained by combining and reconstructing two or more captured partial biometric images, and a mismatching region is extracted from the combined biometric image. Then, a mismatching region is excluded from the biometric image, and a proper region suitable for identification is extracted. Accordingly, false rejection or the like may be avoided. Moreover, the reliability of biometric identification may be improved, and the number of times of asking a user to reinput his/her biometric information may be reduced. Hence, the convenience is enhanced.

17 Claims, 44 Drawing Sheets

(56) References Cited

U.S. PATENT DOCUMENTS

| | | | |
|---|---|---|---|
| 2005/0249386 A1* | 11/2005 | Juh | 382/124 |
| 2006/0285729 A1* | 12/2006 | Kim et al. | 382/124 |
| 2007/0076924 A1 | 4/2007 | Fujii | |
| 2007/0147670 A1 | 6/2007 | Fujii | |
| 2008/0247614 A1 | 10/2008 | Abiko | |
| 2008/0317290 A1 | 12/2008 | Tazoe | |
| 2009/0123040 A1* | 5/2009 | Tatara | 382/125 |
| 2009/0154779 A1* | 6/2009 | Satyan et al. | 382/124 |
| 2010/0080424 A1* | 4/2010 | Hayashi | 382/124 |
| 2011/0249873 A1* | 10/2011 | Nakada et al. | 382/124 |

FOREIGN PATENT DOCUMENTS

| | | | | |
|---|---|---|---|---|
| JP | 2002-42136 | | 2/2002 | |
| JP | 2002083288 | * | 3/2002 | G06T 1/00 |
| JP | 2002-216116 | | 8/2002 | |
| JP | 2003-248820 | | 9/2003 | |
| JP | 2005-143890 | | 6/2005 | |
| JP | 2005-352623 | | 12/2005 | |
| JP | 2007-97842 | | 4/2007 | |
| JP | 2007-202912 | | 8/2007 | |
| JP | 2009-3564 | | 1/2009 | |
| JP | WO2010074096 | * | 1/2010 | G06T 7/00 |
| WO | 2004/026139 A1 | | 4/2004 | |

OTHER PUBLICATIONS

Written Opinion of the International Searching Authority for PCT/JP2010/051166 dated Mar. 2, 2010.

Office Action mailed Jun. 18, 2013 in corresponding Japanese Application No. 2011-551627.

Partial translation of JP 2005-352623 (Ref. BI in the IDS filed Jul. 27, 2012).

* cited by examiner

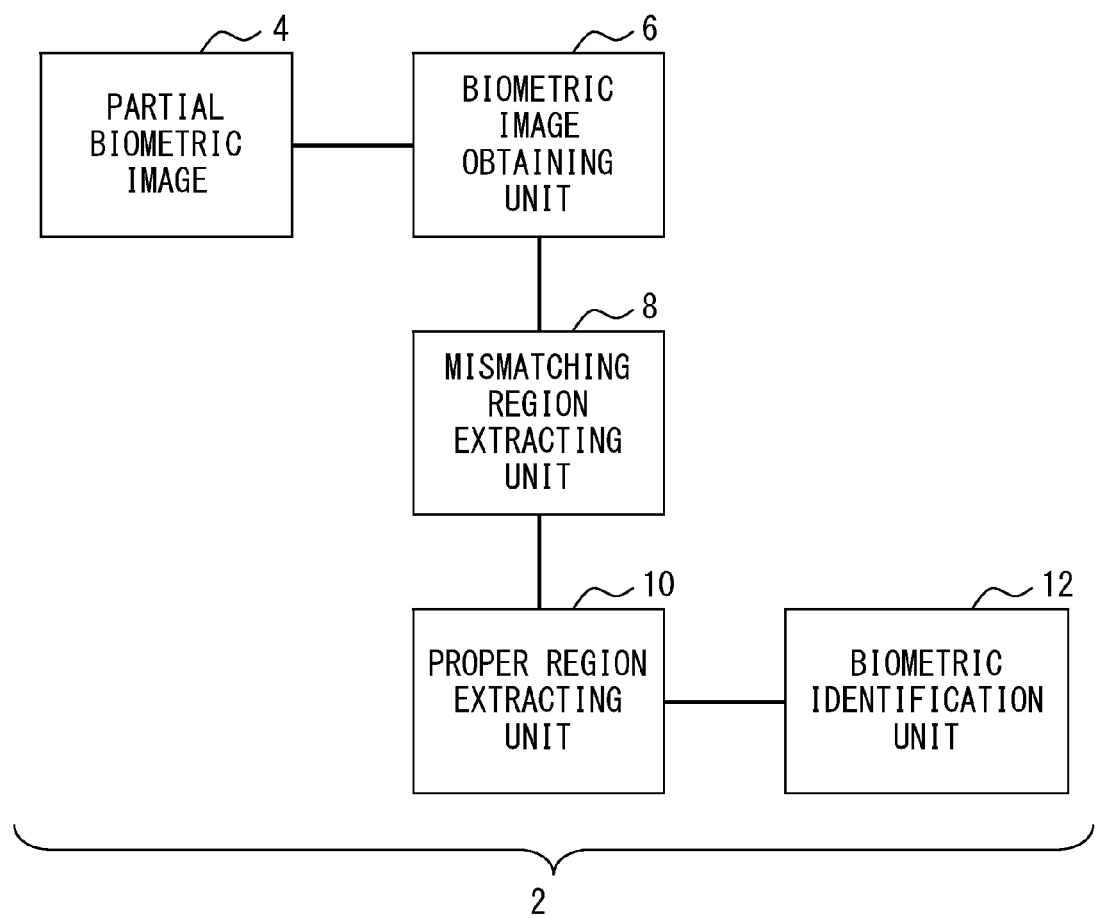
F I G. 1

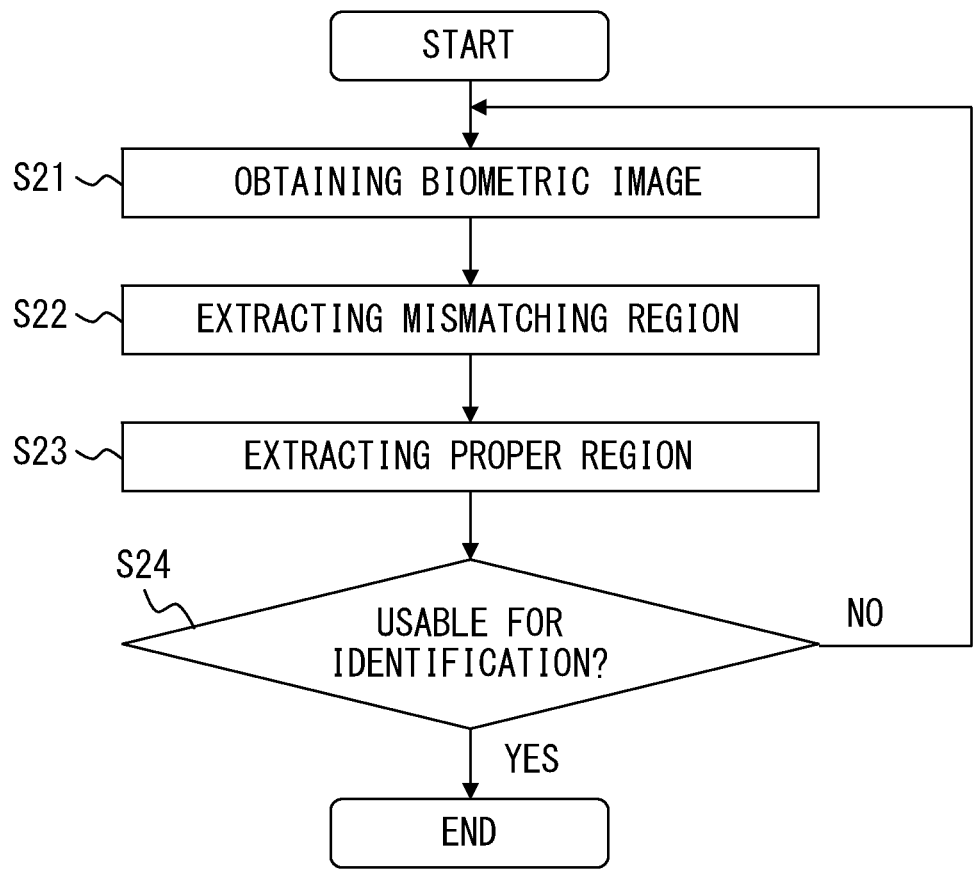
F I G. 4

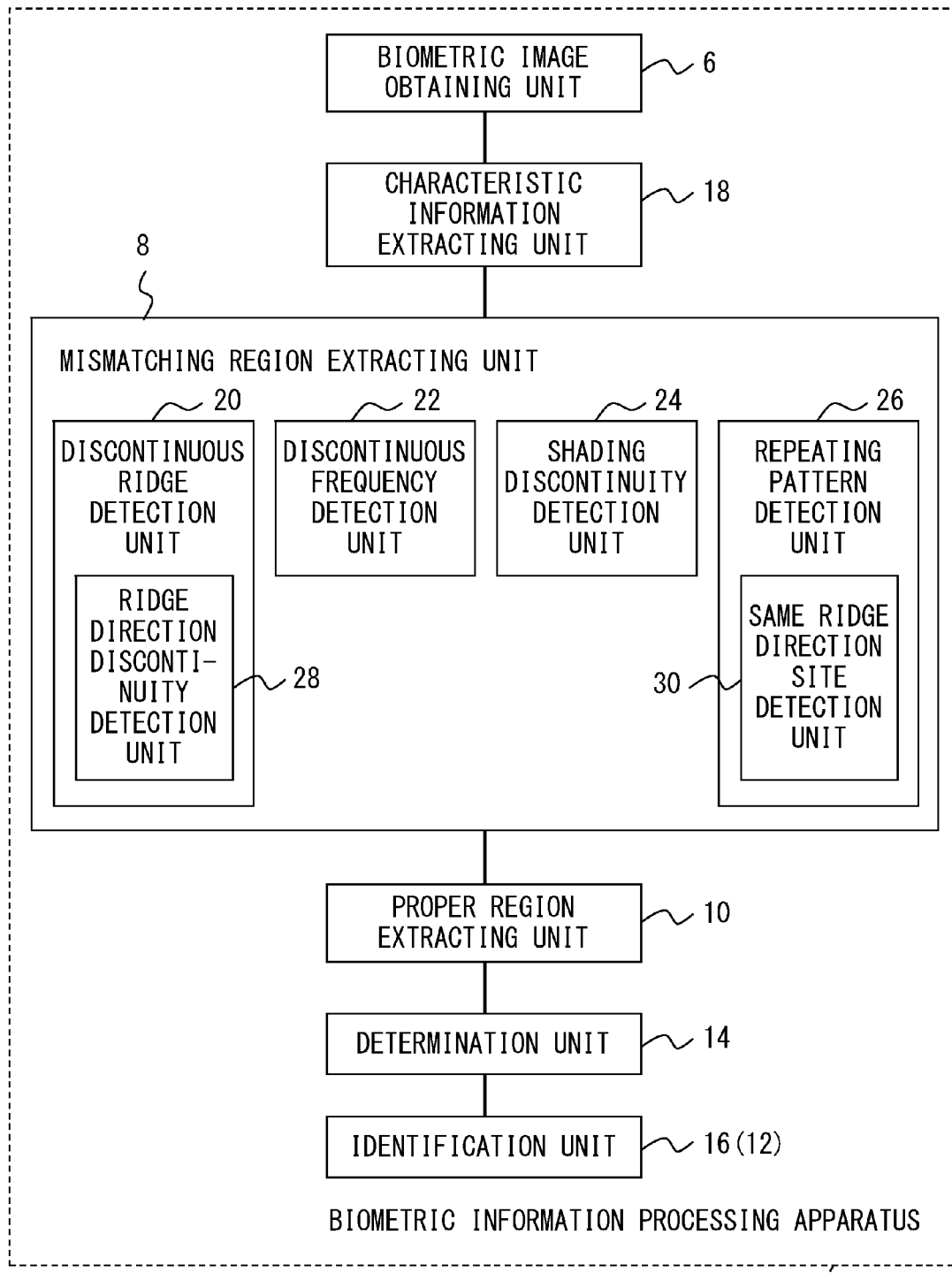
F I G. 5

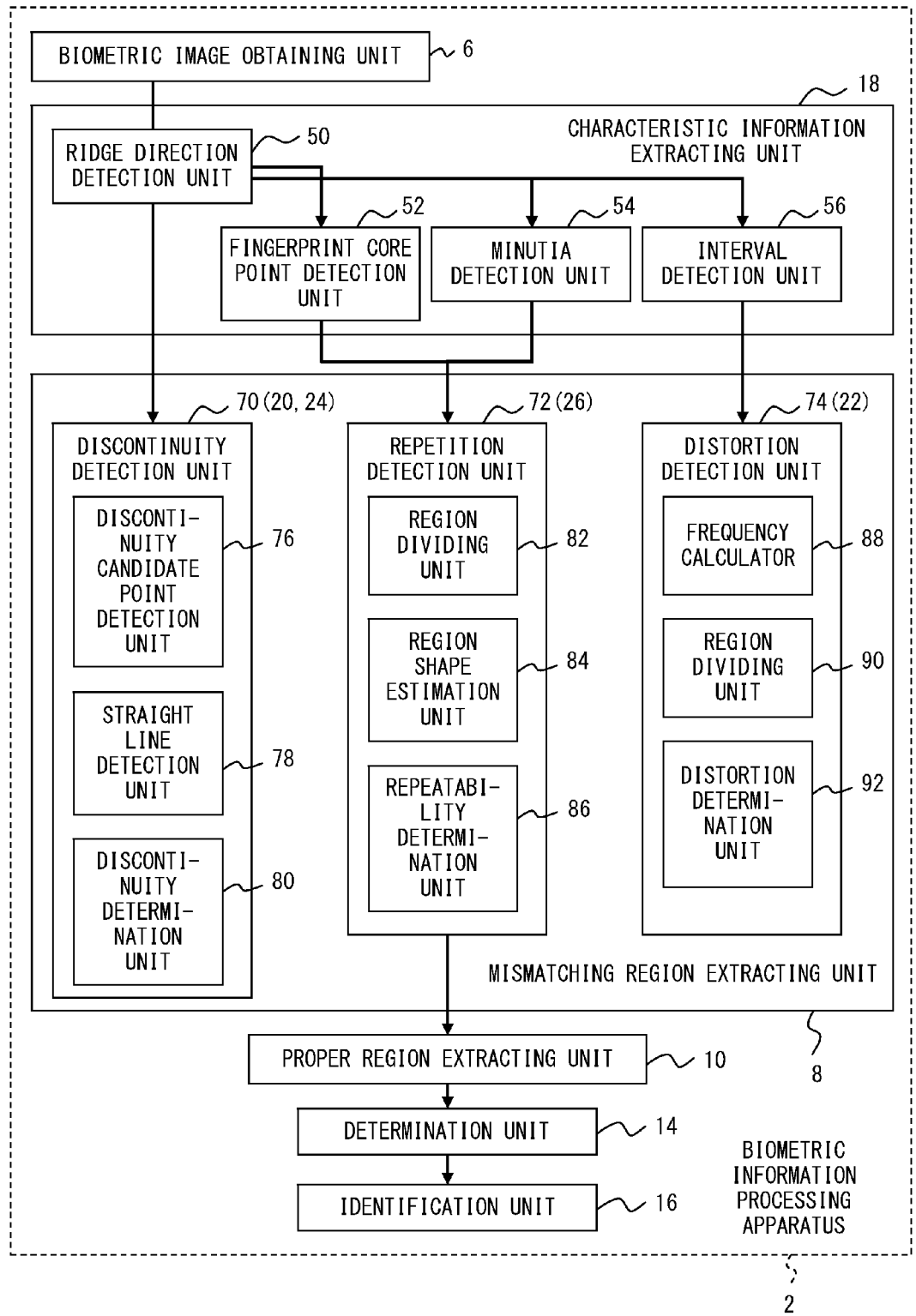
F I G. 6

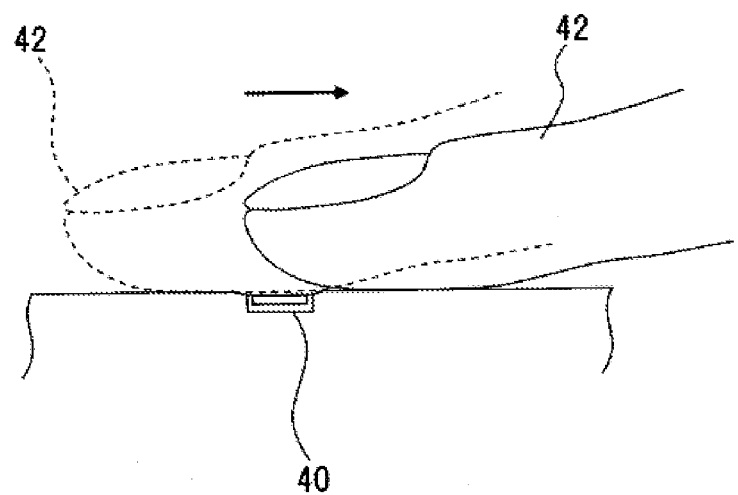
F I G. 7

FIG. 13A
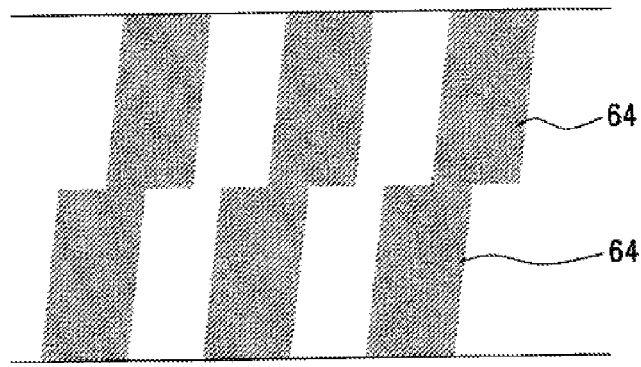
FIG. 13B
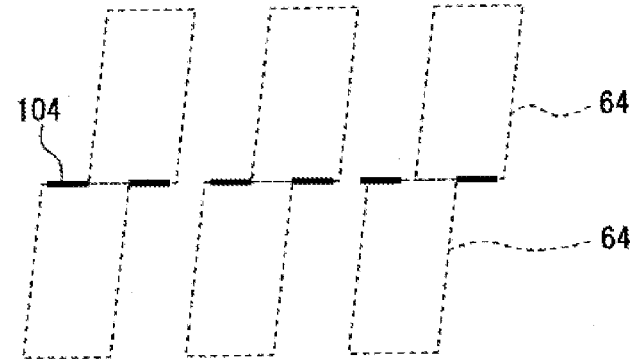

106

| 1 | 2 | 1 |
|---|---|---|
| 0 | 0 | 0 |
| -1 | -2 | -1 |

F I G. 1 4

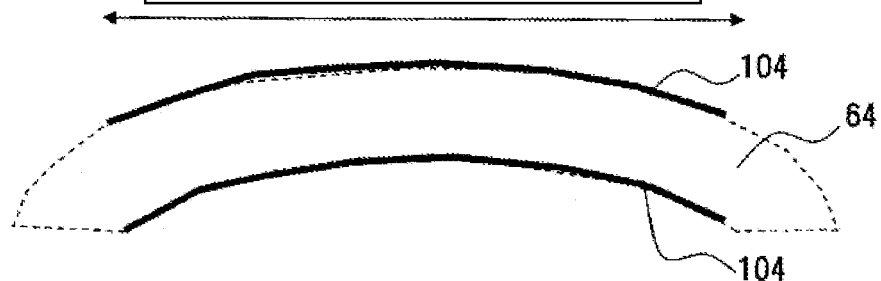
F I G. 1 5 A
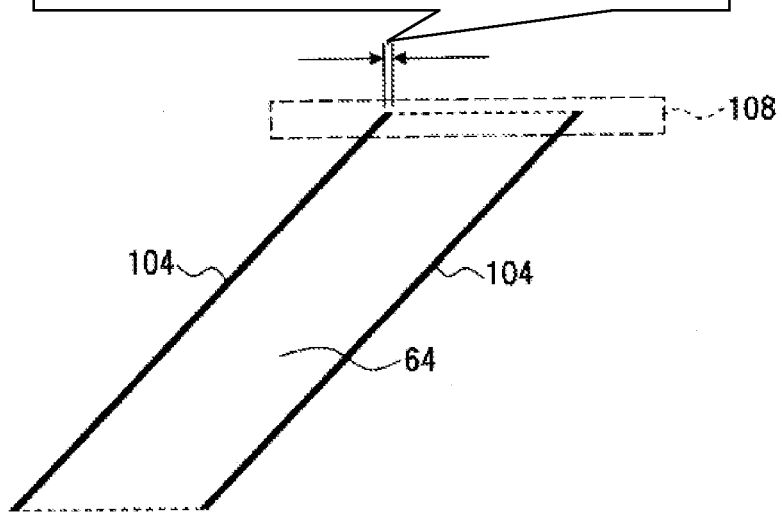
F I G. 1 5 B

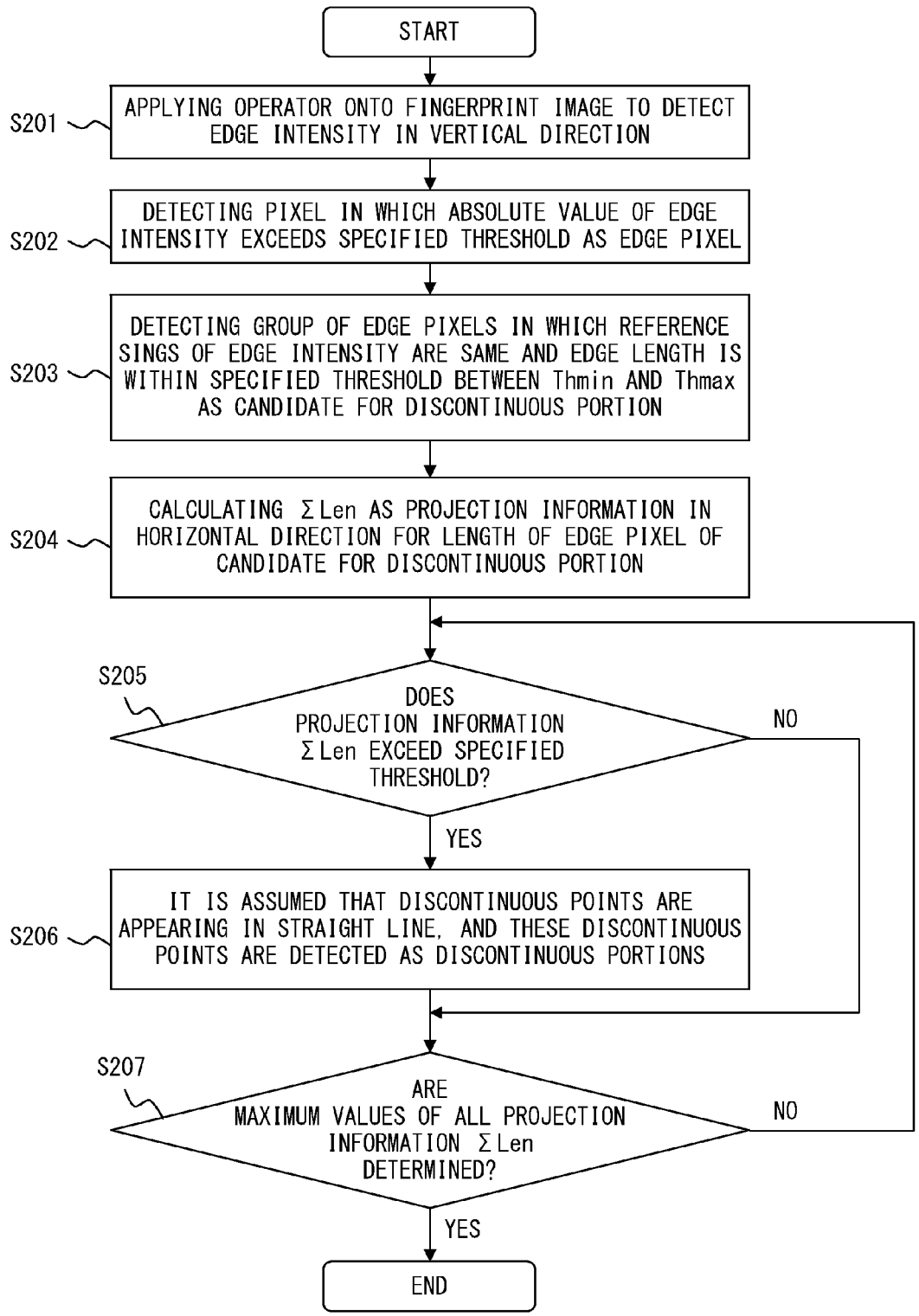
F I G. 1 8

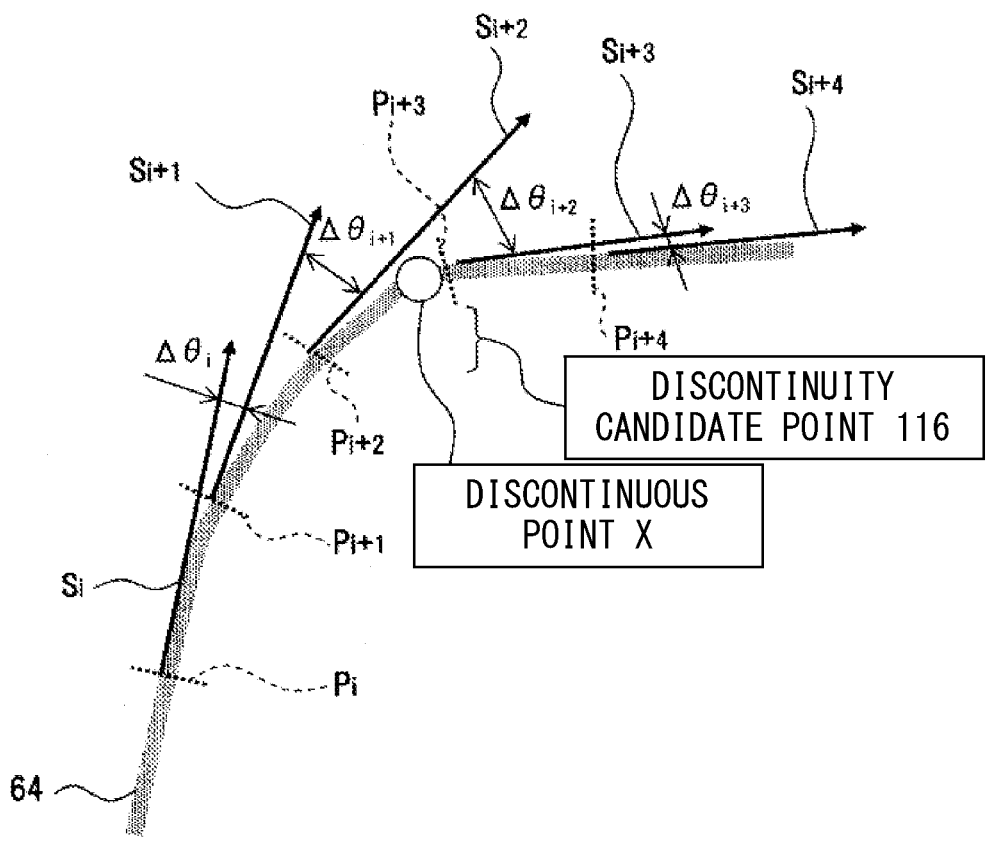
F I G. 19

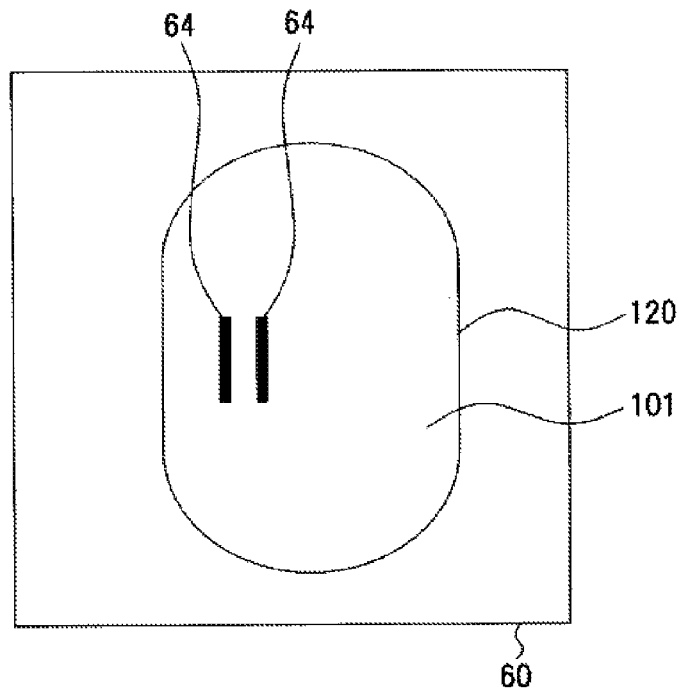
F I G. 2 3 A
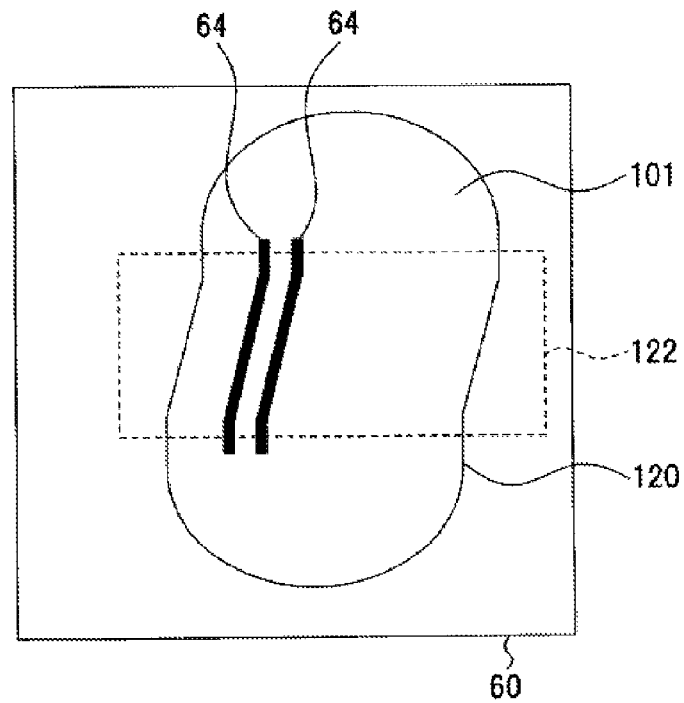
F I G. 2 3 B

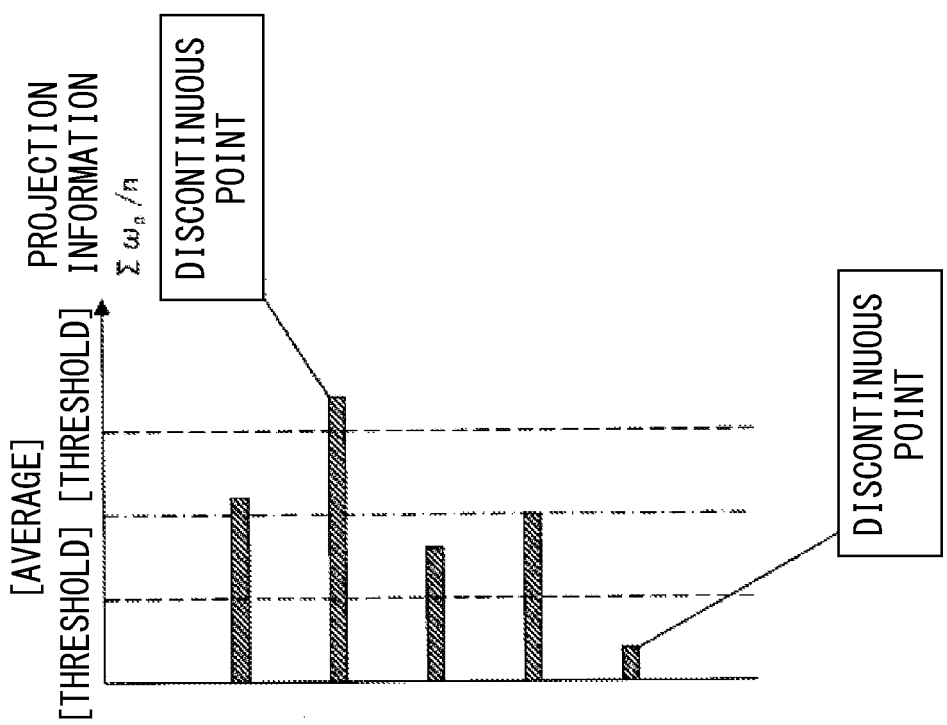
F I G. 29 B
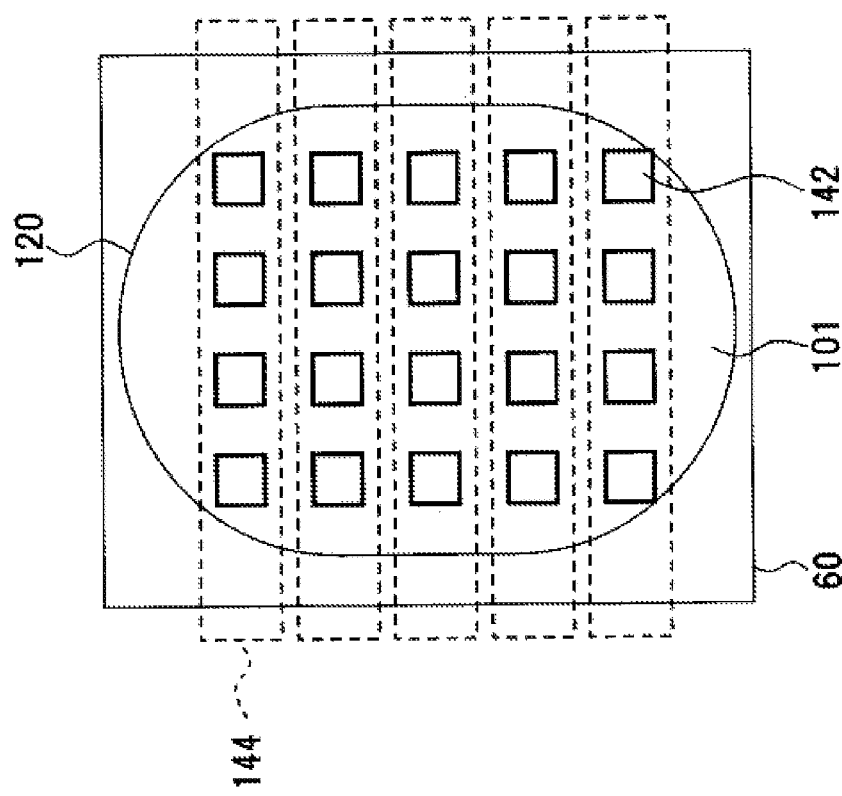
F I G. 29 A

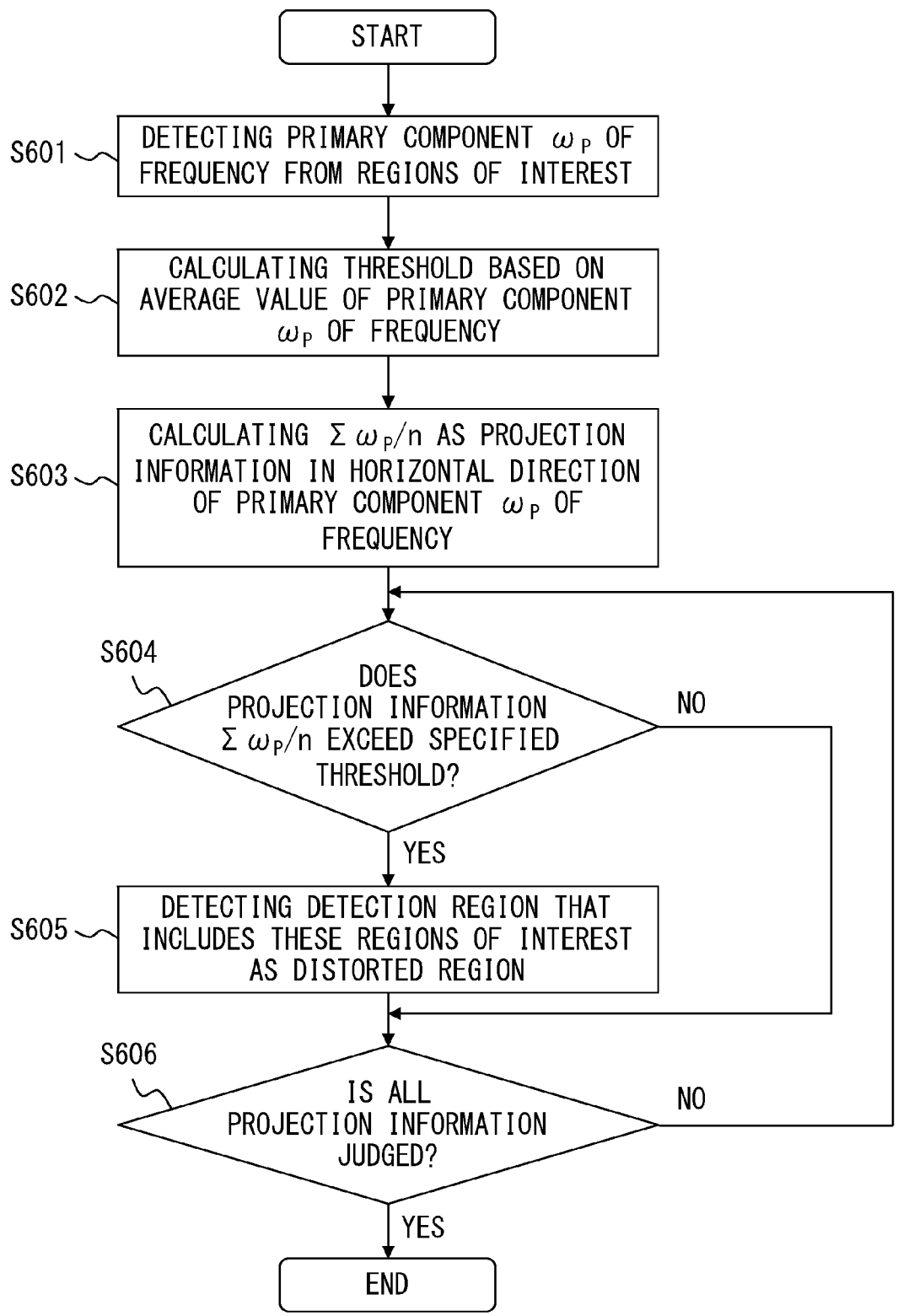
F I G. 3 0

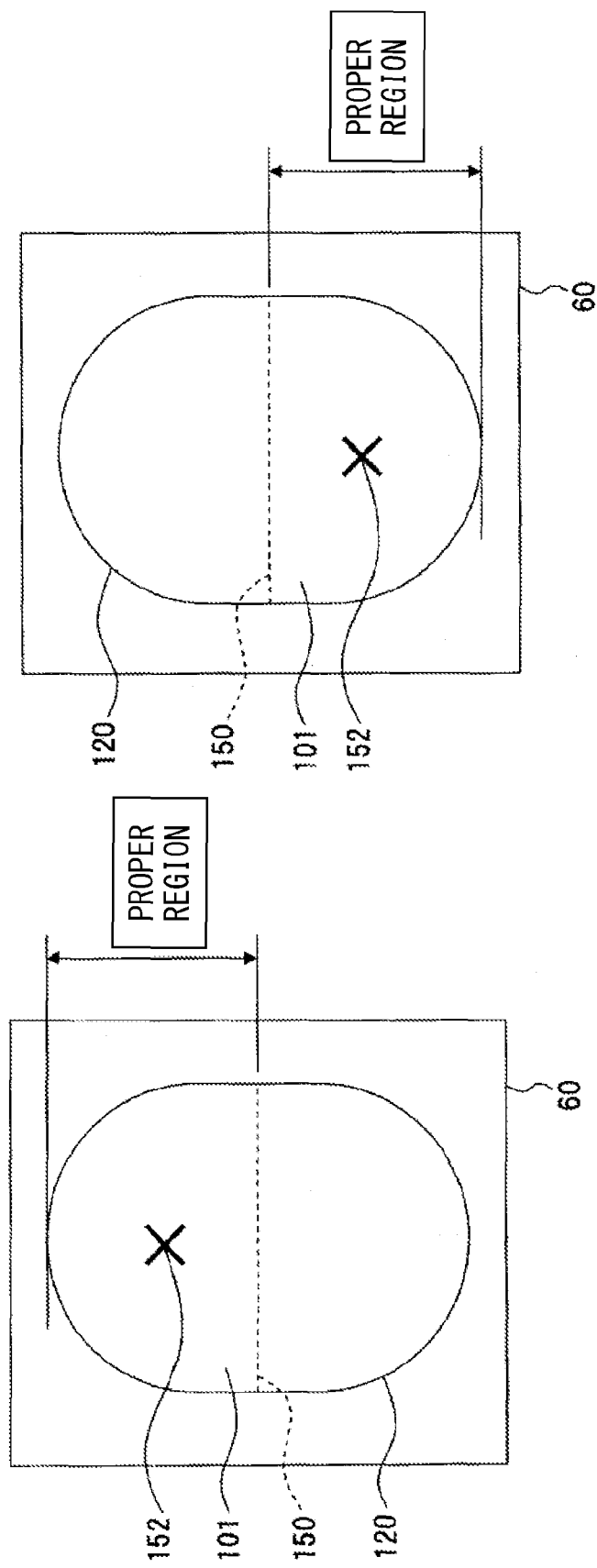

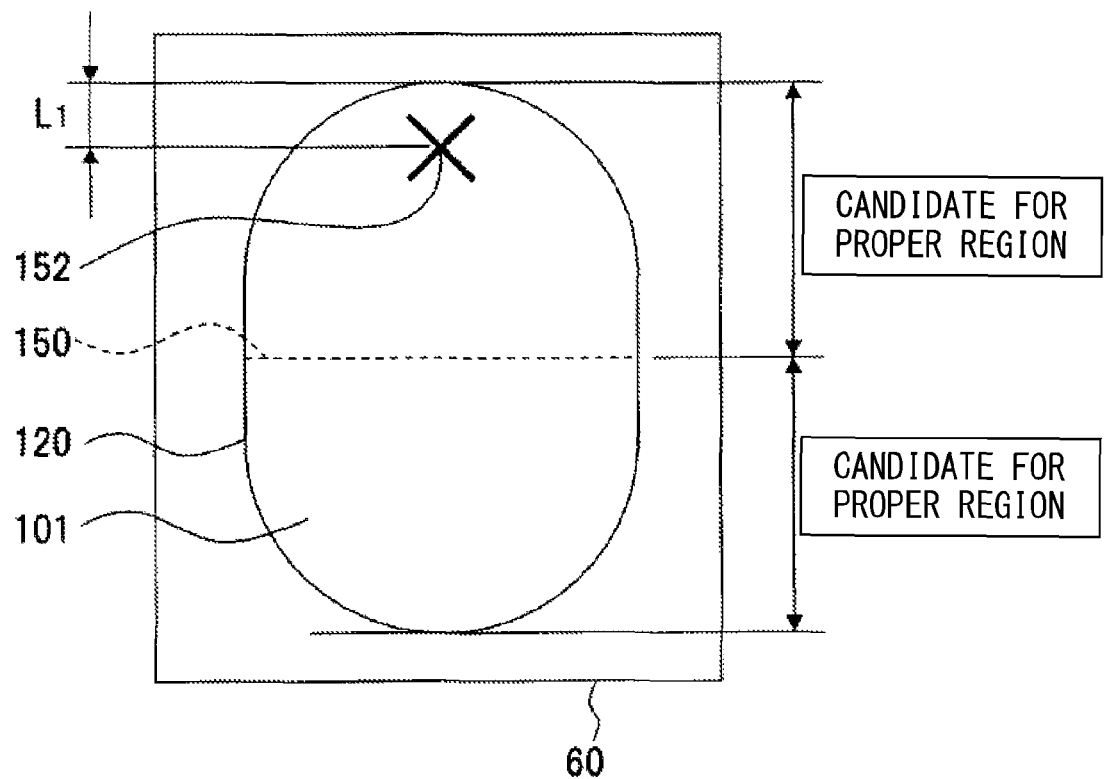
F I G. 3 4

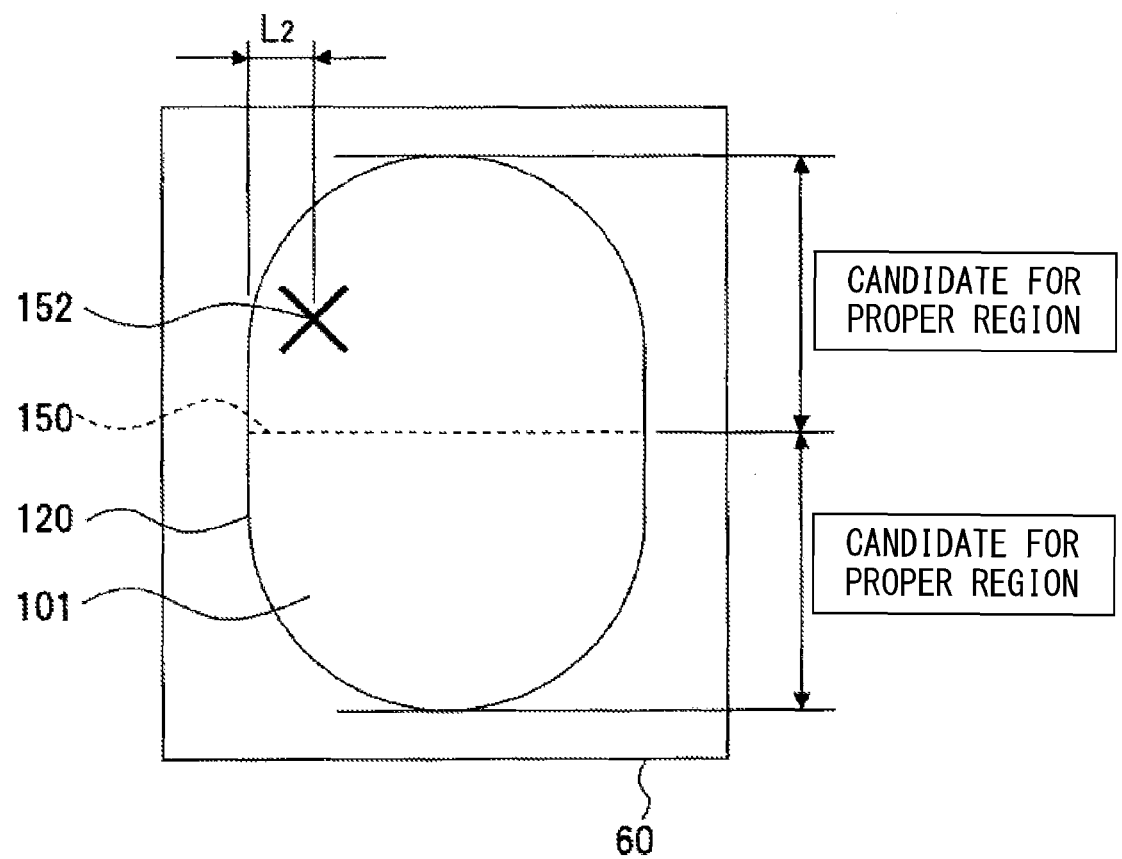
F I G. 3 5

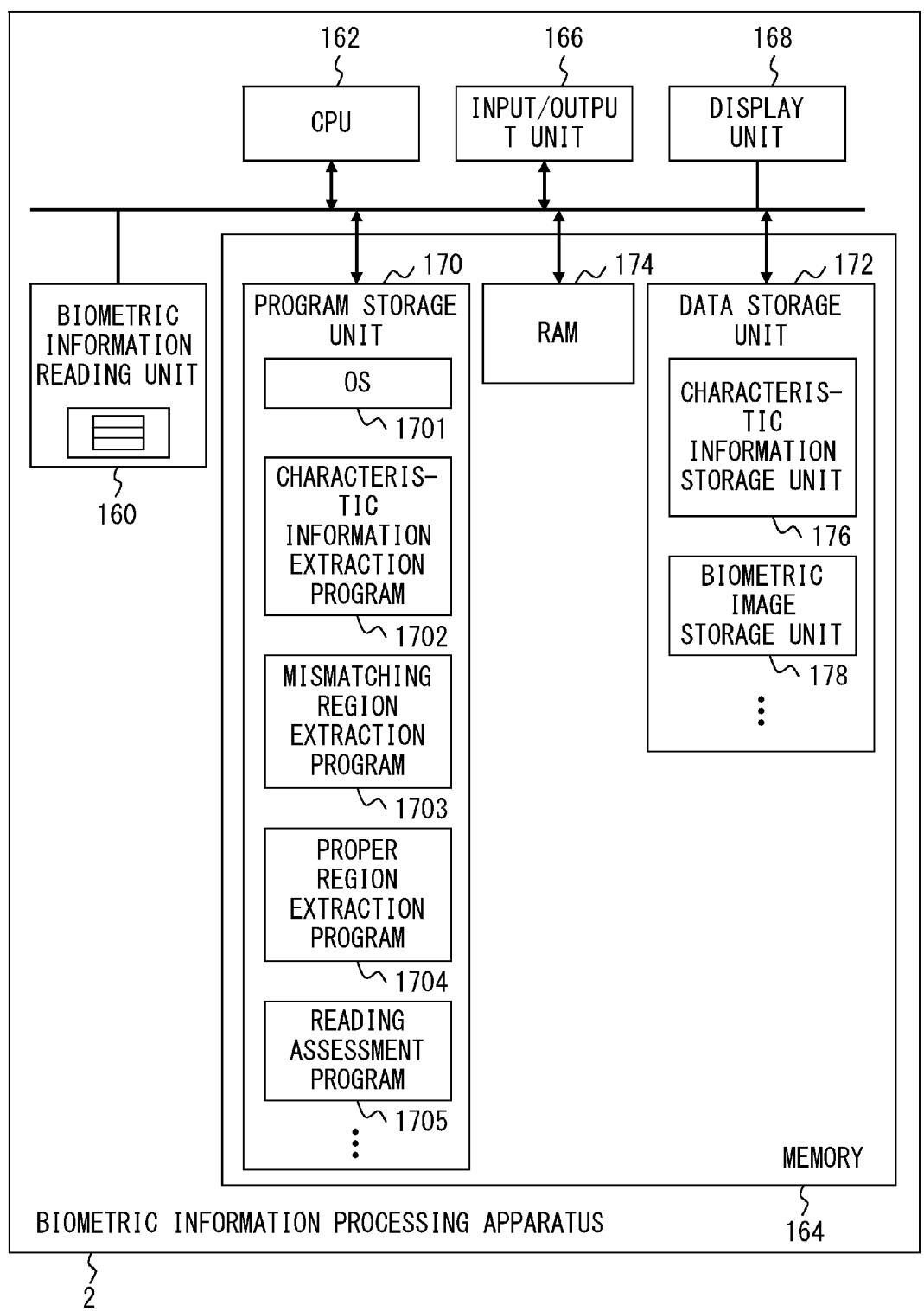
F I G. 37

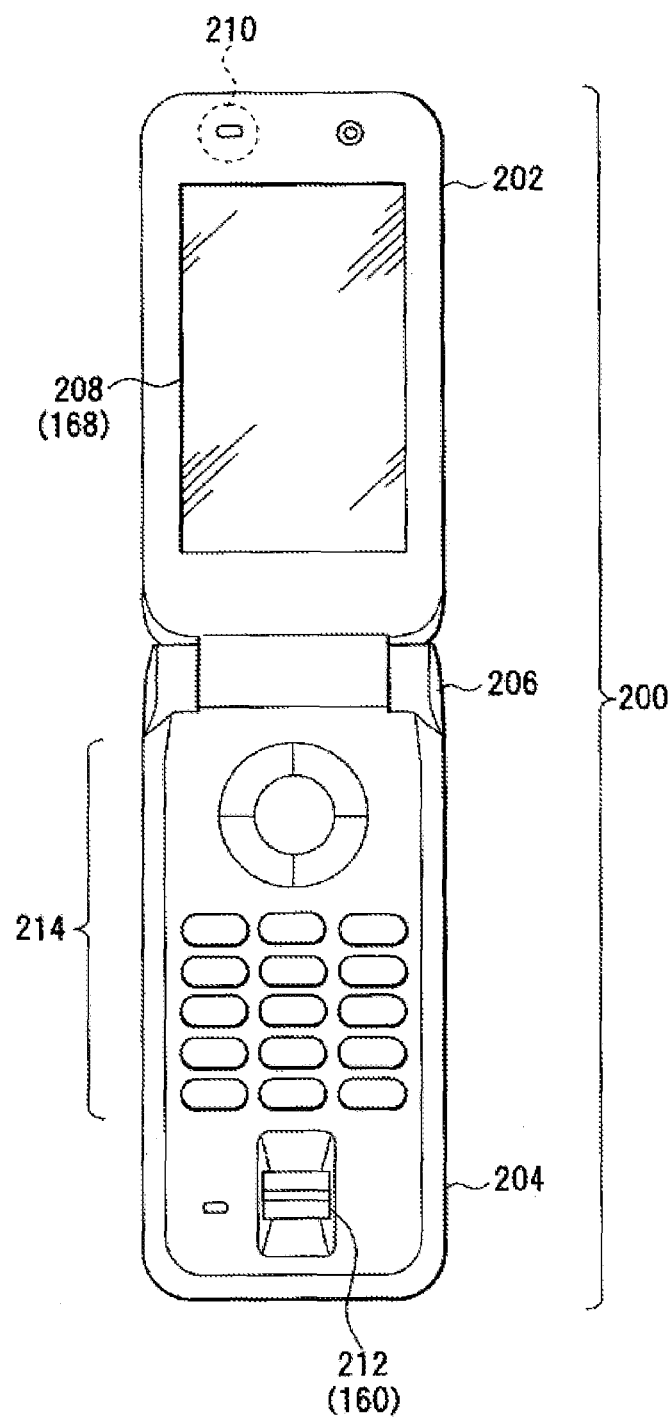
F I G. 4 2

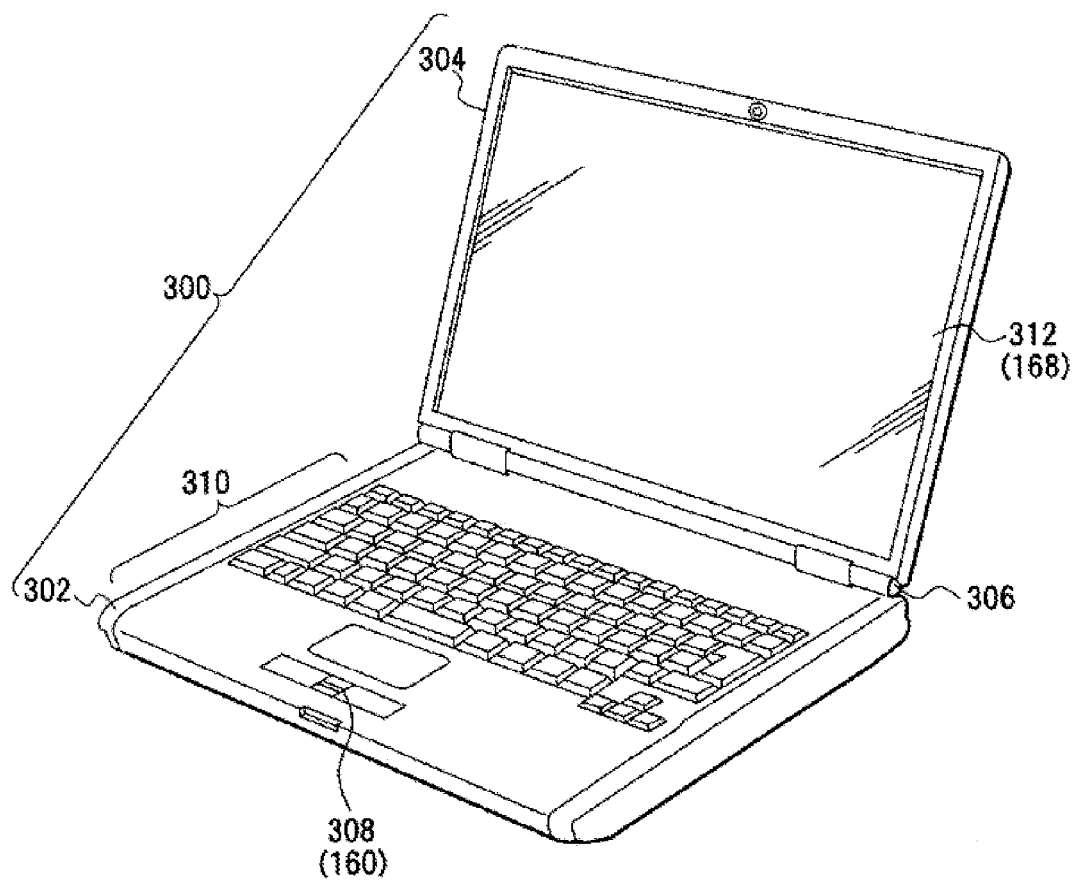
F I G. 43

BIOMETRIC INFORMATION PROCESSING APPARATUS, METHOD, AND RECORDING MEDIUM

CROSS-REFERENCE TO RELATED APPLICATION

This application is a continuation of Internation Application PCT/JP2010/051166 filed on Jan. 28, 2010 and designated the U.S., the entire contents of which are incorporated herein by reference.

FIELD

The embodiments discussed herein are related to a process of synthetically combining a plurality of partial images that are obtained by successively capturing a finger or the like of a living body, and relates to a biometricbiometric information processing apparatus, a biometric information processing method, and a biometric information processing program, each of which process an image for identification by extracting, for example, an identifiable region from the combined image.

BACKGROUND

As a security feature of information-processing equipments or the like, personal identification with the use of biometric information (biometrics) is known. In such personal identification, biometric information such as an image of the fingerprint or the like of a person to be identified is captured, and the characteristic information of the fingerprint is verified by using the captured image, thereby authenticating whether the person to be identified is truly him or her.

Biometric information is captured by a sensor such as a flat-type fingerprint sensor. Such a sensor is provided with, for example, a sensor plane (extracting plane) that is larger than a finger whose fingerprint is to be extracted, and biometric information may be captured by one or a few times of capturing processes.

However, as information-processing equipments having an identification function are downsized and compact information-processing equipments such as a mobile phone or a PDA (Personal Digital Assistant) are laden with such an identification function, it has become difficult to load such a large sensor as mentioned above. Hence, there are some techniques in which a sensor plane is made smaller than a finger and several partial biometric images successively extracted by that sensor plane are integrated to reconstruct a fingerprint image of the whole finger.

Such fingerprint sensors extract successive partial images by making finger move with reference to a sensor plane or by moving the sensor plane with reference to the finger, and such fingerprint sensors are referred to as, so called, sweep-type, slide-type, or swipe-type sensors.

As such a biometric information reading sensor, a technique in which a finger is slid with reference to a sensor and the image of a fingerprint is reconstructed from partial images of the captured biometric information (for example, see Patent Document 1), or the feature of providing an array of capacitive detecting elements for scanning fingerprint detection (see Patent Document 2) is known.

Regarding the process of combining partial images, a technique in which the amount of movement or the positions of movement of a finger are estimated from differences in the images obtained by sensors, thereby combining images to prevent a fingerprint image from expanding (see Patent Document 3), or a technique in which distortion is corrected according to the change in the moving speed of a finger (see Patent Document 4) is known.

Moreover, a technique is known in which a characteristic shape is extracted from partial images of a fingerprint, and partial images are combined according to the amount of movement of the images, which is detected from the consistency in the characteristic shape of temporally adjacent partial images (see Patent Document 5).

A technique is known in which an edge of the input fingerprint image is detected, and when the detected edge is largely different from specification values in which the values of edges are predetermined, a person who inputted the fingerprint image is notified of the elements to be corrected and is asked to input the fingerprint image again (see Patent Document 6).

Moreover, a technique is known in which the image quality of the obtained data of a fingerprint image is analyzed, and when the quality is poor, the reason why the quality is poor and the countermeasures are analyzed and the assessment results are announced visually or acoustically (see Patent Document 7).

Patent Document 1: Japanese Laid-open Patent Publication No. 10-091769
Patent Document 2: Japanese Laid-open Patent Publication No. 11-253428
Patent Document 3: Japanese Laid-open Patent Publication No. 2009-003564
Patent Document 4: Japanese Laid-open Patent Publication No. 2002-216116
Patent Document 5: Japanese Laid-open Patent Publication No. 2003-248820
Patent Document 6: Japanese Laid-open Patent Publication No. 2005-143890
Patent Document 7: Japanese Laid-open Patent Publication No. 2007-097842

SUMMARY

In order to achieve the object discussed above, a biometric information processing apparatus according to the present disclosure includes: a biometric image obtaining unit; a mismatching region extracting unit; and a proper region extracting unit. The biometric image obtaining unit obtains a biometric image formed by combining a plurality of successively captured images from a living body that moves relative to reading device. The mismatching region extracting unit extracts a mismatching region from the biometric image by using capturing characteristic information of the successively captured images. The proper region extracting unit extracts a proper region suitable for identification from the biometric image by using the mismatching region extracted from the biometric image.

In order to achieve the object discussed above, a biometric information processing method according to the present disclosure includes: a biometric image obtaining step; a mismatching region extracting step; and a proper region extracting step. In the biometric image obtaining step, a biometric image is obtained by combining a plurality of successively captured images from a living body that moves relative to reading device is obtained. In the mismatching region extracting step, a mismatching region is extracted from the biometric image by using capturing characteristic information of the successively captured images. In the proper region extracting step, a proper region suitable for identification is extracted from the biometric image by using the mismatching region extracted from the biometric image.

In order to achieve the object discussed above, a biometric information processing program according to the present disclosure is executed on a computer that is installed in the biometric information processing apparatus, and the program includes: a biometric image capturing function; a mismatching region extracting function; and a proper region extracting function. In the biometric image capturing function, a biometric image is captured which is formed by combining a plurality of successively captured images from a living body that moves relative to reading device. In the mismatching region extracting function, a mismatching region is extracted from the biometric image by using capturing characteristic information of the successively captured images. In the proper region extracting function, a proper region suitable for identification is extracted from the biometric image by using the mismatching region extracted from the biometric image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating the functional composition of a biometric information processing apparatus according to the First Embodiment.

FIG. 4 is a flowchart illustrating the processing of a biometric image according to the Second Embodiment.

FIG. 5 is a diagram illustrating function parts of a biometric information processing apparatus according to the Third Embodiment.

FIG. 6 is a diagram illustrating an example of the functional composition of a characteristic information extracting unit and a mismatching region extracting unit.

FIG. 7 is a diagram illustrating how biometric information is input to a sweeping sensor.

FIGS. 13A and 13B are diagrams illustrating the principle for detecting shading discontinuity.

FIG. 14 is a diagram illustrating an example of the operator for calculating edge intensity.

FIGS. 15A 15B are diagrams illustrating how the state of an edge is different depending on a fingerprint site.

FIG. 18 is a flowchart illustrating the procedure for detecting shading discontinuity.

FIG. 19 is a diagram illustrating the principle for detecting discontinuity by using the tangential directions of a ridge.

FIGS. 23A and 23B are diagrams illustrating a state in which a repeating pattern appears at the ridge of the root side of a finger.

FIGS. 29A and 29B are diagrams illustrating the principle for detecting frequency.

FIG. 30 is a flowchart illustrating the processes of distortion detection.

FIGS. 33A and 33B are diagrams illustrating a state in which a proper region with reference to the fingerprint core point is extracted from the divided biometric image.

FIG. 34 is a diagram illustrating the principle for determining a candidate for a proper region.

FIG. 35 is a diagram illustrating the principle for determining a candidate for a proper region.

FIG. 37 is a diagram illustrating an example of the hardware configuration of a biometric information processing apparatus according to the Fourth Embodiment.

FIG. 42 is a diagram illustrating an example of the configuration of a mobile phone according to other embodiments.

FIG. 43 is a diagram illustrating an example of the configuration of a PC according to other embodiments.

DESCRIPTION OF EMBODIMENTS

Figure 2:
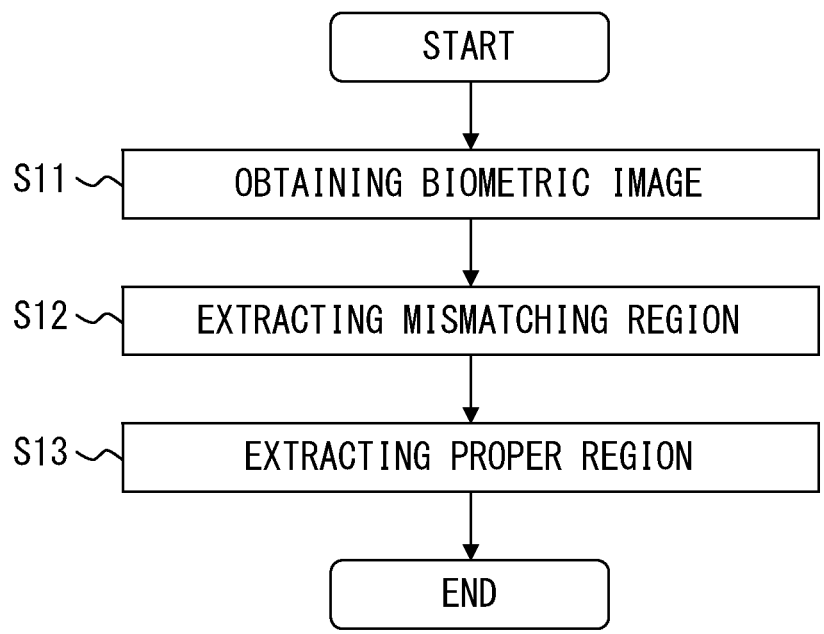
FIG. 2 is a flowchart illustrating the process of extracting a mismatching region and a proper region from the combined biometric image.

When partial images obtained by such a sweeping sensor as above are reconstructed, if the biometric information to be read has, for example, striped patterns as a fingerprint does, there is inconvenience that images may be combined at a wrong position.

For example, due to the changes in the passing speed or direction of a living body such as a finger with respect to a sensor plane, distortion is caused in the combined image, and biometric information different from the original biometric information may be read. If wrong characteristic information (branch point or endpoint of ridge) is extracted from such biometric information and used for biometric identification, the reliability of identification performance may fall due to an increase in a false rejection rate or an increase in a false acceptance rate.

Conventionally, a technique is known in which an image combined and reconstructed the at a wrong position is determined to be an image in which the biometric information is inappropriately read, but in order to perform such a judgment, it was also needed to obtain information about the relative displacement of a living body. Accordingly, it has been difficult for an identification device to judge whether the biometric information is properly combined because the identification device receives only the information of the combined image.

It is an object of a biometric information processing apparatus, a biometric information processing method, or a biometric information processing program according to the present disclosure is to improve the reliability of a biometric identification function by excluding a portion in which images are combined in a mismatching manner from the reconstructed biometric image, and by performing identification where appropriate.

According to a biometric information processing apparatus, a biometric information processing method, or a biometric information processing program according to the present disclosure, the following advantageous effects may be achieved.

(1) A mismatching region is extracted from a reconstructed biometric image, and with the use of the extracted mismatching region, a proper region is extracted. If identification is performed by using the extracted mismatching region and proper region, it becomes possible to prevent a false rejection or the like, thereby improving the reliability of biometric identification.

(2) As an identifiable proper region is extracted from a biometric image, it is not needed to input the biometric information again even if the process of combination is performed in a mismatching manner. Hence, the convenience for users is enhanced.

Other objects, features, and advantages of the present invention will be further understood by referring to the accompanying drawings and the embodiments.

First Embodiment

The First Embodiment relates to a biometric information processing apparatus that extracts a mismatching region as identification information from a biometric image formed by successively combining and reconstructing the successively obtained partial images, and that extracts a proper region to be used for identification by using the extracted mismatching region.

Figure 1:
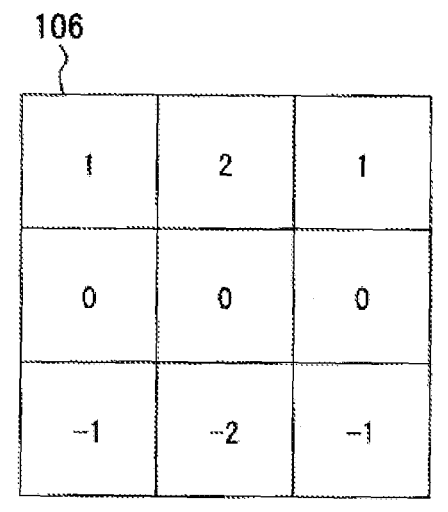

The First Embodiment will be described with reference to FIG. 1 and FIG. 2. FIG. 1 is a diagram illustrating the functional composition of a biometric information processing apparatus according to the First Embodiment, and FIG. 2 is a flowchart illustrating the procedure for extracting a mismatching region and a proper region from the combined biometric image. Note that the compositions or procedures of FIG. 1 and FIG. 2 are given by way of example, and thus the present invention is not limited to such examples.

A biometric information processing apparatus 2 is an example of the biometric information processing apparatus, biometric information processing method, and biometric information processing program according to the present disclosure, and is an example of the means for extracting a proper region that may be applied to biometric identification from a biometric image obtained by combining partial biometric images on the basis of the state of the combination.

The state of the combination on a biometric image formed by combining and reconstructing the biometric images 4 that are captured by a sweeping sensor or the like provided for the reading device is analyzed by using the capturing characteristic information of images and the characteristic information or the like of the biometric image. In this analysis, a mismatching region such as a region in which the captured biometric information is not accurately combined with reference to the original living body is extracted, or a region in which distortion is caused in the biometric information is extracted. Then, a properly combined region is extracted from the biometric image by using the extracted mismatching region.

The biometric information processing apparatus 2 analyzes the state of the combination and extracts a proper region by using the extracted mismatching region as described above, and may include, for example, a biometric image obtaining unit 6, a mismatching region extracting unit 8, or a proper region extracting unit 10.

The biometric image obtaining unit 6 is an example of the means for obtaining and reconstructing a plurality of partial biometric images, or is an example of the means for capturing a reconstructed biometric image. The biometric image obtaining unit 6 includes, for example, the above-mentioned sweeping sensor as means for reading the partial biometric image 4. The partial biometric images 4 are successively captured from a living body that moves relative to the biometric image obtaining unit 6, and the partial biometric images 4 are combined to reconstruct a biometric image.

Here, the process of combining the partial biometric image 4 is performed on the images obtained by a sweeping sensor, and may be performed, for example, on the basis of the length for which a living body that moves relative to a reading device, the relative displacement direction, or the like. For the reconstruction of a biometric image, the means disclosed in the aforementioned Patent Documents 1-6 may be used.

The mismatching region extracting unit 8 is an example of the unit of processing biometric information, which analyzes and extract a region that is in a mismatching state about the state of the combination of the reconstructed biometric image with reference to the original living body. In the extraction of a mismatching region from a biometric image, for example, a discontinuous state or a distorted state, a repeating state or the like of the biometric information, which will be described below, is used as capturing characteristic information of the partial biometric image 4. Moreover, a mismatching region may be analyzed, for example, in the relative displacement direction of a living body, or in the direction orthogonal to the direction that is considered to be the relative displacement direction with reference to a biometric image capturing device.

The proper region extracting unit 10 is an example of the unit of processing biometric information, which extracts a proper region usable for identification from the combined and reconstructed biometric image on the basis of the extracted mismatching region. For example, a candidate for a proper region may be extracted by excluding the mismatching region extracted from the biometric image. Then, a proper region may be extracted from the candidate for a proper region on a specified condition, for example, on the condition of the size of identifiable biometric information (for example, the number of pixels) or the like. The number of the proper regions to be extracted is not limited to one, but several proper regions may be extracted, for example, depending on the size of the mismatching region or the like.

Then, the extracted information of a proper region is transmitted, for example, to the biometric identification unit 12 side, and an identification process is performed.

Next, the extraction of a mismatching region from a biometric image and the process of extracting a proper region will be described with reference to FIG. 2.

This extracting process is an example of the biometric information processing method and biometric information processing program, where the partial biometric images 4 are reconstructed to obtain a biometric image and a mismatching region is extracted from the obtained biometric image, and a proper region is extracted from the extracted mismatching region, as described above. The extraction procedure includes a biometric image obtaining function (step S11), a mismatching region extracting function (step S12), and a proper region extracting function (step S13).

In the process of obtaining a biometric image, plurality of the partial biometric images 4 are captured to reconstruct a biometric image (step S11). Then, a mismatching region is extracted from the combined biometric image (step S12). In the process of extracting a mismatching region, if the biometric information is fingerprint information and the result of combining the successively captured images is a fingerprint, biometric image may be analyzed by using the direction of the ridge or the interval information of the ridges. Characteristic information such as the edge of ridge of a fingerprint or the minutia of a branch point may also be used. Moreover, in order to obtain capturing characteristic information of the partial biometric image 4, for example, the amount of change in the tangential angle of the ridge of a fingerprint may be detected, or the distortion may be detected by using a frequency. Such an analysis may be performed on the entire region of a biometric image, or may be separately performed on a specified unit of pixels.

In the analysis, a candidate for a region in which biometric information is discontinuous, a region in which there is distortion, or a region in which there are repeating similar images is extracted from a biometric image. In this processing, all of the analysis of a discontinuous state, the analysis of a distorted state, and the analysis of a repeating state may be performed, or alternatively, one of or a combination of these analyses may be performed.

The process of extracting a mismatching region is followed by the process of extracting a biometric image (step S13). In this process, a proper region is extracted by excluding the extracted mismatching region from a biometric image.

The extracted mismatching region information or the extracted proper region information may be, for example, transmitted to the biometric identification unit 12 side so as to be used for the process of biometric identification, or may be stored in storage unit.

According to this configuration, false rejection or false acceptance may be prevented by extracting a mismatching region from the reconstructed biometric image and by extracting a proper region with the use of the extracted mismatching region, and thus the reliability of biometric identification may be improved. Even if partial biometric images are combined in a mismatching manner, as long as an identifiable proper region is extracted, it is not needed to input biometric information again, thereby enhancing the convenience for users.

Second Embodiment

In the Second Embodiment, in addition to the configuration described in the First Embodiment, a determination process is performed on whether or not an extracted proper region is applicable for identification.

Figure 3:
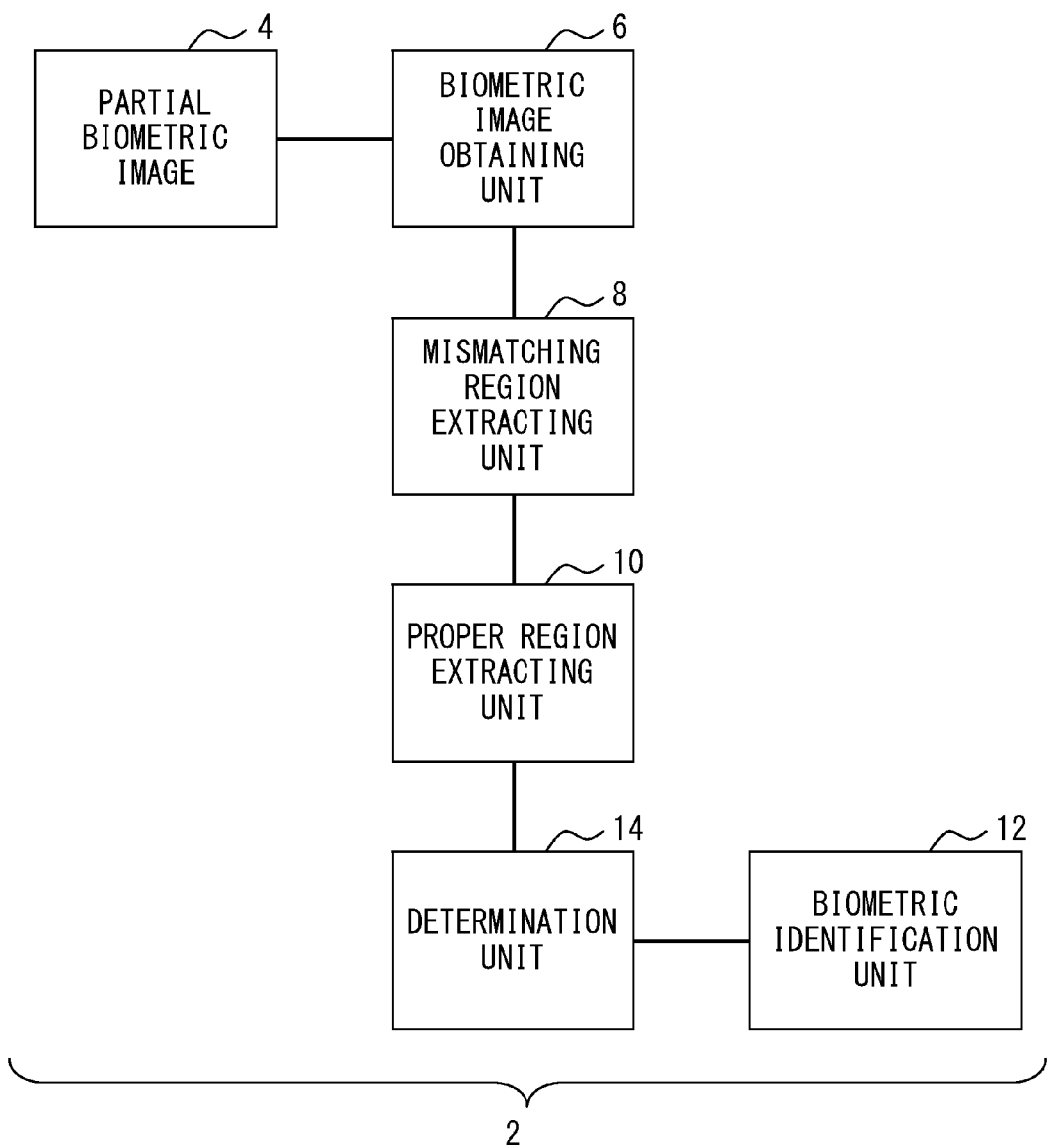
FIG. 3 is a diagram illustrating the functional composition of a biometric information processing apparatus according to the Second Embodiment.

The Second Embodiment will be described with reference to FIG. 3 and FIG. 4. FIG. 3 is a diagram illustrating the functional composition of a biometric information processing apparatus according to the Second Embodiment, and FIG. 4 is a flowchart illustrating the processing of a biometric image according to the Second Embodiment. The composition, procedure, or the like of FIG. 3 and FIG. 4 is illustrated by way of example, and thus the present invention is not limited to such an example. In FIG. 3 and FIG. 4, the description of the configuration or process similar to that of FIG. 1 and FIG. 2 will be omitted.

In contrast to the First Embodiment, the biometric information processing apparatus 2 is an example of the configuration of a biometric information processing apparatus, a biometric information processing method and a biometric information processing program according to the present disclosure, and is configured to determine whether or not the extracted proper region may be used for identification. For this reason, this biometric information processing apparatus 2 includes, for example, a determination unit 14 in addition to the above-mentioned biometric image obtaining unit 6, mismatching region extracting unit 8, and proper region extracting unit 10.

The determination unit 14 is an example of the means for assessing the reading status of biometric information, and the determination unit 14 determines, for example, whether the proper region extracted from a biometric image satisfies the conditions for performing identification by the biometric identification unit 12. In this determination, for example, the number of pixels usable for the identification of the extracted proper region or the position information of the extracted proper region in the biometric image may be determined. Then, the existence of the identifiable proper region in the obtained biometric image becomes the result of assessing the reading status of biometric information.

Alternatively, the most suitable proper region for identification may be extracted, for example, as the determination unit 14 determines whether or not the extracted candidate for a proper region satisfies a specified condition.

The processing of biometric information according to the Second Embodiment will be described with reference to FIG. 4.

This biometric information processing is an example of the biometric information processing method and the biometric information processing program, in which whether or not the extracted proper region may be used for identification is determined. In this biometric information processing, a determination processing function (step S24) is included, in addition to the aforementioned biometric image obtaining function (step S21), mismatching region extracting function (step S22), and proper region extracting function (step S23).

The biometric image obtaining function (step S21), the mismatching region extracting function (step S22), and the proper region extracting function (step S23) of FIG. 4 are performed in a similar manner to the steps S11 to S13 (FIG. 2) described in the First Embodiment.

In the determination process, whether or not the extracted proper region may be used for identification is determined (step S24). This determination process may be made, for example, on the basis of the positional relationship between a proper region and a mismatching region with reference to the biometric image, or on the basis of the number of pixels or the like of a proper region If it is determined that the extracted proper region is usable for identification ("YES" in step S24), the proper region information is transmitted to the biometric identification unit 12 side as identification information. Alternatively, the proper region information may be stored in a storage unit or the like. If it is determined that the extracted proper region is not usable for identification ("NO" in step S24), it is considered that the biometric information is not properly read. Hence, the process returns to the step S21, and it is instructed, for example, to obtain the biometric image again. In this case, a user is asked to input the biometric information again by using, for example, the display unit 168 (FIG. 37) or the like of the biometric information processing apparatus 2. Furthermore, some advice may be given about how the biometric information to be input.

According to this configuration, false rejection or false acceptance may be prevented by extracting a mismatching region from the reconstructed biometric image and extracting a proper region with the use of the extracted mismatching region, and thus the reliability of biometric identification may be improved. Moreover, the reliability of biometric identification may be improved by assessing the reading status of the reconstructed biometric image on the basis of the position or size of the extracted proper region or the like.

Third Embodiment

In the Third Embodiment, a specific example of the configuration of a biometric information processing apparatus will be described. In the biometric information processing, as described above, two or more partial biometric images are captured and a biometric image is reconstructed by combining the captured partial biometric images. Then, a mismatching region is extracted from the reconstructed biometric image, and a proper region is extracted by using the extracted mismatching region. The process of extracting a mismatching region from a biometric image is determined upon analyzing, for example, discontinuous portions, repeating portions, and distorted portions of the biometric information as capturing characteristic information of the captured partial biometric images.

Figure 8A:
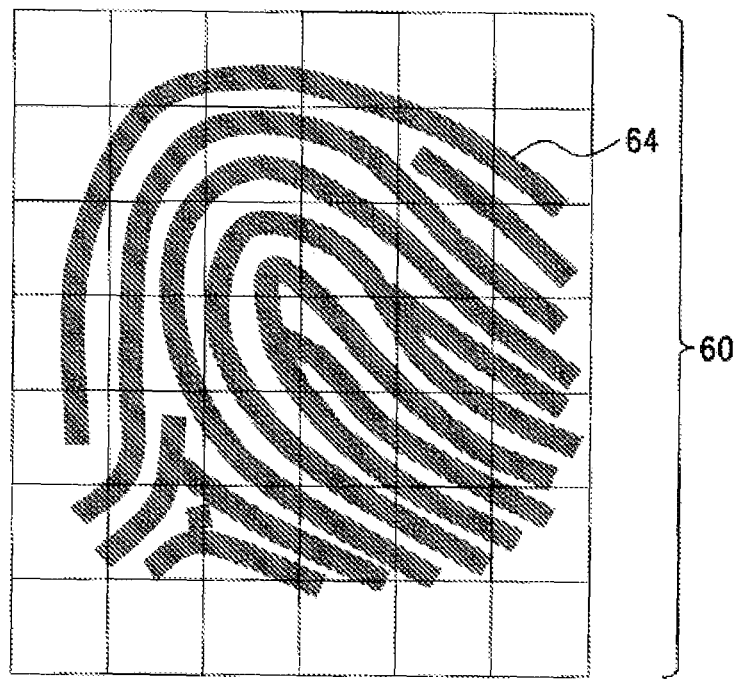
FIGS. 8A and 8B are diagrams illustrating the detection of ridge directions.
Figure 8B:
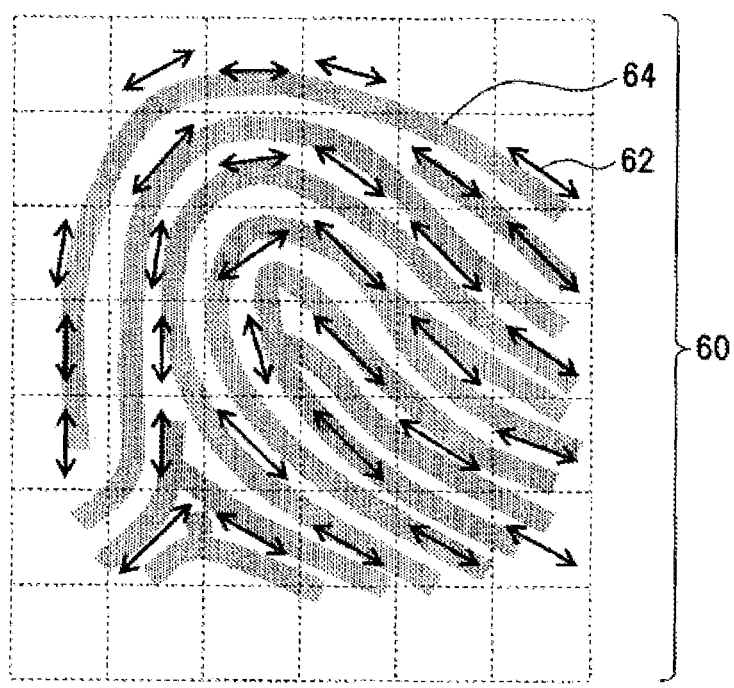
Figure 9:
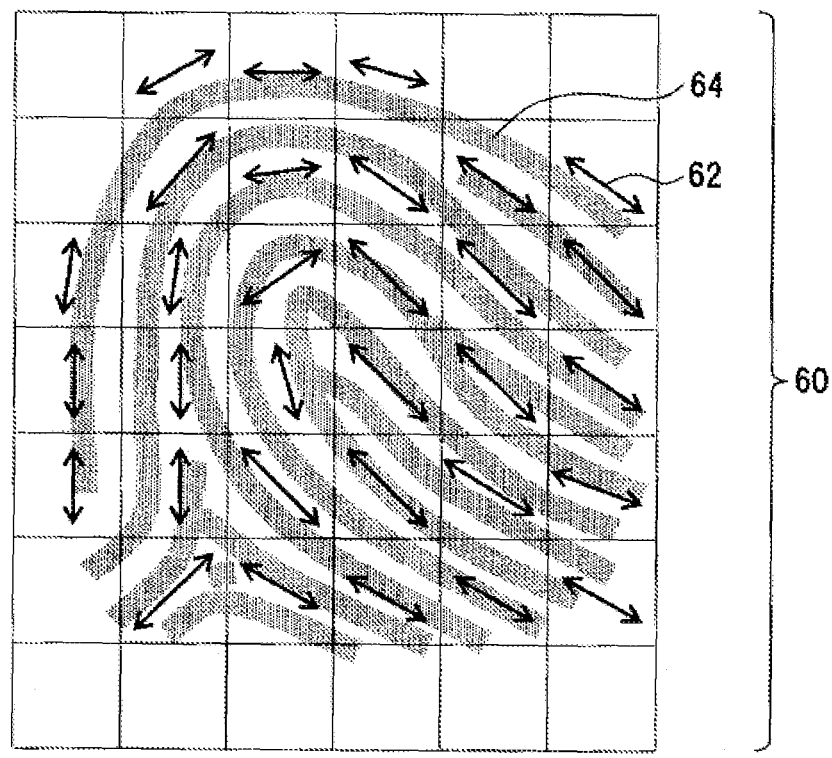
FIG. 9 is a diagram illustrating an example of ridge information and ridge direction information.

The Third Embodiment will be described with reference to FIG. 5, FIG. 6, FIG. 7, FIGS. 8A and 8B, and FIG. 9. FIG. 5 is a diagram illustrating function parts of a biometric information processing apparatus. FIG. 6 is a diagram illustrating an example of the functional composition of a characteristic information extracting unit and a mismatching region extracting unit. FIG. 7 is a diagram illustrating how biometric information is input to a sweeping sensor. FIGS. 8A and 8B are diagrams illustrating the detection of ridge directions. FIG. 9 is a diagram illustrating an example of ridge direction information and ridge direction information. The composition of FIG. 5, FIG. 6, FIG. 7, FIGS. 8A and 8B, and FIG. 9 is illustrated by way of example, and thus the present invention is not limited to such examples. Note that the description of the configurations similar to those of the First and Second Embodiments will be omitted.

The biometric information processing apparatus 2 is an example of the biometric information processing apparatus, the biometric information processing method, and the biometric information processing program of the present disclosure, and the biometric information processing apparatus 2 configures, for example, a biometric identification apparatus. In the analysis of a mismatching region of the combined biometric image, for example, the characteristic information extracted from the biometric image is used. Then, in the process of extracting a mismatching region, an image is analyzed that contains a discontinuous ridge, a discontinuous frequency, a shading discontinuity, a repeating pattern or the like, which are capturing characteristic information of the captured partial images. Note that the biometric information used herein indicates, for example, the information of the fingerprint of a living body.

As illustrated in FIG. 5, the biometric information processing apparatus 2 includes a characteristic information extracting unit 18, in addition to the biometric image obtaining unit 6, the mismatching region extracting unit 8, the proper region extracting unit 10, the determination unit 14, and the identification unit 16. Moreover, the mismatching region extracting unit 8 includes, for example, a discontinuous ridge detection unit 20, a discontinuous frequency detection unit 22, a shading discontinuity detection unit 24, and a repeating pattern detection unit 26. These function parts are realized by computer processing.

The characteristic information extracting unit 18 is means for analyzing and extracting the characteristic information of a living body obtained from the reconstructed biometric image or from a partial biometric image. As such characteristic information, for example, the ridge direction information, fingerprint core point information, minutia information, ridge interval information of a fingerprint may be extracted. By using such characteristic information, a mismatching region is extracted from the reconstructed biometric image.

The extraction of such characteristic information may be performed in a similar manner to the extraction of the characteristic information of biometric information that is used for an identification process, and biometric identification may be performed, for example, by using the hereby obtained characteristic information.

The discontinuous ridge detection unit 20 is an example of the function part that extracts a mismatching region by using the extracted characteristic information. The discontinuous ridge detection unit 20 includes, for example, a ridge direction discontinuity detection unit 28, and analyzes a portion in which the ridges of a biometric image are combined in a discontinuous manner. The ridge direction discontinuity detection unit 28 predicts specified ridge directions on the basis of, for example, the ridge direction information, the displacement information of the tangent of a ridge, or the like, and detects discontinuity by comparing the detected directions with the ridge directions of the biometric image.

The discontinuous frequency detection unit 22 analyzes, for example, the interval information of adjacent ridges of a fingerprint or the interval information between a ridge and a valley line as a frequency, and is means for detecting the discontinuity in the frequency that is linearly distributed on the biometric image. In this frequency discontinuity detection, the distortion of a biometric image, which is caused due to the change in the passing speed of a living body with reference to the reading device or the like, is detected.

The shading discontinuity detection unit 24 is an example of the function part that detects the discontinuous portions of ridges. The shading discontinuity detection unit 24 calculates, for example, the intensity of a pixel that indicates the portion where the shading of the ridge of a biometric image is changed, and detects the displacement of a ridge with reference to the relative displacement direction of a living body. Then, a region in which the values of the intensities of the ridges of a pixel are discontinuous is detected as a mismatching region from the detection region set in the orthogonal direction with reference to the relative displacement direction of a living body.

The repeating pattern detection unit 26 is an example of the means for detecting a region in which the partial biometric images captured from the same site of a living body are repeatedly combined, and the repeating pattern detection unit 26 includes a same ridge direction site detection unit 30. The same ridge direction site detection unit 30 is means for detecting, for example, a site in which a specified region whose ridge directions of the biometric image are the same, is continuously combined in a straight line. By so doing, a region in which, for example, regions whose ridge directions are the same are adjacently distributed in parallel is detected as a repeating pattern that indicates a mismatching portion caused in the combining process.

Furthermore, the biometric information processing apparatus 2 according to the present embodiment is provided with a characteristic information extracting unit 18 and a mismatching region extracting unit 8, as illustrated in FIG. 6.

The characteristic information extracting unit 18 is a function part that receives the provision of the biometric image obtained by the aforementioned biometric image obtaining unit 6, and extracts characteristic information from the received biometric image. The characteristic information extracting unit 18 includes, for example, a ridge direction detection unit 50, a fingerprint core point detection unit 52, a minutia detection unit 54, and an interval detection unit 56.

In such cases, the biometric image obtaining unit 6 includes a sweeping sensor 40, which is illustrated in FIG. 7, as means for obtaining a plurality of partial biometric images 4, and the biometric image obtaining unit 6 combines the partial fingerprint images that are obtained as a user slides a finger 42, thereby reconstructing a fingerprint image.

The ridge direction detection unit 50 is means for detecting ridge directions from a biometric image. In the detection of ridge directions, as illustrated in FIGS. 8A and 8B for example, a fingerprint image 60 is divided into specified small regions (FIG. 8A). Moreover, processing such as binarization is performed, and image processing is performed by a directional filter or the like. By so doing, ridge directions are obtained the ridge directions 62 (FIG. 8B). The ridge directions 62 and ridges 64 of the fingerprint image 60 are illustrated in FIG. 9. In the detection of ridge directions as described above, for example, the method disclosed in Japanese Laid-open Patent Publication No. 05-242227 may be used.

The fingerprint core point detection unit 52 is means for detecting the core point of a fingerprint from the combined fingerprint image 60. Regarding the detection of the core point of a fingerprint, for example, a method is known for obtaining the curvature of a fingerprint pattern on each position of the fingerprint image and obtaining the point at which the curvature becomes largest. A method for detecting singularity by using a Poincare index, which is disclosed, for example, in "D. Maltoni et al., [Handbook of Fingerprint Recognition], Springer Science, p. 100" or "M. Kawagoe and A. Tojo, Fingerprint Pattern Classification, Pattern Recognition, Vol. 17, No. 3, pp. 295-303, 1984." may be used.

The interval detection unit 56 is means for detecting interval information of the combined fingerprint image among ridges, among valley lines, or between a ridge and a valley line.

The mismatching region extracting unit 8 includes, for example, a discontinuity detection unit 70, a repetition detection unit 72, and a distortion detection unit 74.

The discontinuity detection unit 70 is an example of the means for detecting the discontinuous portions of a ridge as a mismatching region, and the discontinuity detection unit 70 corresponds to the aforementioned discontinuous ridge detection unit 20 and shading discontinuity detection unit 24. The discontinuity detection unit 70 includes a discontinuity candidate point detection unit 76, a straight line detection unit 78, and a discontinuity determination unit 80.

Figure 10:
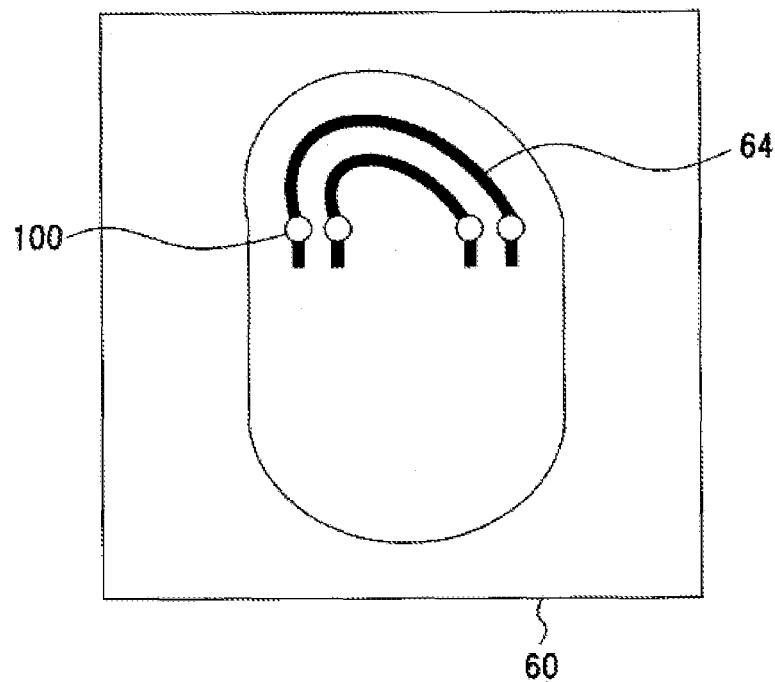
FIG. 10 is a diagram illustrating the discontinuous state of a ridge.

The discontinuity candidate point detection unit 76 is means for detecting, for example, a discontinuous point for every ridge by analyzing the ridge direction information and the shading information. As illustrated in FIG. 10, a discontinuity candidate point 100 is where discontinuity of ridges is caused due to the displacement in the image combining process, and several discontinuity candidate points 100 appear in the horizontal direction with reference to the fingerprint image 60.

The straight line detection unit 78 is means for detecting whether or not the discontinuity candidate point 100 is present in a straight line. In other words, the fingerprint image 60 is formed by combining the partial biometric images 4 along the relative displacement direction of a living body. Accordingly, discontinuous portions for adjacent ridges appear on a straight line in the orthogonal direction with reference to the relative displacement direction of a living body.

The discontinuity determination unit 80 is an example of the means for determining whether discontinuity is produced on the basis of the detection result of the discontinuity candidate point detection unit 76 and the straight line detection unit 78. As described above, a portion at which the detected discontinuity candidate point 100 is linearly produced is determined to be a portion in which discontinuity is present.

The repetition detection unit 72 corresponds to the aforementioned repeating pattern detection unit 26, and is an example of the means for detecting a repetition on the combined biometric image. Moreover, the repetition detection unit 72 includes a region dividing unit 82, a region shape estimation unit 84, and a repeatability determination unit 86.

As will be described later, the region dividing unit 82 is an example of the means in the repetition detecting process for performing a binarization process for extracting a region that may fall into a repeating state with reference to the biometric image.

Figure 25:
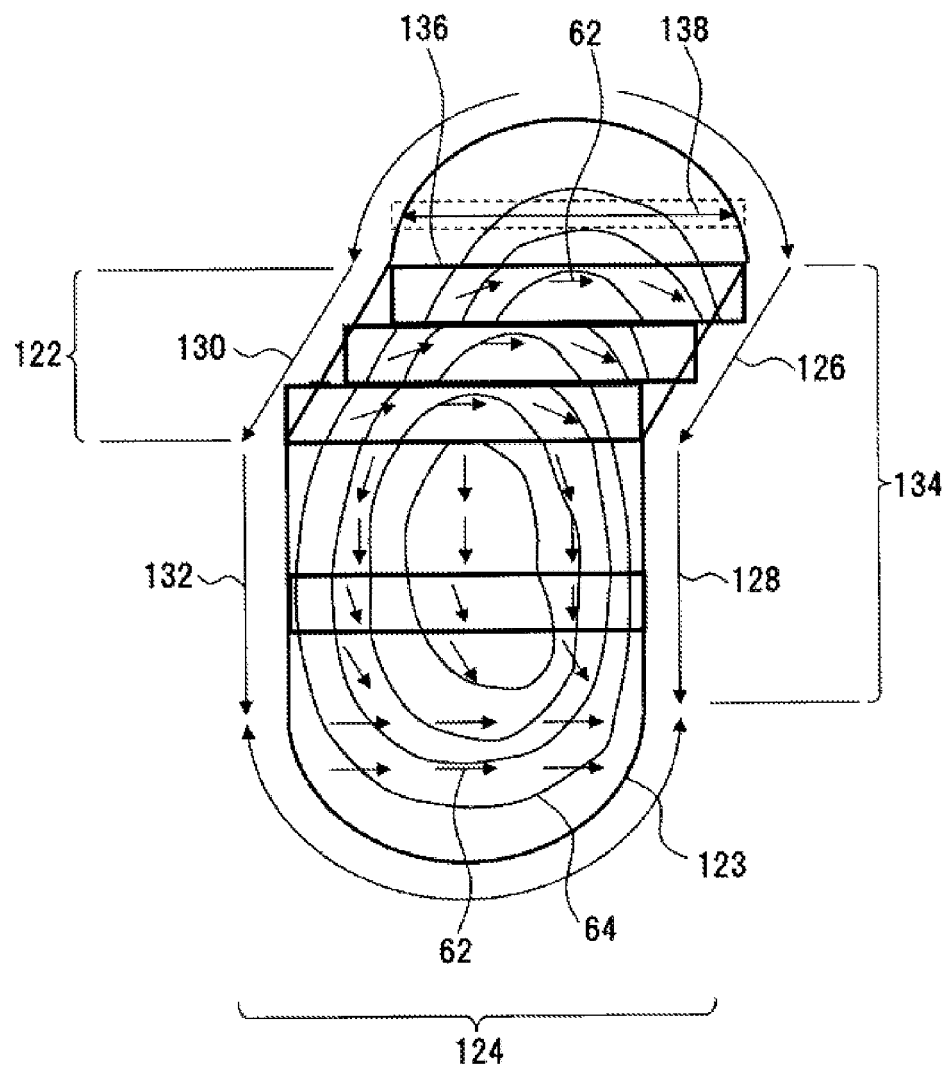
FIG. 25 is a diagram illustrating the principles for detecting a repeating pattern.

The region shape estimation unit 84 is an example of the means for detecting a difference in the contact width of a finger in the aforementioned binarized image and estimating a region that includes a candidate for a repeating pattern that may fall in a repeating state (FIG. 25).

The repeatability determination unit 86 is an example of the means for determining whether or not the aforementioned candidate for a repeating pattern is a repeating pattern by using the ridge direction information or the like.

The distortion detection unit 74 corresponds to the aforementioned discontinuous frequency detection unit 22, and the distortion detection unit 74 is means for detecting that a distorted region occurs on the reconstructed biometric image. Moreover, the distortion detection unit 74 includes, for example, a frequency calculator 88, a region dividing unit 90, and a distortion determination unit 92.

The frequency calculator 88 is means for calculating a threshold or projection information in the horizontal direction of the biometric image for the frequency that indicates the interval information of the ridges of a fingerprint in a specified region.

The region dividing unit 90 is means for dividing the distorted region into two or more regions of which the frequency is to be calculated or the distortion is to be detected.

The distortion determination unit 92 is means for detecting a distorted region in which the projection information as calculated above exceeds a specified threshold.

Next, a specific example of the analyzing process of the mismatching region extracted from the biometric image will be described. Note that cases will be described in which fingerprint information is used as biometric information in the process of extracting a mismatching region.

(1) Discontinuity Detection

Figure 11A:
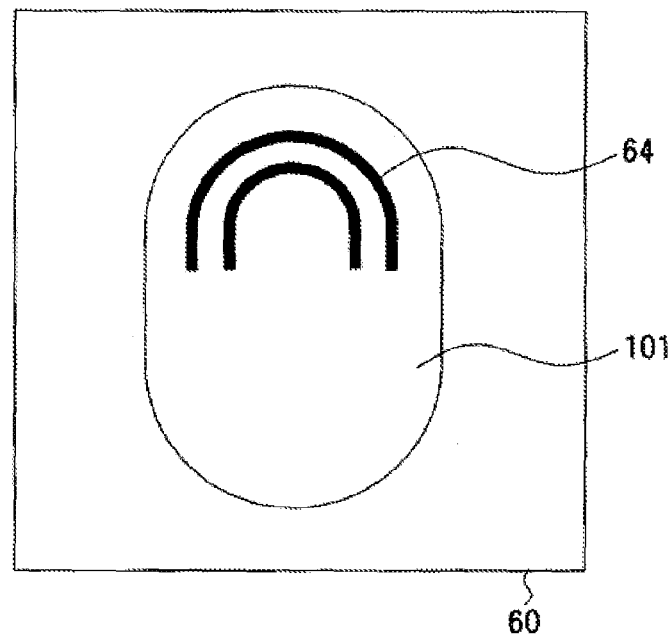
FIG. 11 are diagrams illustrating how discontinuity occurs.
Figure 11B:
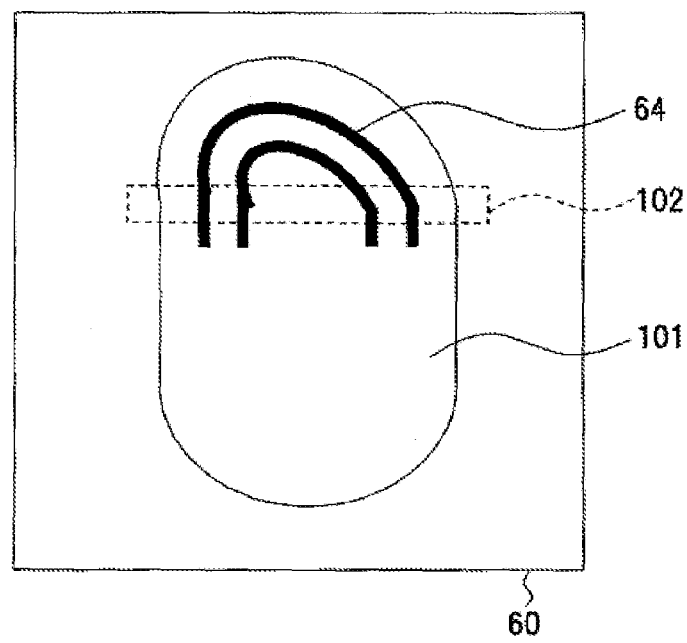
Figure 12:
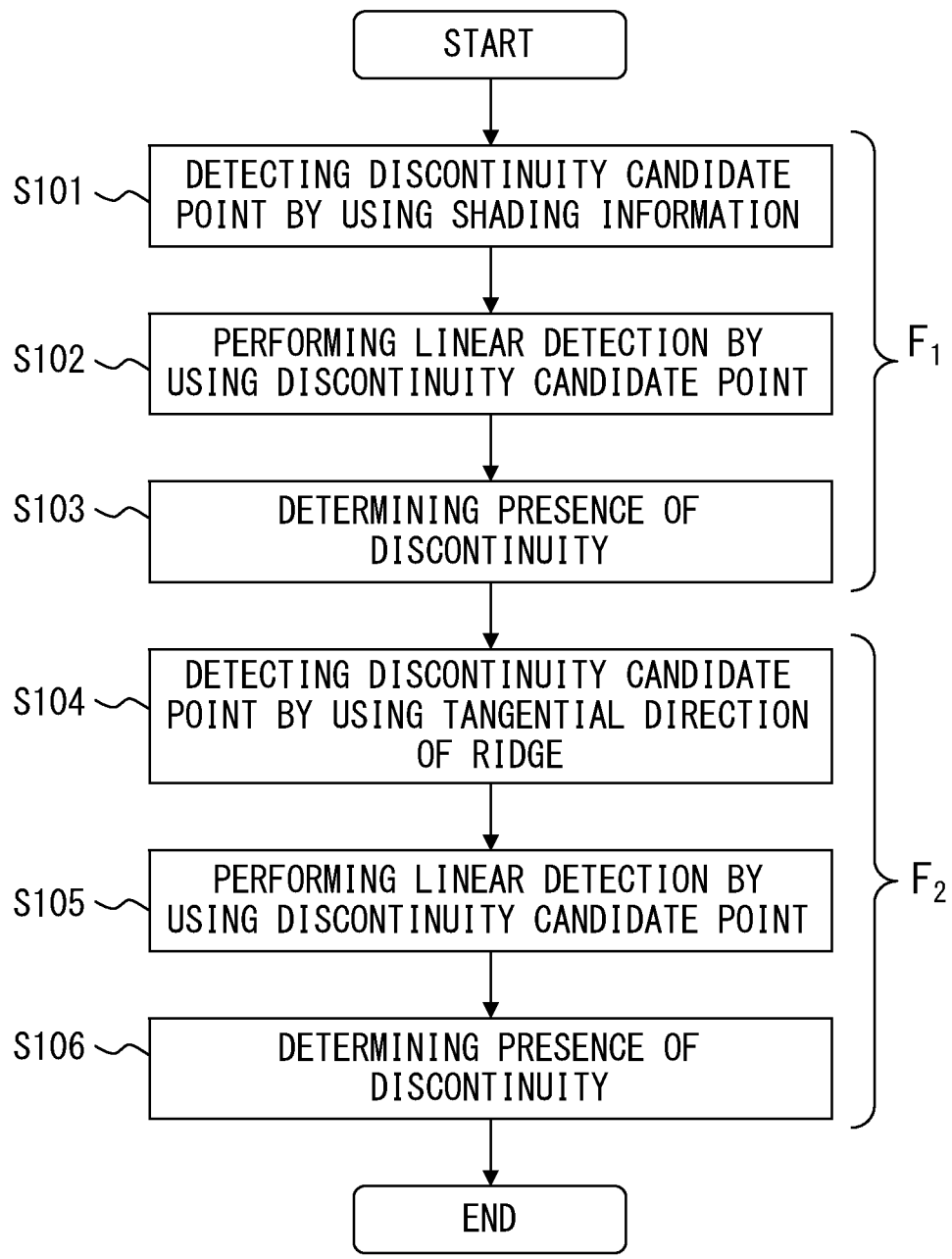
FIG. 12 is a flowchart illustrating the procedure for detecting discontinuity.
Figure 16A:
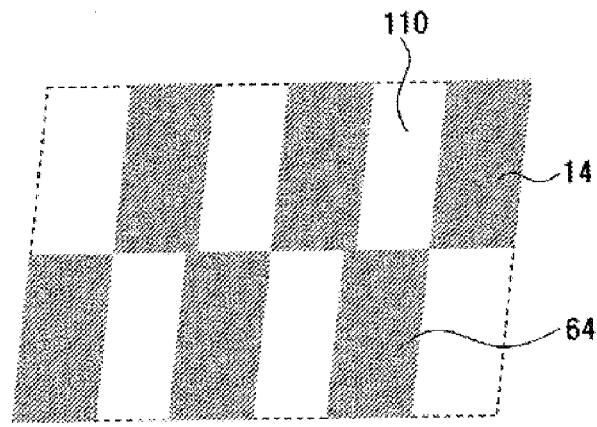
FIGS. 16A and 16B are diagrams illustrating how the edge intensity is analyzed.
Figure 16B:
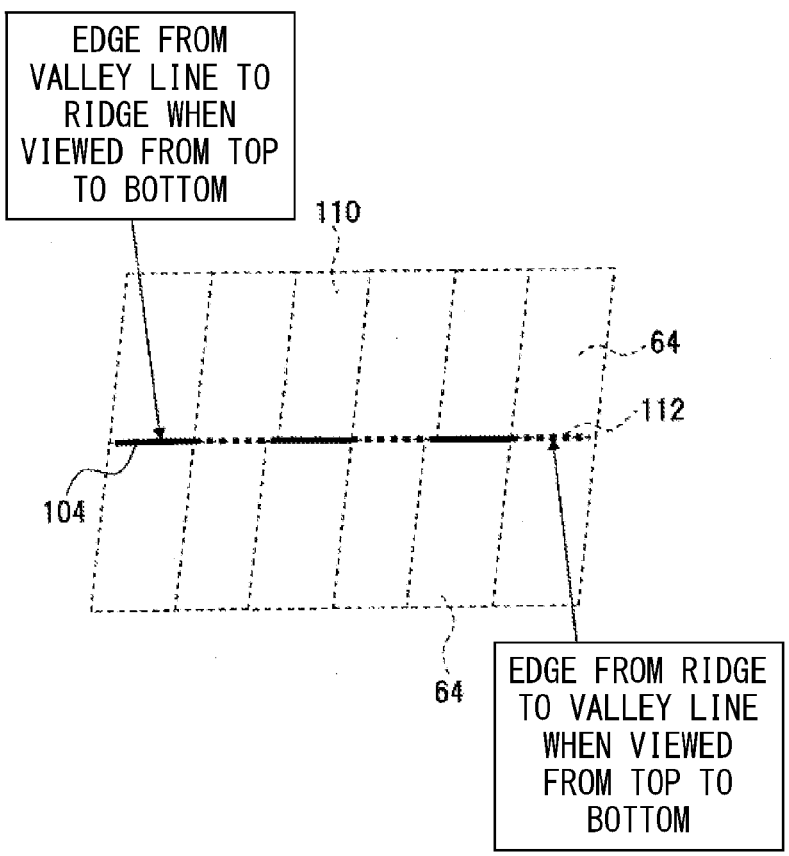
Figure 17:
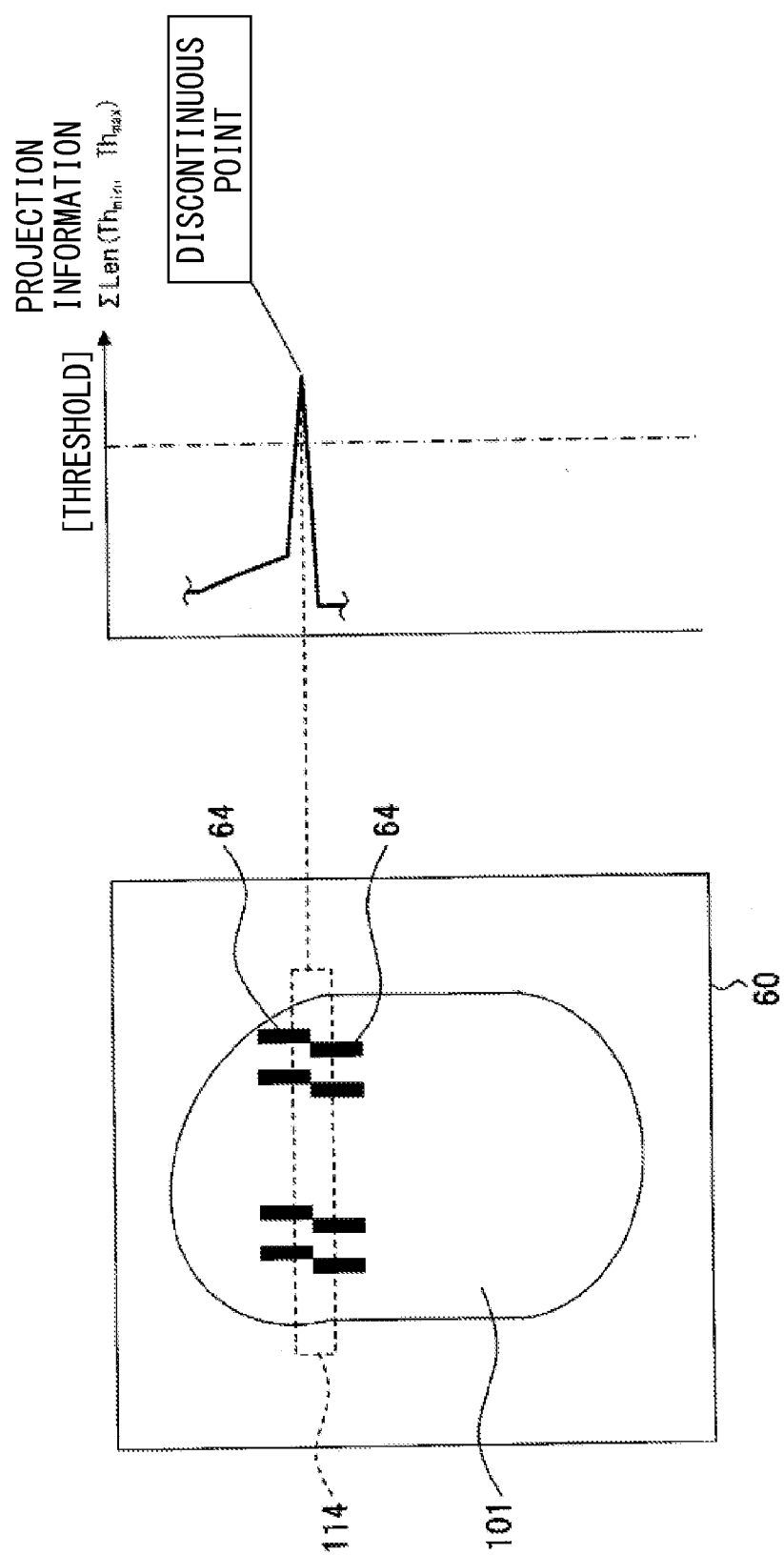
FIG. 17 is a diagram illustrating the linear analysis of discontinuous portions.
Figure 20:
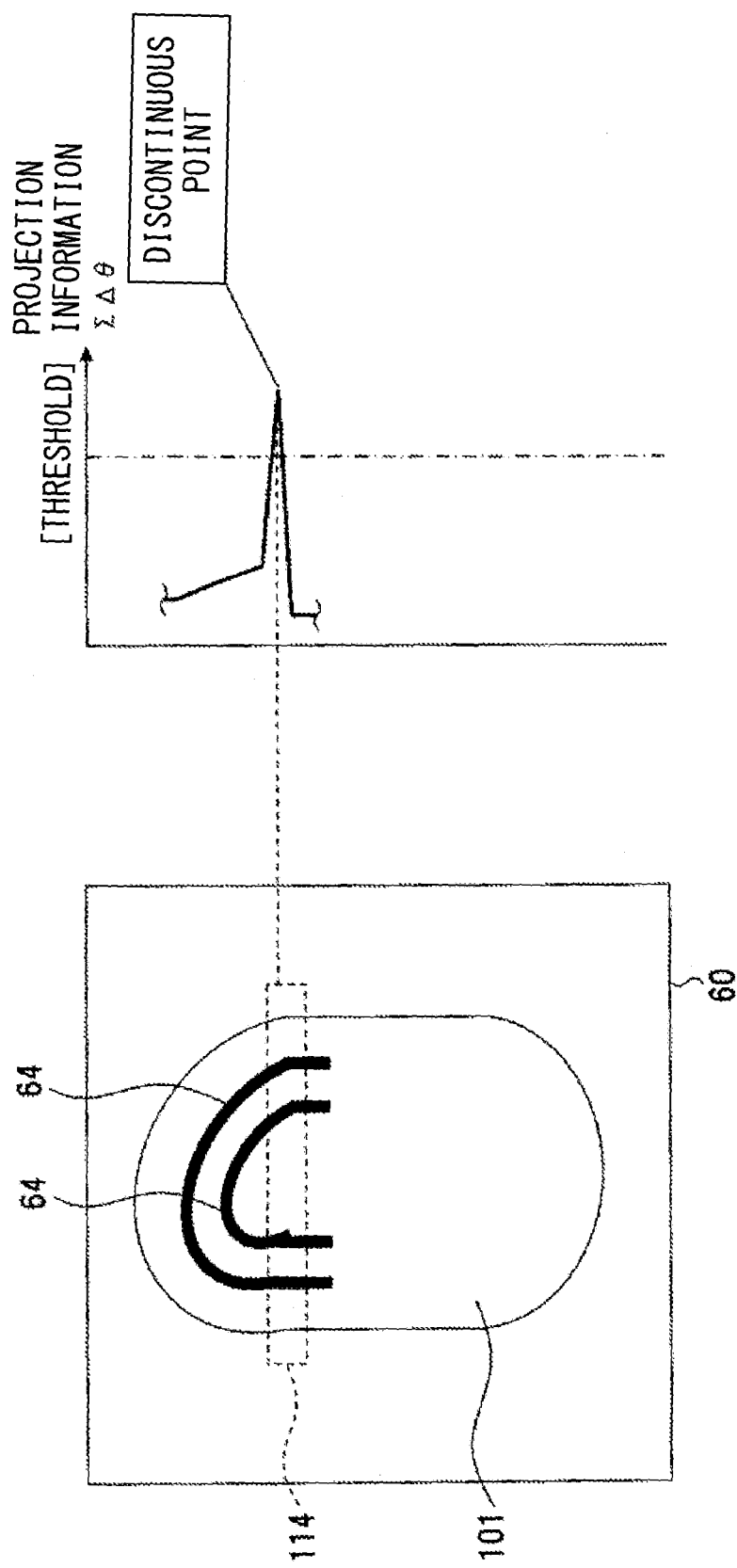
FIG. 20 is a diagram illustrating the linear analysis of discontinuous portions.
Figure 21:
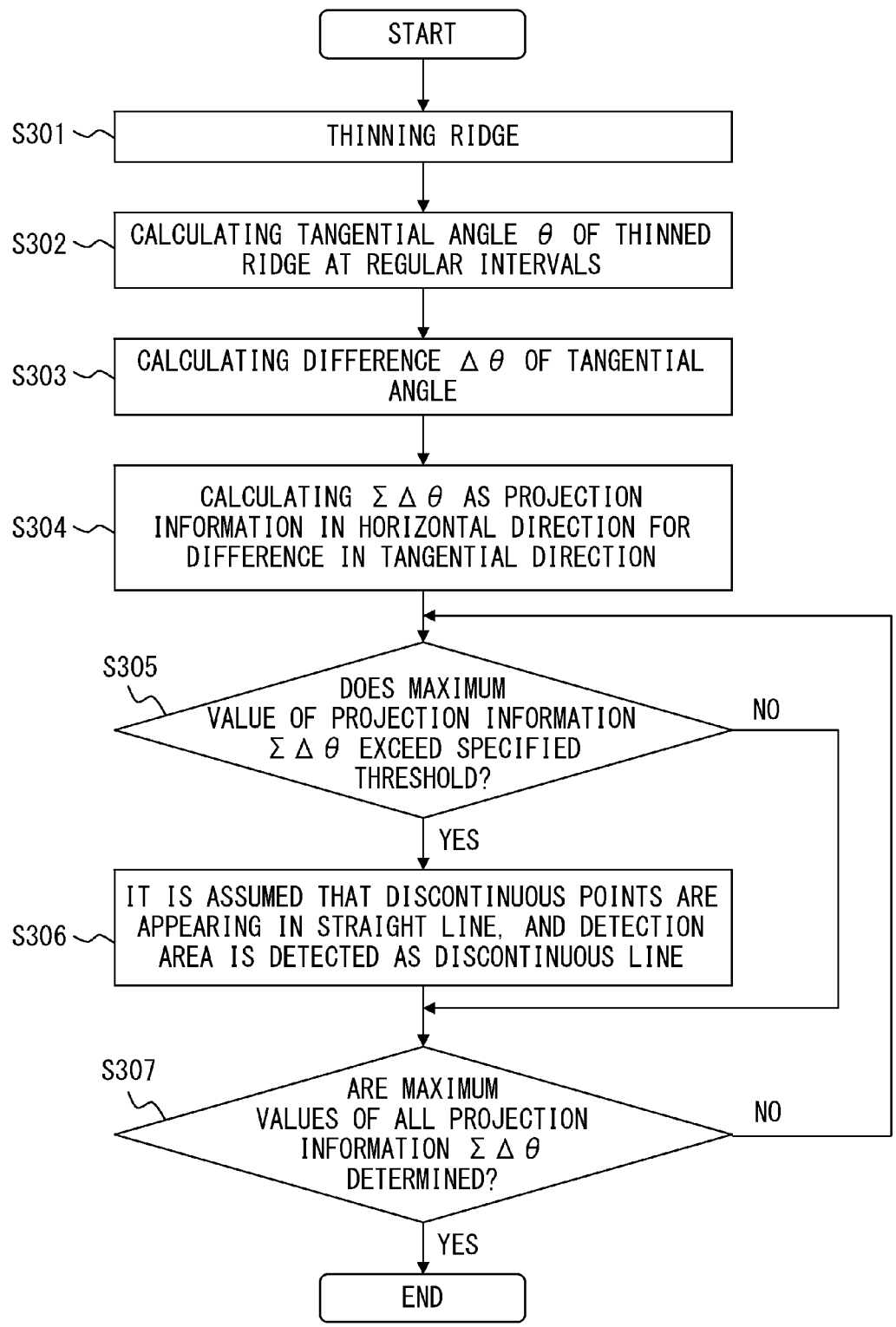
FIG. 21 is a flowchart illustrating the procedure for detecting discontinuity by using the tangential directions of a ridge.

The discontinuity detection of a biometric image will be described with reference to FIGS. 11A and 11B, FIG. 12, FIGS. 13A and 13B, FIG. 14, FIGS. 15A and 15B, FIGS. 16A and 16B, FIG. 17, FIG. 18, FIG. 19, FIGS. 20, and 21. FIGS. 11A and 11B are diagrams illustrating how discontinuity occurs. FIG. 12 is a flowchart illustrating the procedure for detecting discontinuity. FIGS. 13A and 13B are diagrams illustrating the principle for detecting shading discontinuity. FIG. 14 is a diagram illustrating an example of the operator for calculating edge intensity. FIGS. 15A and 15B are diagrams illustrating how the state of an edge is different depending on a fingerprint site. FIGS. 16A and 16B are diagrams illustrating how the edge intensity is analyzed. FIG. 17 is a diagram illustrating the linear analysis of discontinuous portions. FIG. 18 is a flowchart illustrating the procedure for detecting shading discontinuity. FIG. 19 is a diagram illustrating the principle for detecting discontinuity by using the tangential directions of a ridge. FIG. 20 is a diagram illustrating the linear analysis of discontinuous portions. FIG. 21 is a flowchart illustrating the procedure for detecting discontinuity by using the tangential directions of a ridge. The composition, processes, procedure, or the like of FIGS. 11 to 21 are illustrated by way of example, and thus the present invention is not limited to such examples.

In the fingerprint image 60 in which the obtained images are discontinuously combined, the ridge 64 is bent at some midpoint or irregularities appear, and a contact region 101 of a finger is also distorted in a similar manner. An example of the properly combined ridges is illustrated in FIG. 11A. By contrast, if a combining process is performed in a mismatching manner, as illustrated in FIG. 11B for example, an image is formed successively from discontinuous portions 102 that are combined in a mismatching manner, and thus a fingerprint is distorted. If the characteristic information extracted from such a ridge is used for biometric identification, the aforementioned bending position or the irregular portion may be misrecognized as an edge of the ridge.

For this reason, in the discontinuity detection, the continuity of the ridge 64 is analyzed to detect the discontinuous portions 102 that are illustrated in FIG. 11B. In this discontinuity detection, for example, the aforementioned shading discontinuity detection or discontinuity detection in the tangential directions of a ridge is used.

In the procedure for detecting discontinuity, as illustrated in FIG. 12 for example, after a shading discontinuity detection process F1 is performed, a discontinuity detection process F2 may be performed by using the tangential directions of a ridge.

Firstly, in the process F1, the discontinuity candidate point 100 is detected by using the shading information of the fingerprint image 60 (step S101), and then linear detection is performed by using the detected discontinuity candidate point 100 (step S102). In other words, since a discontinuous point of the ridge 64 appears in a straight line with reference to the horizontal direction of the fingerprint image 60 as illustrated in FIG. 10 and FIG. 11B, it is determined whether or not the discontinuity candidate point 100 is detected on a straight line. In this linear detection, calculation may be performed by using, for example, a Hough transform or a least squares method.

According to a detection result of the discontinuity candidate point 100 or a result of the linear detection, whether the discontinuity is present in shading is determined (step S103).

Next, in the process F2, the tangential direction of the ridge 64 is analyzed to detect the discontinuity candidate point 100 by using the displacement state of some arbitrary points (step S104), and as described above, linear detection is performed on the detected discontinuity candidate point 100 (step S105). Then, according to a detection result of the discontinuity candidate point and a linear detection result, whether the discontinuity is present is determined on the basis of the tangential direction (step S106).

Regarding the procedure of the process F1 and the process F2, only one of them may be performed.

(A) Shading Discontinuity Detection (FIGS. 13A and 13B)

In the shading discontinuity detection, for example, an edge of the ridge 64 of the fingerprint image 60, which is extracted by the characteristic information extracting unit 18, is used. As illustrated in FIGS. 13A and 13B, by using, for example, a lowpass filter or the like, edge intensity 104 where the change in shading in the relative displacement direction of a living body as the vertical direction is large is calculated from the ridges 64 that are thinned into the width of 1 pixel. The edge intensity 104 is calculated by using, for example, an operator 106 of a Sobel operator as illustrated in FIG. 14. This operator 106 is an example of the filter used in image analysis, and the operator 106 assigns a weighting factor to the gray levels of a target pixel and its adjacent pixels. In the calculation process, for example, a product-sum operation is executed by using a matrix of the operator 106 to set a new shading value.

It is determined that a pixel in which the edge intensity 104 of the fingerprint image 60 is large is an edge pixel, and that the length along which edge pixels are continuously next to each other is the edge length. Moreover, it is assumed that a portion in which edge pixels are linearly lined up in the horizontal direction of the fingerprint image 60 is a discontinuous portion.

The edge intensity 104 calculated for a discontinuous portion by using the operator 106 is detected as illustrated in FIG. 13B.

However, as illustrated in FIGS. 15A and 15B, even if there is no discontinuity as in the tip side of a finger along which the ridge 64 extends in the horizontal direction (FIG. 15A) or in the ridge 64 that slightly inclines in a slanting direction (FIG. 15B), the edge intensity 104 may be detected in the vertical direction. In other words, in the ridge 64 extending in the horizontal direction (FIG. 15A), the edge may be regarded as being extensively linked in the horizontal direction. Moreover, the ridge 64 extending in a slanting direction (FIG. 15B) may be detected as an edge portion 108 of, for example, 1 to 2 pixels in the horizontal direction. For this reason, a process capable of distinguishing these cases is needed.

Here, the determination with the use of the edge length will be described. In short, it is interpreted that the ridge 64 extending in the horizontal direction has a long edge length in the horizontal direction. Moreover, it is interpreted that the ridge 64 that slightly extends in a slanting direction has a small value, for example, 1 pixel, for the edge length in the horizontal direction. Then, an edge pixel whose edge length is within a specified threshold between $Th_{min}$ and $Th_{max}$ is detected as a candidate for a discontinuous portion.

Moreover, as illustrated in FIGS. 16A and 16B, the ridges 64 and the valley lines 110 may be alternately combined (FIG. 16A). In such cases, if the edge length is simply detected, in a similar manner to the ridge 64 that extends in the horizontal direction, long edge length is detected. As a result, if the aforementioned threshold is used, the existence of discontinuity is not detected.

In order to deal with this problem, in the detection of such long edge length, the reference sign information obtained in the calculation of edge intensity is used. In other words, a reference plane used for performing detection with reference to the fingerprint image 60 is set. For example, the reference sign of the edge intensity 104 of the border line from the valley line 110 to the ridge 64 is different from the reference sign of the edge intensity 112 of the border line in the inverse direction from the ridge 64 to the valley line 110 (FIG. 16B). Accordingly, the group of edge pixels, which belongs to the edge intensity 104 or the edge intensity 112 of the same reference sign, and which has edge length within a specified threshold between $Th_{min}$ and $Th_{max}$ is determined to be a candidate for a discontinuous portion.

Such detection of edge length is performed on the fingerprint image 60 for each specified width of a pixel in the horizontal direction.

Next, in the linear detection of a candidate for a discontinuous portion, as illustrated in FIG. 17, the detected pieces of edge length Len are used to calculate the projection information ΣLen of the edge length Len for each specified width of a pixel in the horizontal direction. Linear detection is performed, for example, for every detection area 114 that is set for specified width of a pixel in the fingerprint image 60. In this case, the reference sign of the edge intensity 104 is different from that of the edge intensity 112 as described above. Hence, in this calculation process, for example, a square process or an absolute value may be used. Then, the detection area 114 in which the projection information ΣLen of the edge length exceeds a specified threshold is detected as a discontinuous point.

The detection process of the shading discontinuity will be described with reference to FIG. 18. This process is an example of the biometric information processing method and the biometric information processing program.

The operator 106 (FIG. 14) is applied onto the fingerprint image 60 to detect the edge intensity in the vertical direction (step S201). A pixel in which the absolute value of edge intensity exceeds a specified threshold is detected as an edge pixel (step S202).

The group of edge pixels of which the reference sings of edge intensity are same and the edge length is within a specified threshold between $Th_{min}$ and $Th_{max}$ is detected from the detected edge pixels as a candidate for a discontinuous portion (step S203).

As linear detection for the detected discontinuity candidate point 100, projection information ΣLen in the horizontal direction is calculated for the length Len of the edge pixel of a candidate for a discontinuous portion (step S204).

Then, the process shifts to the process of determining whether or not the projection information ΣLen of the calculated edge pixel exceeds a specified threshold (step S205). When it exceeds ("YES" in step S205), it is assumed that discontinuous points are appearing in a straight line, and these discontinuous points are detected as discontinuous portions of the biometric image (step S206).

When the maximum value of all the projection information ΣLen are determined ("YES" in step S207), the process terminates.

The information of the detected discontinuous portions may be stored, for example, in a storage unit or the like of the biometric information processing apparatus 2.

(B) Discontinuity Detection of Ridge in Tangential Directions (FIG. 19)

In the discontinuity detection where the tangential directions of a ridge are used, as illustrated in FIG. 19 for example, the angular variation of the angle θ of the tangent S at the tangential direction detection positions P divided at specified intervals is detected from the ridge 64 on which a thinning process is performed for 1 pixel width. Accordingly, the ridge direction is predicted by using the angular variation of the tangent S, and the predicted direction is compared with the ridge direction of the biometric image. When the ridge 64 is out of a predicted range, in other words, when the tangent $S_i$ significantly changes, the ridge 64 is detected as a discontinuous point.

In the detection of the angular variation of the tangent $S_i$, the angular difference $\Delta\theta_i$ in the tangential direction is calculated, for example, among adjacent tangential direction detection positions $P_{i+1}-P_i$. As described above, analysis is performed, for example, along the tangential direction detection position P. If there is a position where the difference Δθ of the angle θ significantly changes, the detection position P including the discontinuous point X is detected as a discontinuity candidate point 116.

After the angular variation Δθ of the tangent S is detected at the tangential direction detection position P set in the ridge 64, as illustrated in FIG. 20, a linear detection process is performed. A linear detection is performed, as described above, for each of the detection area 114 of a specified width of a pixel. The fingerprint image 60 is formed by combining the partial biometric images 4 along the ridge 64, and the adjacent ridges 64 are approximately in parallel. Hence, discontinuity is present in the adjacent ridges 64. In the linear detection, the value ΣΔθ of the ridge 64 in the detection area 114 to which the difference Δθ of the calculated tangential angle is added is calculated as projection information.

The process of detecting the tangential directions of a ridge discontinuity will be described with reference to FIG.

21. This process is an example of the biometric information processing method and the biometric information processing program.

The ridge 64 is thinned (step S301), for example, to about 1 pixel. As means for performing such a thinning process, for example, a shrinking process may be performed that repeats excising the pixel from the circumference of the ridge little by little. Other methods may also be used.

The tangential angle θ of the thinned ridge 64 is calculated at regular intervals (detection position P) (step S302), and the difference Δθ of the tangential angle θ is calculated between adjacent detection positions P (step S303).

Once the difference Δθ of the tangential angle θ is calculated for all the ridges 64, the process shifts to a linear detection process. For the difference in the tangential direction, ΣΔθ is calculated as the projection information in the horizontal direction of the fingerprint image 60 (step S304).

For example, the projection information ΣΔθ is analyzed for each of the detection areas 114 of FIG. 20, and whether or not the maximum value exceeds a specified threshold is determined (step S305). When the maximum value of the projection information ΣΔθ exceeds ("YES" in step S305), it is assumed that discontinuous points are appearing in a straight line, and the detection area 114 is detected as a discontinuous line 150 (FIG. 31) (step S306).

Whether the maximum value of all the projection information ΣΔθ is determined (step S307), and when the maximum value of all the projection information ΣΔθ is determined ("YES" in step S307), the process terminates.

In the discontinuity detection, detection may be performed, for example, on the basis of the tangential direction of the border line between the ridge 64 and the valley line 110. It is possible to perform discontinuity detection by performing the processes as described above.

Figure 22A:
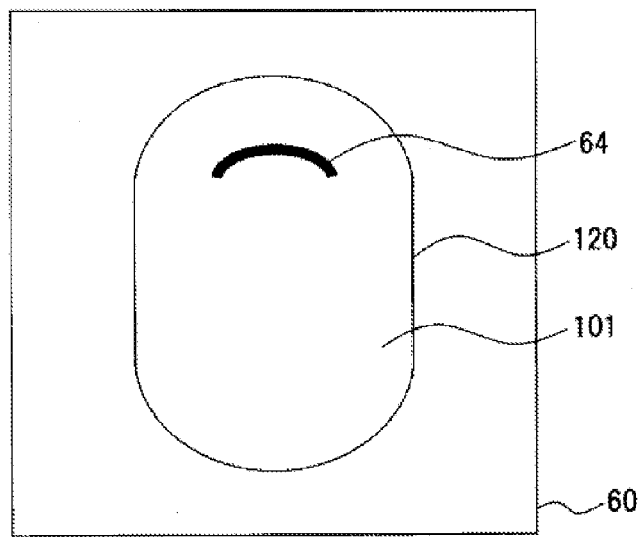
FIGS. 22A and 22B are diagrams illustrating a state in which a repeating pattern appears at the ridge of the tip side of a finger.
Figure 22B:
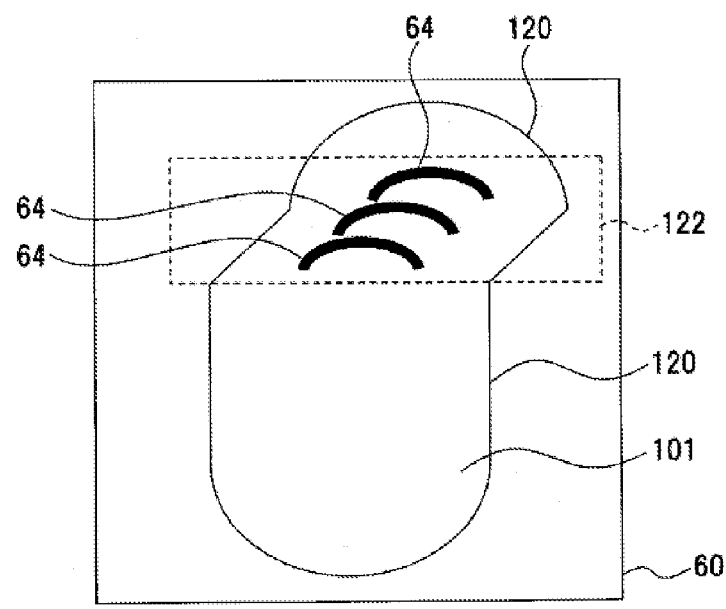

(2) Repeating Pattern Detection (FIGS. 22A and 22B)

Next, specific examples of the process of the repeating pattern detection, which is one of the means for extracting a mismatching region from a fingerprint image, will be described.

Figure 24A:
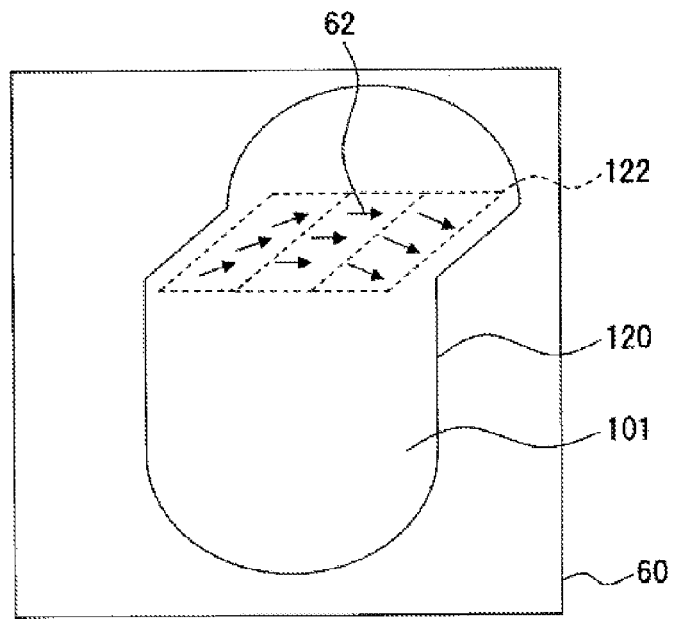
FIGS. 24A and 24B are diagrams illustrating ridge directions in a repeating pattern.
Figure 24B:
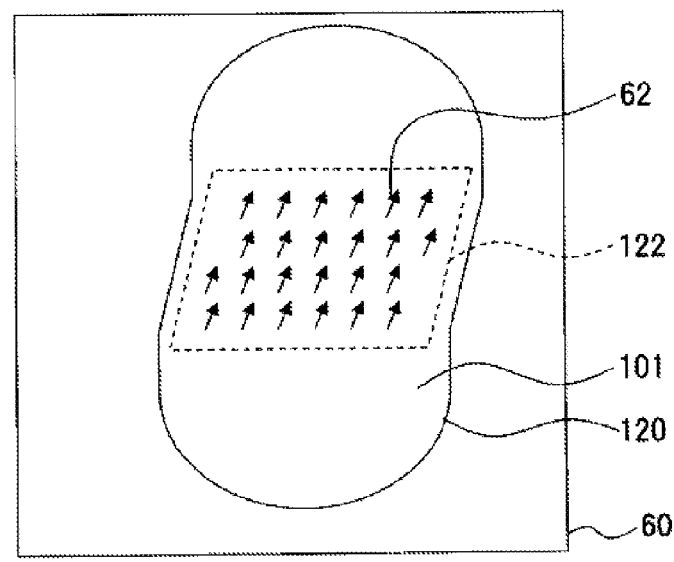
Figure 26:
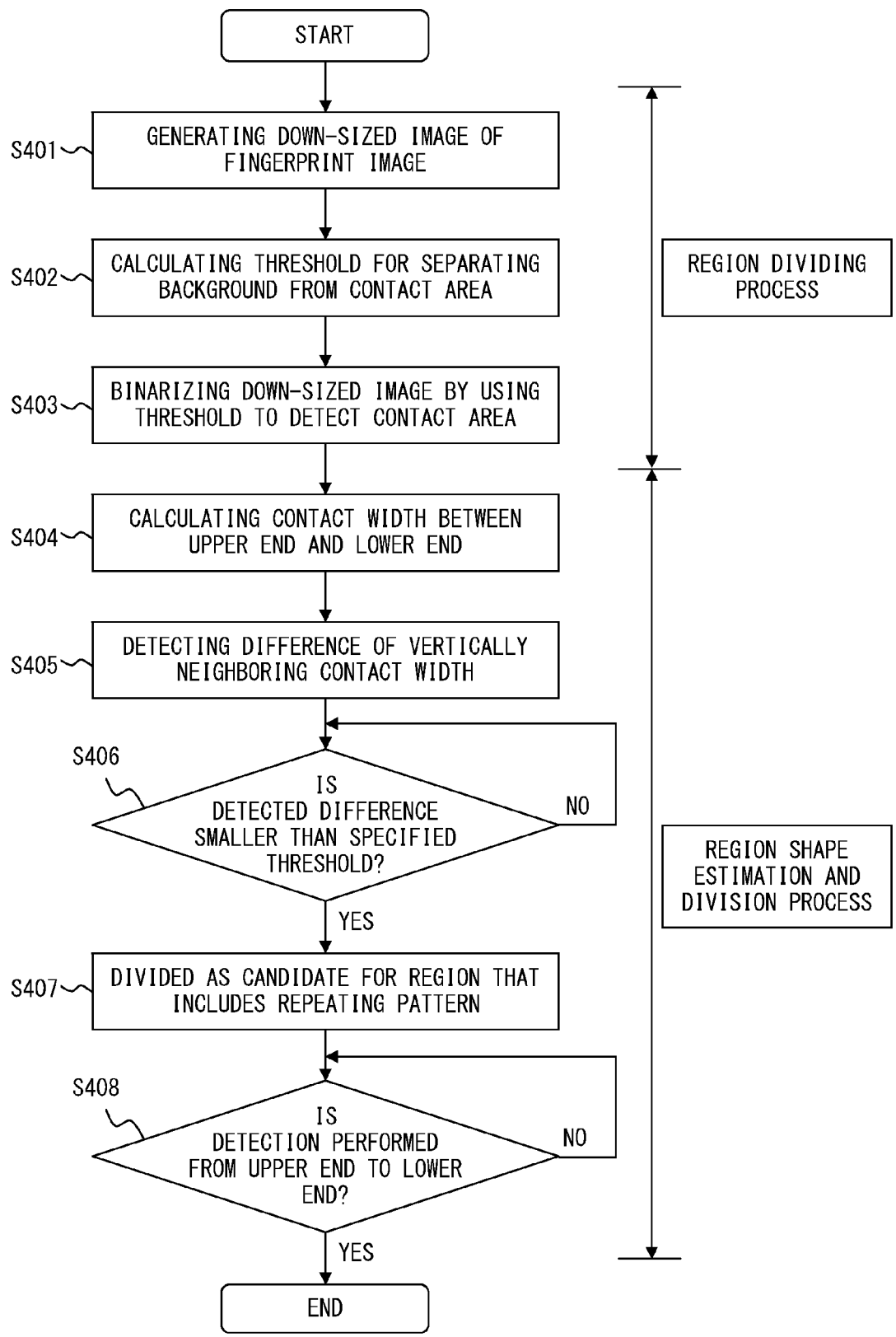
FIG. 26 is a flowchart illustrating the processes of dividing a region and the processes of estimating and dividing a region shape.
Figure 27:
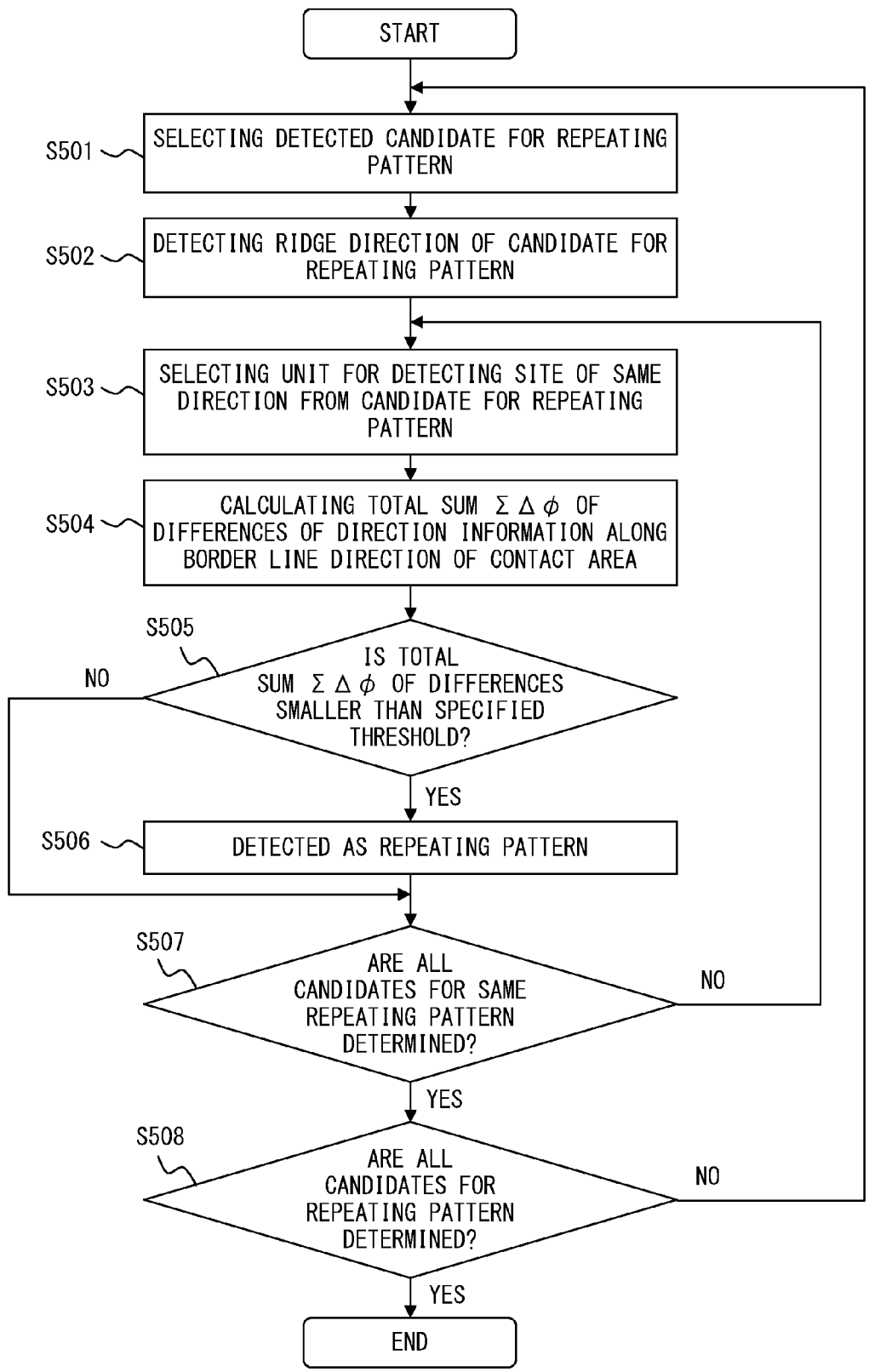
FIG. 27 is a flowchart illustrating the procedure for detecting a repeating pattern.

The repeating pattern detection will be described with reference to FIGS. 22A and 22B, FIGS. 23A and 23B, FIGS. 24A and 24B, FIG. 25, FIG. 26, and FIG. 27. FIGS. 22A and 22B are diagrams illustrating a state in which a repeating pattern appears at the ridge of the tip side of a finger. FIGS. 23A and 23B are diagrams illustrating a state in which a repeating pattern appears at the ridge of the root side of a finger. FIGS. 24A and 24B are diagrams illustrating ridge directions in a repeating pattern. FIG. 25 is a diagram illustrating the detection principles for detecting a repeating pattern. FIG. 26 is a flowchart illustrating the processes of dividing a region and the processes of estimating and dividing a region shape. FIG. 27 is a flowchart illustrating the processes of detecting a repeating pattern. The composition, processes, procedure, or the like of FIGS. 22 to 27 is illustrated by way of example, and thus the present invention is not limited to such examples.

A repeating pattern as a mismatching region of the biometric information is in a state where two or more partial biometric images 4 obtained by capturing the same site of a living body are combined in an overlapping manner. As illustrated in FIGS. 22A and 22B for example, in comparison with the properly reconstructed fingerprint images (FIG. 22A and FIG. 23A) with respect to the contact border line 120 and the ridge 64 of the contact region 101 of a finger, partial images of the same site are successively combined in a repeating region 122 (FIG. 22B and FIG. 23B).

The repetition of images is caused, for example, as the relative displacement between the living body and the sensor temporarily stops due to the friction power or the like produced by the slide between a living body and a sensor in the reading process of the living body and thereby two or more images of the same site are captured. At this time, the distance of the relative displacement between the living body and the sensor detected in these images is "0", and thus a repeating pattern is not produced if redundant images are cut out or are combined at an overlapping position in the process of reconstructing a biometric image. However, there are some cases in which the overlapping position is not detected due to the noise in an image or the slight change in the pressure of a living body against a sensor even if images are of the same site. For this reason, the images of the same site are overlapped at a misaligned position, and the repeating region 122 emerges.

As the images of the same site are repeated in the repeating region 122 of a biometric image, the biometric image is synthetically formed with images moved in parallel if the images are combined at a misaligned position. Accordingly, as illustrated in FIGS. 24A and 24B, the ridge directions 62 of the ridge 64 within the repeating region 122, where a repeating pattern is present, indicate the same direction. Moreover, the speed of the slide of a finger gradually increases from the start inputting operation, and thus the width of a parallelogram that indicates the repeating region 122 on the tip side of a finger becomes narrow (FIG. 24A). On the contrary, the width on the root side of a finger becomes wide (FIG. 24B), and it appears as if there is no minutia in the fingerprint information.

In such repetition detection, for example, a region dividing process and a region shape estimation and division process are performed on the fingerprint image 60 in order to distinguish a region in which the possibility of having a repetition is high. Then, whether or not repeatability is present is determined for divided candidates for a repeating pattern by performing direction same site detection on the ridge 64.

In the region dividing process, a down-sizing process or the aforementioned thinning process is performed on the obtained biometric image. Then, a binarizing process is performed on the obtained image in order to distinguish the contact area of a finger from the background portion. Due to this region dividing process, as illustrated in FIG. 25, a fingerprint image 124 of a contact area 123 of the finger is obtained.

Next, a region shape estimation and division process is performed in order to detect a candidate for a region that includes a repeating pattern. A repeating pattern appears in a region of the fingerprint image 124 where opposed border lines 126, 128, 130, and 132 on right and left sides of the contact area 123 of a finger and the background are in parallel in the horizontal direction. In other words, as illustrated in FIG. 25, an area 134 in which the opposed border line 126 and border line 130, and the opposed border line 128 and border line 132 are in parallel is a region in which the possibility of having a repeating pattern is high.

In order to detect the area 134, for example, long and narrow detection regions 136 for every specified number of pixels are set in such a manner that the fingerprint image 124 is sliced in the horizontal direction. Then, a difference in the contact width 138 of a finger is detected for each of the detection regions 136, and if the difference in the contact width 138 is small, that detection region 136 is determined to be the area 134 in which the possibility of having a repeating pattern is high, and that detection region is determined to be a candidate for a repeating pattern. On the contrary, a region in which the change of the contact width 138 is large may be determined to have no repeating pattern.

Once a candidate for a repeating pattern is detected, whether or not repeatability is present is determined. In this determination process, as described above, a site in which the ridge direction 62 matches the border lines 126, 128, 130, and 132 in parallel is searched by using the ridge direction 62 obtained by the characteristic information extracting unit 18.

It may be determined that repeating pattern is present, for example, by comparing the neighboring detection regions 136 with each other to calculate the difference $\Delta\phi$ of the angle ($\phi$) of the corresponding ridge direction 62, and by determining that the ridge 64 of the same direction is repeated if the calculated difference is smaller than a specified threshold. Alternatively, the total sum $\Sigma\Delta\phi$ of the differences $\Delta\phi$ may be calculated for each of the detection regions 136. In other words, when a repeating pattern is present in the neighboring detection regions 136, the ridge direction 62 becomes in parallel, and thus the difference $\Delta\phi$ becomes small.

Next, the processes of detecting a repetition will be described with reference to FIG. 26 and FIG. 27. These processes are an example of the biometric information processing method and biometric information processing program.

As a region dividing process, a down-sized image of the fingerprint image 124 is generated (step S401), and a threshold for separating the background of the image from the contact area 123 of the finger is calculated for the generated down-sized image (step S402). In this threshold calculation, for example, the threshold automatic determination method of Ohtsu may be used. Then, binarization is performed on a down-sized image by using the calculated threshold to detect the contact area 123 (step S403).

Next, the process shifts to the region shape estimation and division process. In this process, the contact width 138 between the upper end and lower end of the fingerprint image 124 is calculated for the aforementioned detection region 136 (step S404), and a difference in the neighboring contact width 138 is detected (step S405).

Whether or not the detected difference is smaller than a specified threshold is determined (step S406), and when there is no difference in the contact width 138 ("YES" in step S406), the detection region 136 is divided as a candidate for a region that includes a repeating pattern (step S407). When there is a large difference in the contact width 138 ("NO" in step S406), it is assumed that the detection region 136 is not a repeating pattern, and difference detection of the next detection region 136 is performed.

When the difference detection is performed throughout the fingerprint image 124 from the upper end to the lower end ("YES" in step S408), the process terminates.

Next, the process shifts to the detection of repeatability.

The detected candidate for a repeating pattern is selected (step S501), and the ridge direction 62 of the selected candidate for a repeating pattern is detected (step S502). For the ridge direction 62, as described above, the information extracted by the characteristic information extracting unit 18 may be used.

A unit for detecting a site of the same direction is selected from the candidate for a repeating pattern (step S503), and the total sum $\Sigma\Delta\phi$ of the differences of the direction information is calculated along the border-line direction of the contact area 123 of the finger (step S504).

Whether or not this total sum $\Sigma\Delta\phi$ of the differences is smaller than a specified threshold is determined (step S505), and when the total sum $\Sigma\Delta\phi$ of the differences is smaller than a specified threshold ("YES" in step S505), it is determined that the ridge of the same direction is repeated and the candidate for a repeating pattern is detected as a repeating pattern (step S506). When the total sum $\Sigma\Delta\phi$ of the differences is larger than a specified threshold ("NO" in step S505), the process shifts to step S507. Then, whether or not all the candidates for the same repeating pattern have been determined is determined (step S507), and if not ("NO" in step S507), the process returns to step S503 and a difference from other candidates for a repeating pattern is detected.

Furthermore, whether or not all the candidates for a repeating pattern have been determined is determined (step S508), and when all the candidates for a repeating pattern have been determined ("YES" in step S508), the process terminates. When all the candidates have not been determined, the process returns to step S501, and another candidate for a repeating pattern is newly selected and the aforementioned processes are performed.

Figure 28A:
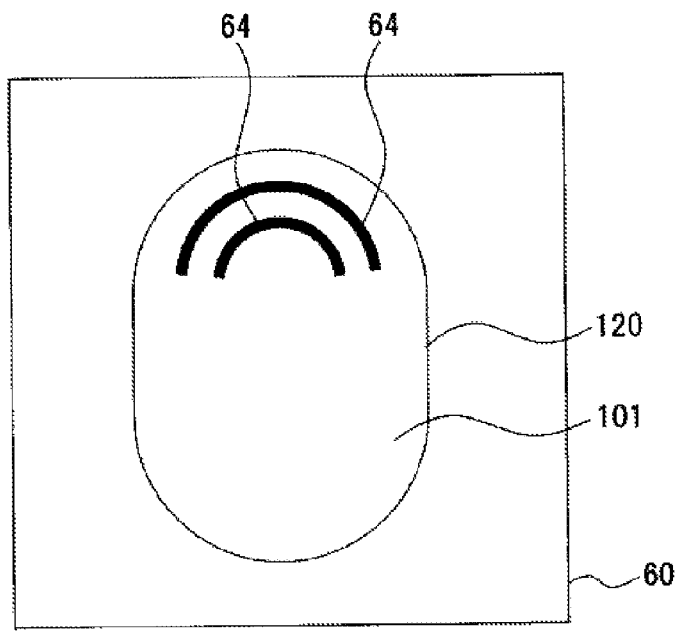
FIGS. 28A and 28B are diagrams illustrating the state of a distorted portion of a biometric image.
Figure 28B:
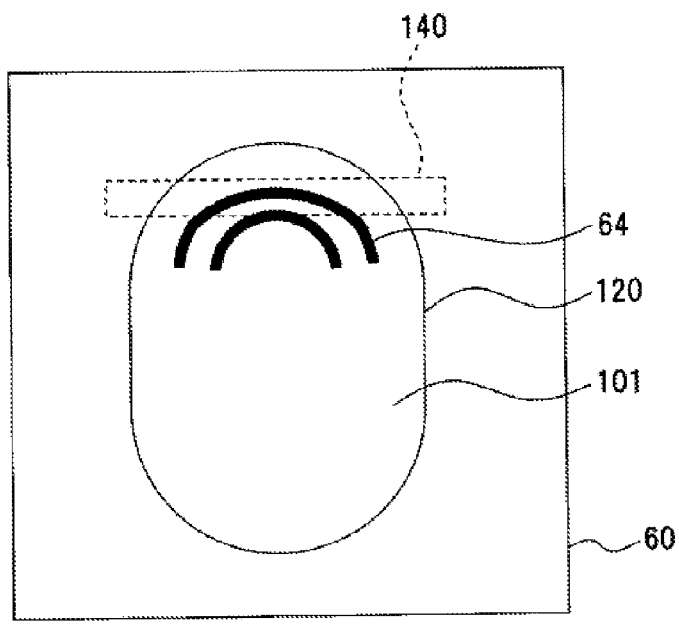

(3) Distortion Detection (FIGS. 28A and 28B)

Next, by way of example of the means for extracting a mismatching region from a fingerprint image, a specific example of the processes of detecting distortion by detecting a discontinuous frequency will be described.

The distortion detection will be described with reference to FIGS. 28A and 28B, FIGS. 29A and 29B, and FIG. 30. FIGS. 28A and 28B are diagrams illustrating the state of a distorted portion of a biometric image. FIGS. 29A and 29B are diagrams illustrating the principle for detecting frequency. FIG. 30 is a flowchart illustrating the processes of distortion detection. The composition, processes, procedure, or the like of FIGS. 28 to 30 is illustrated by way of example, and thus the present invention is not limited to such examples.

In the process of detecting a distorted region from a biometric image, for example, as illustrated in FIGS. 28A and 28B, from a properly formed fingerprint image 60 (FIG. 28A), a distorted region 140 in which the ridge intervals from a specified position are not constant is detected (FIG. 28B). This distorted region 140 is caused, for example, as the amount of movement of a finger changes.

The distorted region 140 of the fingerprint image 60 is detected by calculating the primary component $\omega_p$ of a frequency for every region of interest set on the fingerprint image 60. The frequency may be calculated, for example, by analyzing the shading waveform of bumps and dips or the like of a fingerprint in the region of interest.

In the detection of the frequency, as illustrated in FIG. 29A, regions of interest 142 set for every specified pixel value are set on the fingerprint image 60. For example, when the resolution power of the fingerprint image 60 is 500 [dpi], the aspect ratio may be set to between 16 pixels×16 pixels and 32 pixels×32 pixels such that the number of ridges 64 to be included in the regions of interest 142 will be two or more. The regions of interest 142 may be set so as to cover the entire fingerprint image 60 with no space, or may be set for every specified interval.

Then, linear detection is performed on the primary component $\omega_p$ of the frequency that is calculated for each of the regions of interest 142. In this linear detection, as described above, the detection regions 144 may be set for every specified pixel in the horizontal direction of the fingerprint image 60. Then, the projection information $\Sigma\omega_p/n$ of the primary component $\omega_p$ in the horizontal direction detected from each of the regions of interest 142 in each of the detection regions 144 is calculated. When the projection information $\Sigma\omega_p/n$ is outside the area that is set for a specified threshold based on the average value of the primary component $\omega_p$, the region of interest 142 is determined to be a region that includes a discontinuous point, i.e., the distorted region 140 (FIG. 29B).

Next, the processes of distortion detection will be described with reference to FIG. 30.

The primary component $\omega_p$ of the frequency is detected from the regions of interest 142 (step S601), and a threshold based on the average value of the primary component $\omega_p$ of the frequency is calculated (step S602). Furthermore, the projection information $\Sigma\omega_p/n$ in the horizontal direction of the primary component $\omega_p$ of the frequency is calculated (step S603).

In the linear detection, whether or not the projection information $\Sigma\omega_p/n$ exceeds calculated threshold is determined (step S604), and when it does ("YES" in step S604), the detection region 144 that includes these regions of interest 142 is detected as the distorted region 140 (step S605).

When all the projection information is judged ("YES" in step S606), the process terminates.

The detected information of the distorted region may be stored, for example, in a storage unit of the biometric information processing apparatus 2.

As described above, mismatching region may be extracted from the biometric image as capturing characteristic information of the successively captured biometric images by performing discontinuity detection, repetition detection, and distortion detection. Note that the order of performing the aforementioned discontinuity detection, repetition detection, and distortion detection is not limited to the listed as above.

Figure 31:
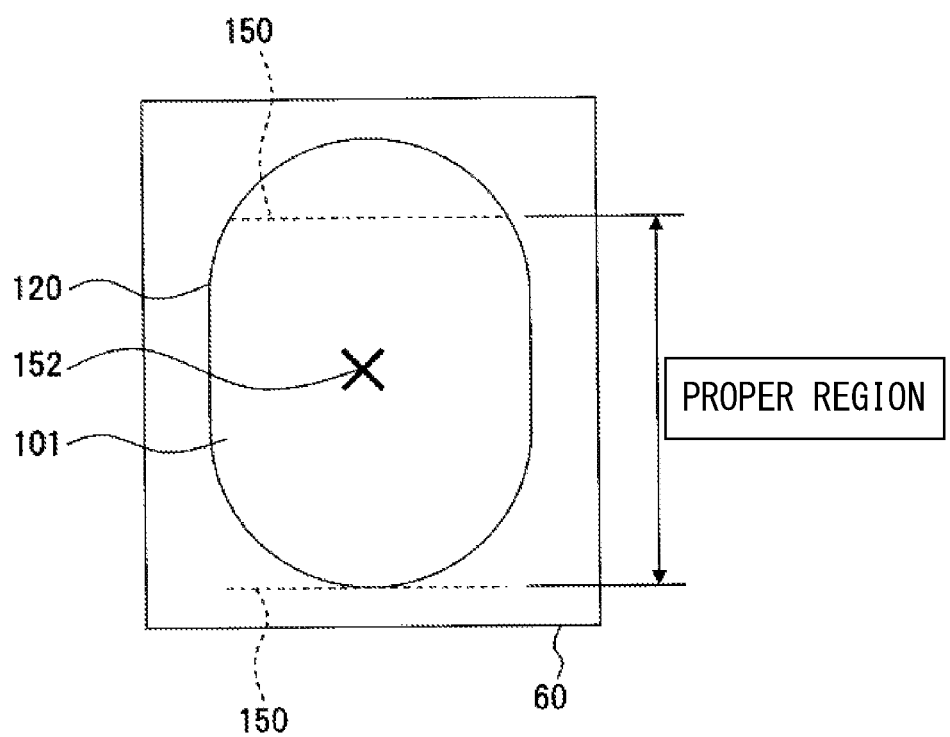
FIG. 31 is a diagram illustrating a state in which the contact portion of a biometric image is divided by a discontinuous line.
Figure 32:
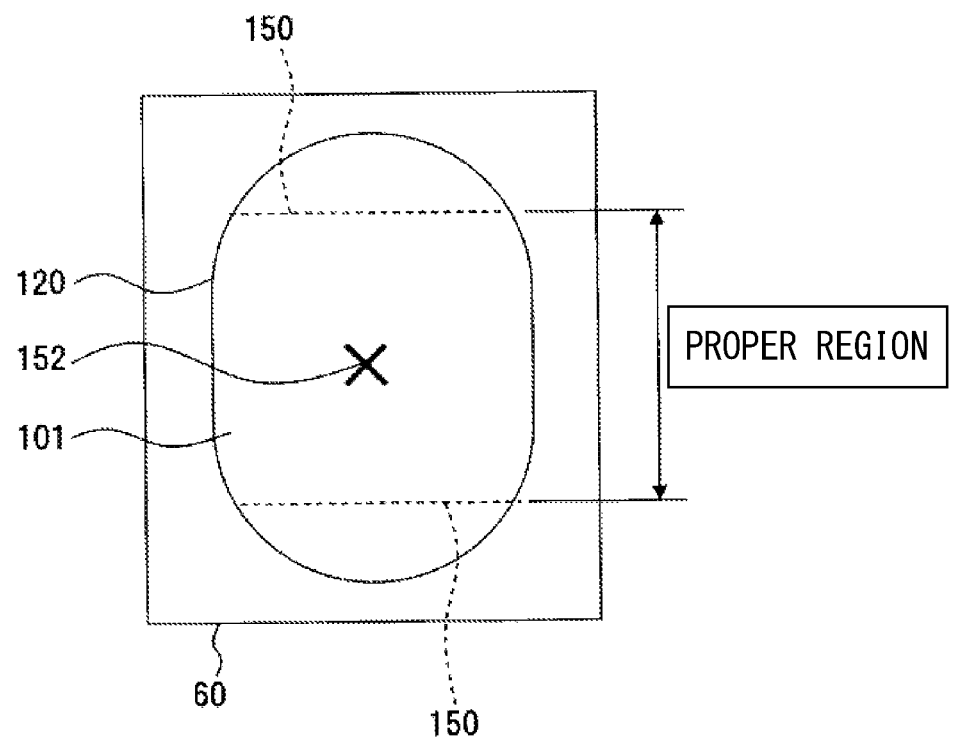
FIG. 32 is a diagram illustrating a state in which the contact portion of a biometric image is divided by two or more discontinuous lines.
Figure 36:
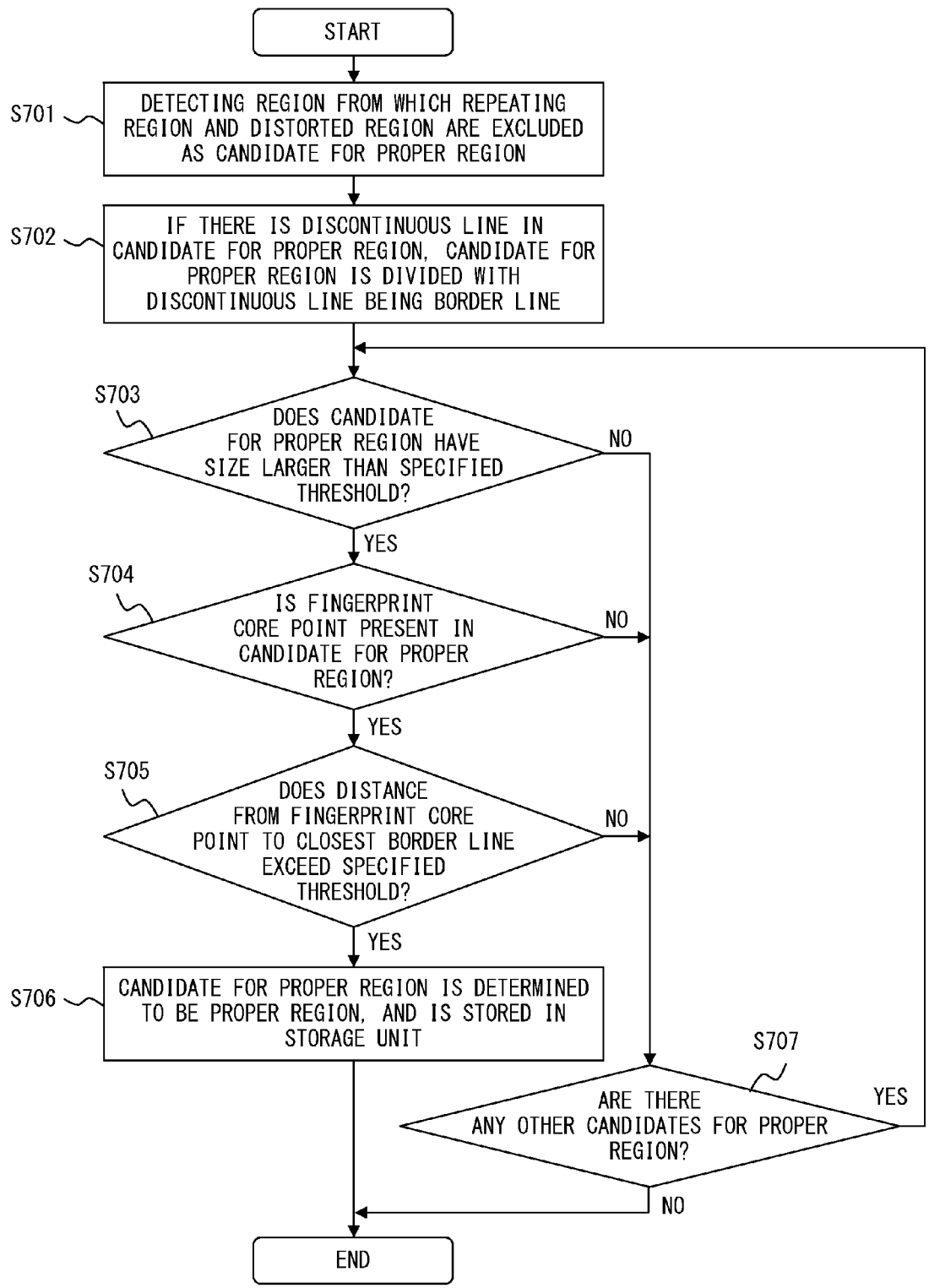
FIG. 36 is a flowchart illustrating the process of proper region detection and the process of determination.

Next, the process of extracting a proper region from a biometric image and the process of determining a biometric image will be described with reference to FIG. 31, FIG. 32, FIGS. 33A and 33B, FIG. 34, FIG. 35, and FIG. 36. FIG. 31 is a diagram illustrating a state in which the contact portion of a biometric image is divided by a discontinuous line. FIG. 32 is a diagram illustrating a state in which the contact portion of a biometric image is divided by two or more discontinuous lines. FIGS. 33A and 33B are diagrams illustrating a state in which a proper region with reference to the fingerprint core point is extracted from the divided biometric image. FIG. 34 and FIG. 35 are diagrams illustrating the principle for determining a candidate for a proper region. FIG. 36 is a flowchart illustrating the process of proper region detection and the process of determination. The composition, processes, procedure, or the like of FIGS. 31 to 36 is illustrated by way of example, and thus the present invention is not limited to such examples.

As described above, a proper region is extracted from the fingerprint image 60 as a biometric image on the basis of the size of a region from which a mismatching region of the extracted image is excluded. In other words, the dimensions of an image needed on an identification algorithm side, for example, a region comprised of a specified number of pixels, is extracted as a proper region. A proper region is determined on the basis of the extracted position at which the extracted mismatching region and proper region are extracted, which becomes criteria for determining whether the proper region is suitable for identification. As the minutia information or the like used for biometric identification is usually found in the vicinity of the fingerprint core point, whether or not this region in the vicinity of the fingerprint core point is extracted as a proper region is determined to assess the reading status of the biometric image.

In the process of extracting a proper region which is achieved by excluding a mismatching region from the fingerprint image 60, as illustrated in FIG. 31 and FIG. 32, the repeating region 122 and the distorted region 140 are removed, and then a dividing process is performed on the contact region 101 of the living body by using the detected discontinuous line 150. In the divided contact regions 101, for example, the largest contact region 101 may be determined to be a proper region. The aforementioned detection area 114 that is detected as the discontinuous region may be used as the discontinuous line 150.

When two or more proper regions in similar sizes are extracted by the discontinuous line 150 and one of these proper regions need to be selected, as illustrated in FIGS. 33A and 33B, the contact region 101 that includes the fingerprint core point 152, which is obtained in the aforementioned characteristic information extracting process, is determined to be a proper region. When two or more candidates for a proper region are extracted, identification applicability is also satisfied by determining the region that includes the fingerprint core point 152 to be a proper region on the basis of the definition of the aforementioned determination process.

Next, as illustrated in FIG. 34 and FIG. 35, lengths $L_1$ and $L_2$ to the border line 120 of the contact region 101 which is closest to the fingerprint core point 152 are determined as criteria for the applicability to identification of the extracted proper region. Even if the contact region 101 includes the fingerprint core point 152 as described above, when the fingerprint core point 152 is too close to the border line 120 of the contact region 101, it is determined that an area suitable for identification is not sufficiently included. A threshold for the closest distance between the fingerprint core point 152 and the border line 120 is determined by an identification algorithm.

When two or more candidates for a proper region are used as a proper region just as they are, the aforementioned selection process and determination process with reference to the fingerprint core point 152 are not performed.

The extracting process and the determination process of this proper region will be described with reference to FIG. 36.

From the reconstructed fingerprint image 60, a region from which the repeating region 122 and the distorted region 140 are excluded is detected as a candidate for a proper region (step S701). If there is a discontinuous line in the detected candidate for a proper region, the candidate for a proper region is divided with the discontinuous line being a border line (step S702).

Whether or not the divided candidate for a proper region has a size being larger than a specified threshold is determined (step S703). When the size is larger than the threshold ("YES" in step S703), whether or not the fingerprint core point is included in the candidate for a proper region is determined (step S704). When the determination of the size of the candidate for a proper region (step S703), or the determination of whether or not the fingerprint core point is included (step S704) is negative ("NO" in step S703, or "NO" in step S704), it is determined that the candidate for a proper region does not satisfy the conditions for extraction. Then, the process shifts to the process of determining whether there are any other candidates for a proper region (step S707).

When the conditions for being a proper region are satisfied ("YES" in step S704), the process shifts to the process of assessing the applicability to identification. Whether or not the distance from the fingerprint core point to the closest border line exceeds a specified threshold is determined (step S705), and when it does ("YES" in step S705), the candidate for a proper region is determined to be a proper region, and is stored in a storage unit (step S706). When the distance does not exceed the threshold ("NO" in step S705), the process shifts to step S707. Then, when it is determined that there are other candidates for a proper region ("YES" in step S707), the process returns to step S703, and the next candidate for a proper region is assessed.

When no proper region suitable for identification is extracted in the determination process, a use is asked to input his or her biometric information again. At this time, advices or the like, for example, about how to input the biometric information may be given by using the display unit 168 (FIG. 37) of the biometric information processing apparatus 2.

According to this configuration, false rejection or false acceptance may be prevented by extracting a mismatching region from the reconstructed biometric image and extracting a proper region with the use of the extracted mismatching region, and thus the reliability of biometric identification is improved. Furthermore, the reliability of biometric identification may be improved by assessing the reading status of the reconstructed biometric image on the basis of the position, size, or the like of the extracted proper region. Even if partial biometric images are combined in a mismatching manner, as long as an identifiable proper region is extracted, it is not needed to input biometric information again, thereby increasing the convenience for users.

Characteristic configuration and advantageous effects of the Third Embodiment will be listed as follows.

(1) Due to the biometric information processing apparatus 2, it becomes possible to detect that partial images are combined at a wrong position and the biometric information is inappropriately read from the combined image without using the information about the detected relative displacement detected from two or more partial images.

(2) As several patterns are wrongly formed due to the relative velocity and movement direction between a reading device and a living body, the biometric information processing apparatus 2 performs detection depending on these patters.

(3) Even if partial images are combined at a wrong position in the combined image, it becomes possible to use a region suitable for identification, thereby reducing the false rejection rate. In other words, the false acceptance rate is prevented from increasing.

(4) The biometric information is linearly arranged because there are some cases where the biometric information essentially includes a pattern in which texture or the like is discontinuously distributed. Accordingly, a discontinuous region is prevented from being detected in error.

(5) The identification capability may be improved without increasing the number of operations by reducing the number of times of asking a user to input his/her biometric information again.

(6) Even if the relative passing speed of a living body is erroneously detected and combined, the false rejection rate may be reduced by extracting a region in which the ridge direction or shading is continuous to select a proper region for identification.

(7) For example, even if the relative passing speed of a living body is detected far larger than it actually is and repeating images are combined, a region in which a ridge direction or shading of a ridge is properly combined is extracted and is used for identification. Accordingly, the reliability of an identification function may be improved.

(8) In the process of forming a biometric image, even from an image that is formed with erroneously detected relative displacement direction of a living body, a region suitable for identification is extracted and is used for identification. Accordingly, the reliability of an identification function may be improved.

(9) Furthermore, the state of the synthetically formed biometric image may be assessed, for example, on the basis of the extracted characteristic information without using the information about the relative passing speed of a living body with reference to a sensor, or the like.

Fourth Embodiment

In the Fourth Embodiment, an example of the hardware configuration of a biometric information processing apparatus, and an example of its procedure.

Figure 38:
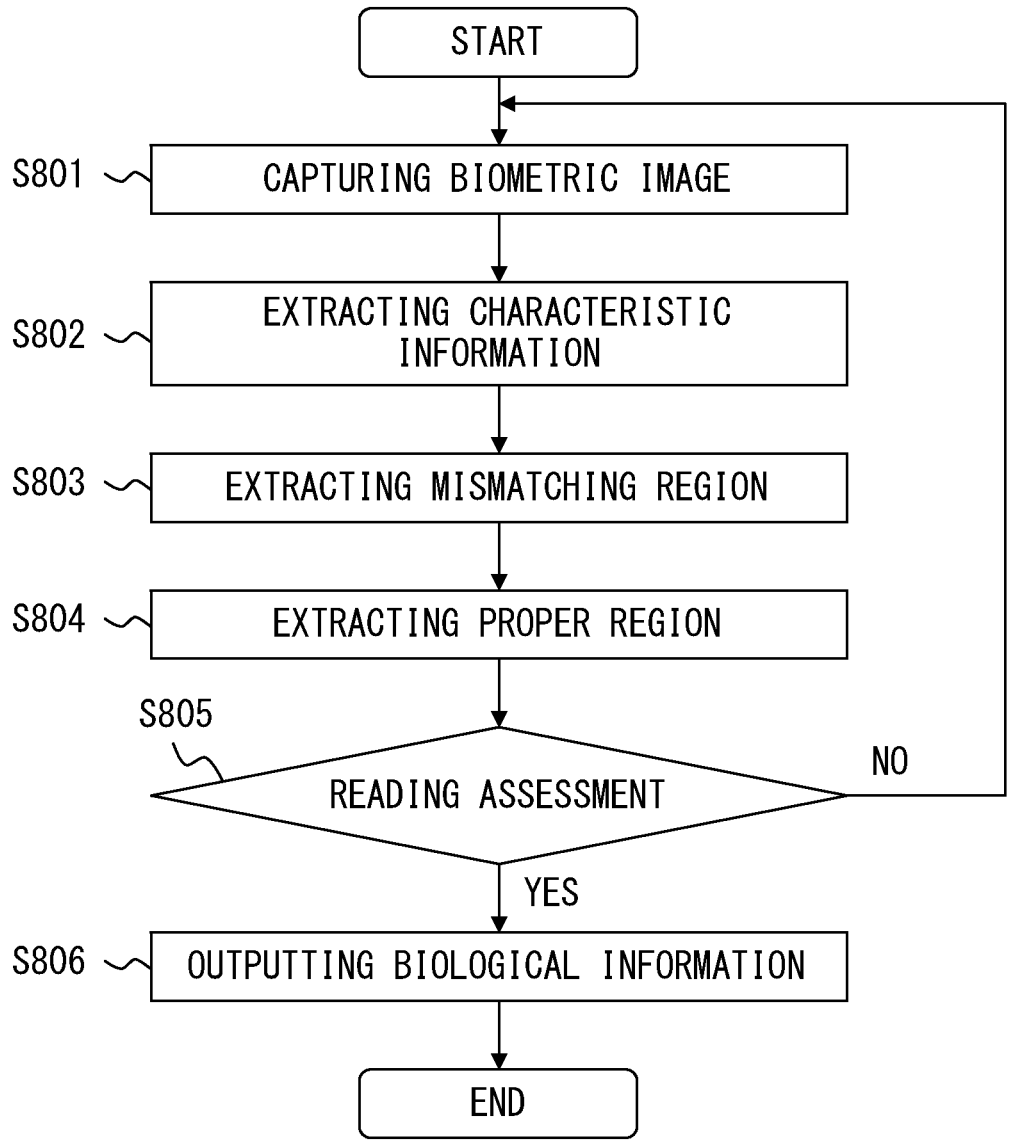
FIG. 38 is a flowchart illustrating the procedure for processing biometric information.

The Fourth Embodiment will be described with reference to FIG. 37 and FIG. 38. FIG. 37 is a diagram illustrating an example of the hardware configuration of a biometric information processing apparatus. FIG. 38 is a flowchart illustrating the procedure for processing biometric information. The composition, processes, procedure, or the like of FIG. 37 and FIG. 38 is illustrated by way of example, and thus the present invention is not limited to such examples. Note that the description of the configuration and process that are similar to those of the aforementioned embodiments will be omitted.

The biometric information processing apparatus 2 is implemented in a computer, and is means for obtaining the partial biometric images 4, and extracting a region suitable for identification from the reconstructed biometric image or assessing the applicability to identification of the biometric image. The biometric information processing apparatus 2 may configure a biometric identification apparatus. The biometric information processing apparatus 2 includes, for example, a biometric information reading unit 160, a CPU (Central Processing Unit) 162, a memory 164, input/output unit 166, a display unit 168, or the like, as illustrated in FIG. 37.

The biometric information reading unit 160 is an example of the means for reading a biometric image, and the biometric information reading unit 160 configures the biometric image obtaining unit 6. The biometric information reading unit 160 is configured by a sweeping fingerprint sensor, and the biometric information reading unit 160 captures a plurality of the partial biometric images 4 as a user slides his/her finger.

The CPU 162 is an example of the arithmetic unit for operating executing the OS (Operating System), other processing programs, or the like which are stored in the memory 164, and the CPU 162 configures an information processor of the biometric information processing apparatus 2. By executing programs, the CPU 162 performs the process of synthetically forming the obtained biometric image, the process of extracting characteristic information, the process of extracting a mismatching region, the process of extracting a proper region, and the process of reading assessment.

The memory 164 is an example of the storage unit or recording device, and stores, for example, an operation control program, a processing program, or the like of the biometric information processing apparatus 2, and stores the obtained biometric image or the like. The memory 164 is configured by, for example, a program storage unit 170, a data storage unit 172, a RAM (Random Access Memory) 174, or the like.

The program storage unit 170 is an example of the means for storing programs that performs the operation control of the biometric information processing apparatus 2, the aforementioned analyzing process of the biometric image, or the like, and the program storage unit 170 is configured by a computer readable medium. For example, the program storage unit 170 may be configured by a ROM (Read Only Memory). In the program storage unit 170, for example, in addition to an OS 1701, a characteristic information extraction program 1702, a mismatching region extraction program 1703, a proper region extraction program 1704, and a reading assessment program 1705 are stored. By executing these processing programs, the aforementioned process of detecting discontinuity, process of detecting a repeating pattern, process of detecting distortion, or the like are performed.

The data storage unit 172 is an example of the means for storing the captured biometric image and the extracted characteristic information, and the information of the mismatching region and proper region of a biometric image. The data storage unit 172 may be configured, for example, by a ROM, a flash memory, or the like. The data storage unit 172 includes, for example, a characteristic information storage unit 176 and a biometric image storage unit 178.

The program storage unit 170 and the data recording unit 172 may be configured, for example, by an electronically rewritable EEPROM (Electrically Erasable and Programmable Read Only Memory) or the like.

Note that the aforementioned processing programs are not limited to the programs that are stored in the program storage unit 170 or the like. For example, a program that is stored in a computer readable recording medium such as a magnetic disk, a flexible disk, an optical disk, and a magneto-optical disk may be used. Moreover, a program or the like may be read from a server, database, or the like on a network.

A RAM 174 configures a work area on which the aforementioned control programs or the like are executed. Then, the CPU 162 executes control programs to operate the aforementioned mismatching region extracting unit 8, proper region extracting unit 10, and determination unit 14.

The input/output unit 166 is an example of the input means of the biometric information processing apparatus 2 or the output means of sound or the like. The input/output unit 166 may be configured, for example, by input means such as a keyboard or the sound output means such as a loud speaker.

The display unit 168 is an example of the display means that is configured by a LCD (Liquid Crystal Display) device or the like that is capable of visual display, and may display, for example, input instructions or check results of the biometric information or advices for inputting the biometric information to a user who is on the process of identification.

The biometric image processing of FIG. 38 is achieved by the configuration described above.

In other words, as described above, the partial biometric images 4 are obtained by the biometric information reading unit 160, and the combined and reconstructed biometric image is captured (step S801). Characteristic information is extracted from the captured biometric image (step S802), and a mismatching region is extracted in the aforementioned process by using the extracted characteristic information (step S803). Then, a proper region is extracted from the biometric image by using the extracted mismatching region (step S804), and reading assessment is performed on the biometric image by assessing the applicability to identification (step S805).

If there is no identifiable proper region in the biometric image ("NO" in step S805), an instruction for re-inputting a biometric image is given. When identification is possible by using the biometric image ("YES" in step S805), the biometric information such as the information of the proper region is output (step S806).

Fifth Embodiment

In the Fifth Embodiment, cases in which the extraction of characteristic information to be used for extracting a mismatching region is separately performed from the extraction of characteristic information to be used for identification.

Figure 39:
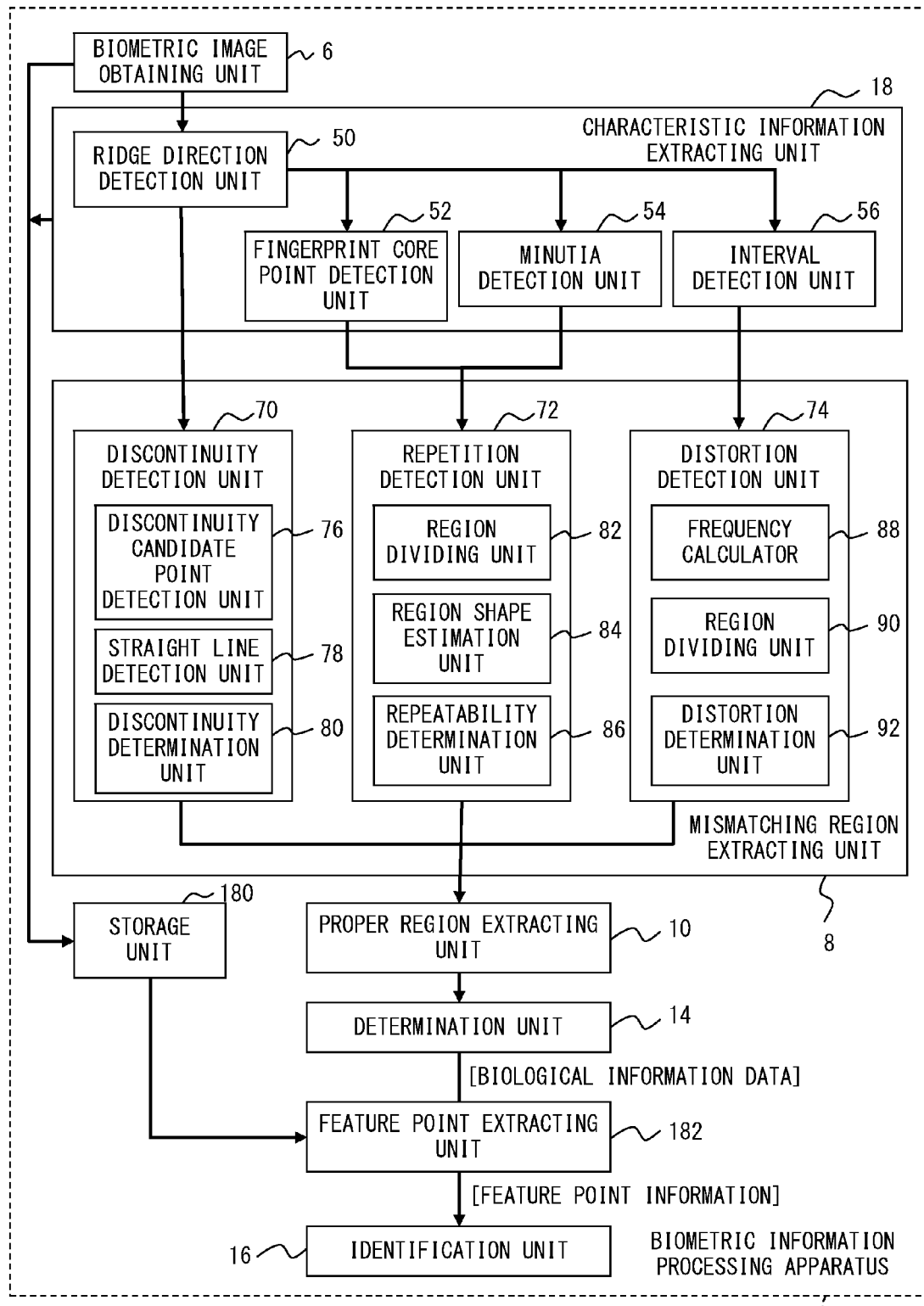
FIG. 39 is a diagram illustrating the functional composition of a biometric information processing apparatus according to the Fifth Embodiment.

The Fifth Embodiment will be described with reference to FIG. 39. FIG. 39 is a diagram illustrating the functional composition of a biometric information processing apparatus according to the Fifth Embodiment. The composition of FIG. 39 is illustrated by way of example, and thus the present invention is not limited to such an example. In FIG. 39, the same reference signs are given to the elements that are the same as those of FIG. 6, and the description will be omitted.

This biometric information processing apparatus 2 is an example of the biometric information processing apparatus, biometric information processing method, and biometric information processing program according to the present disclosure. For example, the biometric information processing apparatus 2 uses the characteristic information extracting unit 18 to extract only the characteristic information that is used for extracting a mismatching region. When it is determined in the reading assessment that the obtained biometric image is identifiable, the characteristic information needed for the identification is extracted.

As described above, the biometric information processing apparatus 2 includes, for example, a storage unit 180 and a feature point extracting unit 182 in addition to the aforementioned characteristic information extracting unit 18, mismatching region extracting unit 8, proper region extracting unit 10, determination unit 14, and identification unit 16.

The storage unit 180 corresponds to, for example, the aforementioned characteristic information storage unit 176, and stores the characteristic information extracted by the characteristic information extracting unit 18.

The feature point extracting unit 182 is an example of the means for extracting the characteristic information needed for the identification from the biometric information that is determined by the reading assessment to be identifiable. The biometric information includes, for example, the reconstructed biometric image or the proper region information that is extracted from the biometric image. Also, the feature point extracting unit 182 may be connected to the storage unit 180 to the characteristic information extracted by the characteristic information extracting unit 18. In other words, it is needed for the feature point extracting unit 182 to extract the characteristic information that is not stored in the storage unit 180 out of the characteristic information needed for the identification.

According to this configuration, as describe above, false rejection or false acceptance may be prevented by extracting a proper region with the use of the extracted mismatching region, and thus the reliability of biometric identification may be improved. Moreover, in the process of extracting a mismatching region, the load on the process is reduced as only the needed characteristic information may be extracte, the speed of the processes of extracting a proper region and the assessment process is increased. Furthermore, in the identification process, the load on the biometric identification process may be reduced as it is possible to use the common characteristic information that has already been obtained. Moreover, unnecessary extracting process may be avoided as characteristic extraction is performed on the biometric image that has applicability to identification.

Sixth Embodiment

In the Sixth Embodiment, a modification example of the combination of means for extracting a mismatching region will be described.

Figure 40:
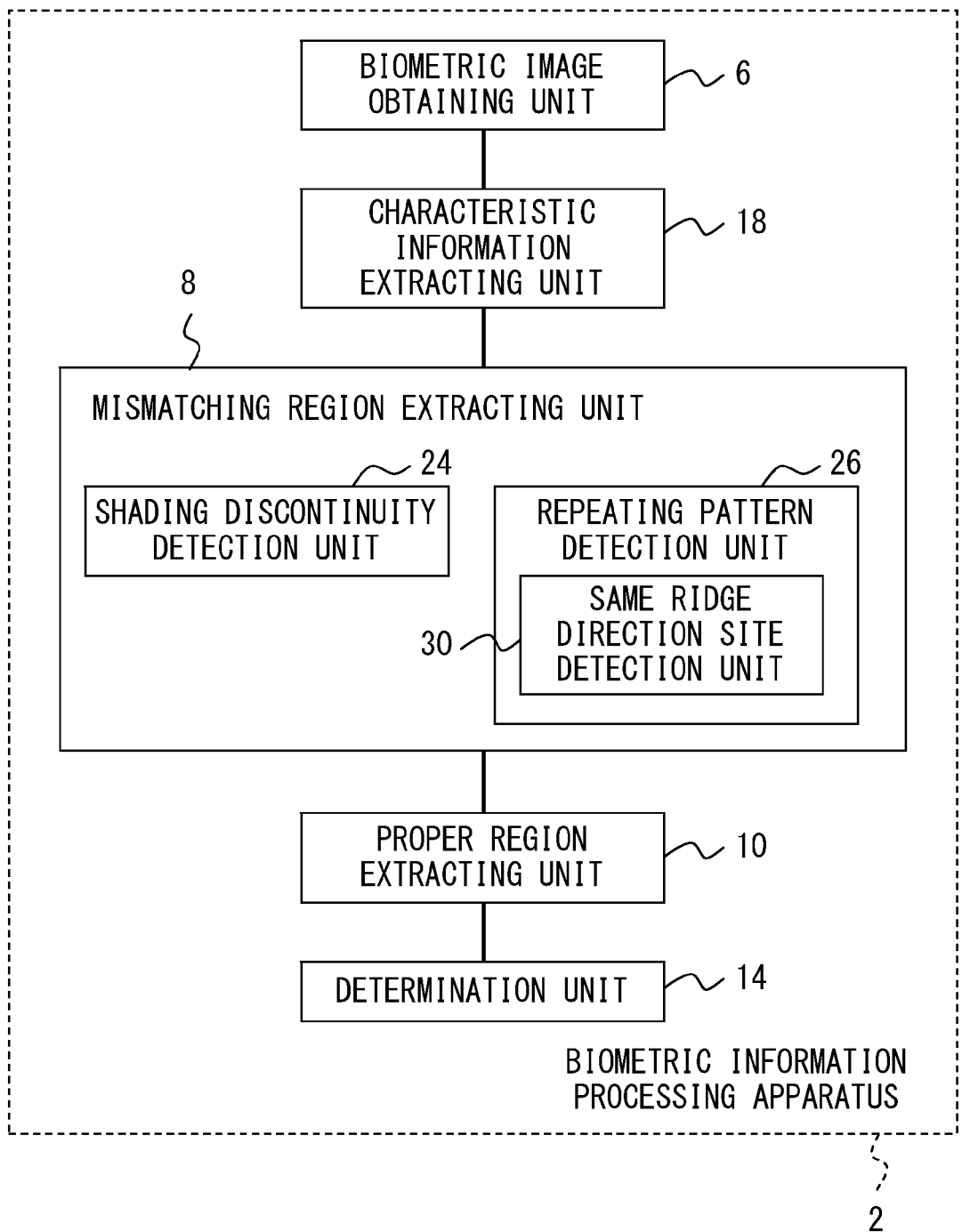
FIG. 40 is a diagram illustrating an example of the functional composition of a biometric information processing apparatus according to the Sixth Embodiment.

The Sixth Embodiment will be described with reference to FIG. 40. FIG. 40 is a diagram illustrating an example of the functional composition of a biometric information processing apparatus according to the Sixth Embodiment. The composition of FIG. 40 is illustrated by a way of example, and thus the present invention is not limited to such an example. In FIG. 40, the same reference signs are given to the elements that are the same as those of FIG. 5.

In the biometric information processing apparatus 2, the mismatching region extracting unit 8 includes the shading discontinuity detection unit 24 and the repeating pattern detection unit 26. In other words, cases are described in which shading discontinuity or a repeating pattern is detected as the process of extracting a mismatching region.

Even if some distortion or shortage due to the combining process is present in the ridges of the biometric image used for biometric identification, as long as such distortion or shortage falls within a specified degree of error, there are some cases where the biometric image is applicable to the process of identification. However, as described above with respect to the detection process, the biometric information is totally different in an image in which shading discontinuity or repeating pattern is present. Accordingly, if characteristic information to be used for identification is extracted from such an image of ridges, the person himself or herself may fail the process of identification.

Accordingly, in the present embodiment, the ridge discontinuity detection or the frequency discontinuity detection (FIG. 5, etc.) is skipped in the process of extracting a mismatching region, shading discontinuity or a repeating pattern is detected on a priority basis.

Note that the process of extracting a mismatching region is not limited to the case of FIG. 40, but for example, the aforementioned frequency discontinuity detection or the aforementioned discontinuity detection by using the tangential directions of a ridge may be performed in combination with the shading discontinuity detection and the repeating pattern.

According to this configuration, it becomes possible to speed up the processes of extracting a mismatching region.

Seventh Embodiment

In the Seventh Embodiment, a modification example of the procedure for extracting a mismatching region.

Figure 41:
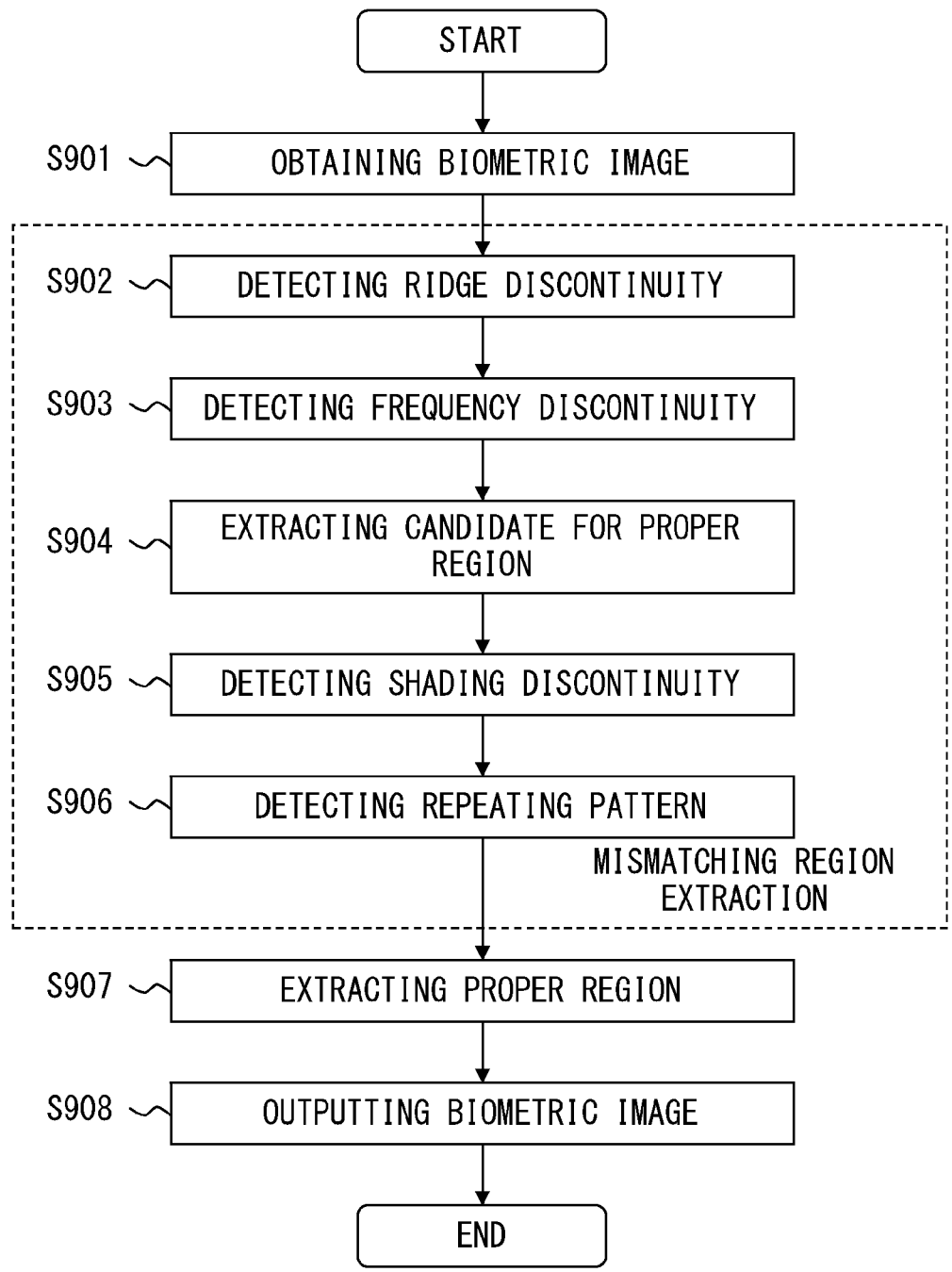
FIG. 41 is a flowchart illustrating an example of the processes of extracting a mismatching region by a biometric information processing apparatus.

The Seventh Embodiment will be described with respect to FIG. 41. FIG. 41 is a flowchart illustrating an example of the processes of extracting a mismatching region by a biometric information processing apparatus. The composition of FIG. 41 is illustrated by way of example, and thus the present invention is not limited to such an example.

In this process of extracting a mismatching region, for example, a process whose processing load is relatively lighter than other detection processes is performed first, and a candidate for a proper region in this stage is extracted from the mismatching region detected in this process. Then, other detection processes are performed on this candidate for a proper region.

For example, once a biometric image is obtained (step S901), a ridge discontinuity detection process (step S902) and a frequency discontinuity detection process (step S903) are performed. Then, the discontinuous line detected in these processes is removed from the biometric image, and a candidate for a proper region is extracted (step S904).

Then, shading discontinuity detection (step S905) and repeating pattern detection (step S906) are performed on the extracted candidate for a proper region, and by using the extracted mismatching region, a proper region is extracted (step S907), and a biometric image is output (step S908).

According to this configuration, in the detection process whose processing load is large, detection target may be narrowed down, and the speedup of the processes of extracting a mismatching region may be achieved.

Figure 44:
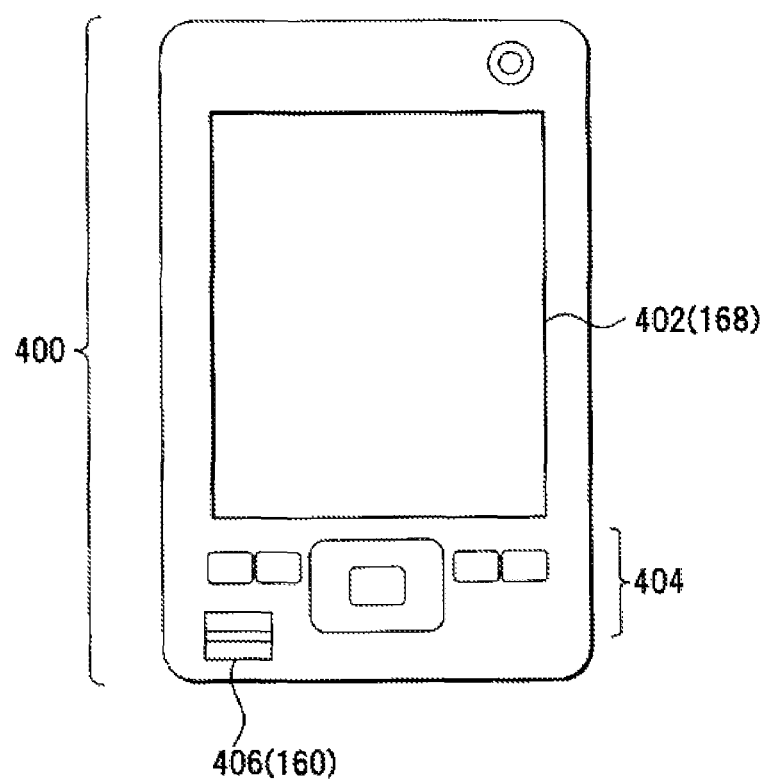
FIG. 44 is a diagram illustrating an example of the configuration of a PDA according to other embodiments.

Other Embodiments (1) An example of the electronic equipment that has the biometric information processing apparatus 2 according to the embodiments above includes, as illustrated in FIG. 42, FIG. 43, and FIG. 44 for example, a mobile phone 200, a PC (Personal Computer) 300, and a PDA (Personal Digital Assistant) 400. In the mobile phone 200 (FIG. 42), for example, a display-side unit 202 and an operation-side unit 204 are jointed so as to be opened and closed via a hinge unit 206. The display-side unit 202 includes a display unit 208, a receiver 210, or the like, and the operation-side unit 204 includes a biometric information reading unit 212, operation input unit 214, or the like.

In the PC 300 (FIG. 43), for example, a keyboard-side unit 302 and a display-side unit 304 are jointed so as to be opened and closed via a hinge unit 306. The keyboard-side unit 302 includes a biometric information reading unit 308 and a keyboard 310, and the display-side unit 304 includes a display unit 312. The PDA 400 (FIG. 44) includes a display unit 402, an operation unit 404, and a biometric information reading unit 406.

(2) In the embodiments above, a fingerprint image is used as an example of the biometric information, but for example, a palm print, a palm shape, a palm vein, a finger vein, or the like may also be used.

(3) In the seventh embodiment described above, as illustrated in FIG. 41, a detection process whose processing load is light is performed first in the processes of extracting a mismatching region. However, such is not always needed, and for example, it may be configured such that a process whose processing load is heavy is performed in advance, and when no mismatch is detected, other processes will not be performed. Alternatively, it may be configured such that when a mismatch is detected, other detection processes will be performed on a region from which the mismatching region detected in the process is removed.

Next, characteristic matters of the embodiments described above will be listed.

(1) The biometric information processing apparatus may include means for inputting biometric information, means for combining partial images, means for detecting a mismatching region, means for detecting a proper region, and reading assessment means. In this case, means for inputting biometric information visualizes the biometric information of a relatively moving living body site, and successively captures two or more partial images of the biometric information. The means for combining partial images synthetically combines the partial images input from the means for inputting biometric information on the basis of the length of on-apparatus movement and the relative displacement direction of the relatively moving living body site. The means for detecting a mismatching region detects an inappropriately combined region from the combined image combined by the means for combining partial images along the relative displacement direction calculated by the means for combining partial images or the direction orthogonal to a specified direction that is assumed to be a relative displacement direction on the basis of the installation state of the means for inputting biometric information. The means for detecting a proper region detects a proper region on the basis of the size of a region from which the mismatching region in the combined image is removed. Then, the reading assessment means assesses the reading state on the basis of the positional relationship between a proper region and a mismatching region.

(2) Furthermore, the biometric information processing apparatus may include a means for detecting a discontinuous ridge. The means for detecting a discontinuous ridge detects a discontinuous region linearly distributing on the combined image from a local region of the combined image on the basis of the detected ridge direction. If this means for detecting a discontinuous ridge is provided, the means for detecting a mismatching region may detect a mismatching region on the basis of the information of the discontinuity.

(3) Furthermore, the biometric information processing apparatus may include means for detecting a discontinuous frequency. The means for detecting a discontinuous frequency detects a discontinuous region linearly distributing on the combined image from a local region of the combined image on the basis of the information of a frequency along a ridge or a border line set between a ridge and a valley line. The means for detecting a mismatching region may be configured to detect a mismatching region on the basis of the information of the discontinuity.

(4) Furthermore, the biometric information processing apparatus may include means for detecting same ridge direction site and means for detecting a repeating pattern. The means for same ridge direction site detects a site of the same ridge direction where local regions in which ridge directions calculated from a local region are the same are linearly next to each other. The means for detecting a repeating pattern detects a repeating pattern when the sites of the same ridge direction are adjacent to each other and distributed in parallel or when local regions in which ridge directions calculated from a local region are the same are widely distributed. Then, the means for detecting a mismatching region may be configured to detect a mismatching region on the basis of the position and shape of the repeating pattern.

(5) Regarding the aforementioned repeating pattern, a band may be selected whose frequency is lower than a frequency that the tangential direction in the ridge direction has for an image in a site of the same ridge direction, and is higher than a frequency of which the wave number is two or more. In this case, it may be determined that a repeating pattern is present when the intensity is larger than a specified threshold.

(6) Furthermore, the biometric information processing apparatus may include means for detecting ridge direction discontinuity. The means for detecting ridge direction discontinuity predicts a prediction area that is a possible ridge direction on adjacent local regions that are adjacent to each other in a relative displacement direction of a living body or in a specified direction that is assumed to be a relative displacement direction. Then, a region in which ridge directions are discontinuous is detected by assuming that the ridge directions are discontinuous when the ridge directions on the adjacent local regions are out of the predicted range. The means for detecting a mismatching region may be configured to detect a mismatching region on the basis of the information of the discontinuity. The relative displacement direction may be calculated by the means for combining partial images from the ridge direction calculated for a local region of the combined image. Moreover, a specified direction that is assumed to be a relative displacement direction may be calculated on the basis of the installation state of the means for inputting biometric information.

(7) Furthermore, the biometric information processing apparatus may include means for detecting shading discontinuity. The means for detecting shading discontinuity calculates a change in the shading in a relative displacement direction, or in a specified direction that is assumed to be a relative displacement direction. Shading discontinuity is detected on the basis of differences among the ridge direction, the orthogonal direction in the combined image, and the relative displacement direction. The means for detecting a mismatching region may detect a mismatching region on the basis of the information of the discontinuity. Here, the relative displacement direction may be calculated by the means for combining partial images, and the specified direction that is assumed to be a relative displacement direction may be calculated on the basis of the installation state of the means for inputting biometric information.

Some embodiments or the like of a biometric information processing apparatus, a biometric information processing method, or a biometric information processing program according to the present disclosure are described as above. Note that the present invention is not limited to the disclosure above. As a matter of course, a person could have made various types of variations or modifications on the basis of the disclosure of the claims and the description of embodiments. It is needless to mention that such variations or modifications are included in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

A biometric information processing apparatus, biometric information processing method, or a biometric information processing program according to the present disclosure are advantageous as it is possible to improve the reliability of an identification function by extracting a proper region from the biometric image reconstructed by synthetic combination and using the extracted proper region for identification.

What is claimed is:

1. A biometric information processing apparatus comprising:

a memory; and a processor that performs a process including:

obtaining a biometric image formed by combining a plurality of successively captured fingerprint images from a living body that moves relative to a reading device;

extracting a repeating region where an image at a same position of a fingerprint is repeated from the biometric image;

extracting respective discontinuous points of a plurality of ridges of the fingerprint from the biometric image;

extracting a candidate region excluding the repeating region from the biometric image dividing the candidate region using a line along the respective discontinuous points of the plurality of ridges into a plurality of candidate regions; and selecting a region including characteristic information of the fingerprint as a proper region from among the plurality of candidate regions.

2. The biometric information processing apparatus according to claim 1, wherein the process further includes determining whether the proper region is usable for the identification.

3. The biometric information processing apparatus according to claim 1, wherein the process further includes extracting characteristic information of a living body from the biometric image, and wherein the extracting the repeating region extracts the repeating region from the biometric image by using the characteristic information of the living body.

4. The biometric information processing apparatus according to claim 1, wherein the process further includes calculating a frequency of adjacent ridges of the fingerprint when the fingerprint is obtained as a result of combining the successively captured fingerprint images, and extracting a region in which a value of the frequency for every detection region is larger or smaller than a threshold as a mismatching region in a combined image.

5. The biometric information processing apparatus according to claim 1, wherein the extracting the repeating region includes detecting a region where a portion in which adjacent ridge directions of the fingerprint are same is repeated in parallel and combined when the fingerprint is obtained as a result of combining the successively captured fingerprint images, and wherein the extracting the repeating region extracts the detection region as the repeating region in a combined image.

6. The biometric information processing apparatus according to claim 1, wherein the process further includes calculating a change in shading of a ridge in a relative displacement direction of a living body with reference to the reading device when the fingerprint is obtained as a result of combining the successively captured fingerprint images, and extracting a region where a value of the change in shading is larger than a threshold as a mismatching region.

7. The biometric information processing apparatus according to claim 1, wherein the processor performs discontinuity detection, repetition detection, or distortion detection or any combination thereof on information of the biometric image obtained by combining the successively captured fingerprint images.

8. The biometric information processing apparatus according to claim 2, wherein the determining determines whether the proper region is usable for the identification according to one of or both a position and size of the biometric image.

9. A method for processing biometric information, the method comprising:

obtaining a biometric image formed by combining a plurality of successively captured fingerprint images from a living body that moves relative to a reading unit;

extracting a repeating region where an image at a same position of a fingerprint is repeated from the biometric image;

extracting respective discontinuous points of a plurality of ridges of the fingerprint from the biometric image;

extracting a candidate region excluding the repeating region from the biometric image;

dividing the candidate region using a line along the respective discontinuous points of the plurality of ridges into a plurality of candidate regions; and selecting a region including characteristic information of the fingerprint as a proper region from among the plurality of candidate regions.

10. The method according to claim 9, further comprising determining whether the proper region is usable for the identification.

11. The method according to claim 9, further comprising extracting characteristic information of a living body from the biometric image, wherein the repeating region is extracted from the biometric image by using the characteristic information of the living body.

12. The method according to claim 9, further comprising calculating a frequency of adjacent ridges of a fingerprint, and extracting a region in which a value of the frequency is larger or smaller than a threshold as a mismatching region in a combined image.

13. The method according to claim 9, further comprising detecting a region where a portion in which adjacent ridge directions of a fingerprint are same is repeated in parallel and combined, wherein the detection region is extracted as the repeating region in a combined image.

14. The method according to claim 9, further comprising calculating a change in shading of a ridge in a relative displacement direction of a living body with reference to the reading device, and extracting a region where a value of the change in shading is larger than a threshold as a mismatching region.

15. The method according to claim 10, wherein the determining determines whether the proper region is usable for the identification according to one of or both a position and size of the biometric image.

16. A non-transitory computer-readable recording medium having stored therein a program for causing a computer to execute a process comprising:

capturing a biometric image formed by combining a plurality of successively captured fingerprint images from a living body that moves relative to a reading device;

extracting a repeating region where an image at a same position of a fingerprint is repeated from the biometric image;

extracting respective discontinuous points of a plurality of ridges of the fingerprint from the biometric image;

extracting a candidate region excluding the repeating region from the biometric image;

dividing the candidate region using a line along the respective discontinuous points of the plurality of ridges into a plurality of candidate regions; and selecting a region including characteristic information of the fingerprint as a proper region from among the plurality of candidate regions.

17. The non-transitory computer-readable recording medium according to claim 16, the process further comprising:
   determining whether the proper region is usable for the identification according to one of or both a position and size of the biometric image.

* * * * *